(12) United States Patent
Ely

(10) Patent No.: US 9,410,791 B2
(45) Date of Patent: Aug. 9, 2016

(54) POSITION SENSING TRANSDUCER

(75) Inventor: David Ely, Cambridge (GB)

(73) Assignee: Cambridge Integrated Circuits Limited, Cambridge (GB)

( * ) Notice: Subject to any disclaimer, the term of this patent is extended or adjusted under 35 U.S.C. 154(b) by 90 days.

(21) Appl. No.: 13/989,776

(22) PCT Filed: Dec. 21, 2011

(86) PCT No.: PCT/GB2011/052550
§ 371 (c)(1),
(2), (4) Date: May 24, 2013

(87) PCT Pub. No.: WO2012/085575
PCT Pub. Date: Jun. 28, 2012

(65) Prior Publication Data
US 2013/0257417 A1    Oct. 3, 2013

(30) Foreign Application Priority Data

Dec. 24, 2010  (GB) .................................. 1021981.4
Jun. 13, 2011  (GB) .................................. 1109883.7
Jun. 22, 2011  (GB) .................................. 1110586.3
Oct. 12, 2011  (GB) .................................. 1117628.6
Nov. 10, 2011  (GB) .................................. 1119416.4

(51) Int. Cl.
*G01B 7/30* (2006.01)
*G01D 5/20* (2006.01)

(52) U.S. Cl.
CPC ................ *G01B 7/30* (2013.01); *G01D 5/2013* (2013.01)

(58) Field of Classification Search
CPC .... G11B 3/10; G11B 3/46; G11B 2005/0016; G11B 5/3133; G11B 11/0576; H04R 1/00; H04R 1/2892; H04R 3/06; H04R 3/08; H04R 9/00; H04R 25/604; H04R 9/02; H04R 2209/00; G01L 3/1428; F02M 2200/245; G05G 2009/04748; G05G 2009/04755; A61H 2201/5064; F01L 2009/0469; F01L 5/00

USPC .................. 324/207.22, 207.15, 207.25, 633, 324/207.12, 207.18, 242, 257, 652, 654, 324/655, 207.17, 207.24, 207.16, 202, 324/207.2, 225; 345/158, 153; 702/145, 702/150, 151, 65; 384/448; 73/862.046; 463/39, 43

See application file for complete search history.

(56) References Cited

U.S. PATENT DOCUMENTS 2,867,783 A    1/1939    Wechsung
2,942,212 A    6/1960    Mynall
(Continued)

FOREIGN PATENT DOCUMENTS

DE    1 134 848 B    8/1962
DE    35 00 121 A1    7/1986
(Continued)

OTHER PUBLICATIONS

Patents Act 1977: Search Report under Section 17 for United Kingdom Application No. GB0416614.6, 1 pg., (Oct. 21, 2004).
(Continued)

*Primary Examiner* — Melissa Koval
*Assistant Examiner* — Nasima Monsur
(74) *Attorney, Agent, or Firm* — Blakely, Sokoloff, Taylor & Zafman LLP

(57) ABSTRACT

Position sensors to inductively sense a position of a target relative to a number of sensor coils are described. In one embodiment, the target comprises first, second, and third portions positioned on either side of an axis of rotation, such that lateral misalignment between the target and the sensors is compensated between the interaction of the different portions and the sensor coils. In another embodiment, the target comprises first and second portions that are separated along the measurement path such that in a first range of relative positions, the first portion is adjacent to the sensor coils and in a second range of relative positions, the second portion is adjacent to the sensor coils. The first and second portions are asymmetrically arranged relative to the sensor coils such that when each portion is adjacent the same portion of the sensor coils, different signals are induced in the sensor coils.

14 Claims, 36 Drawing Sheets

(56) References Cited

U.S. PATENT DOCUMENTS

| | | |
|---|---|---|
| 3,219,956 A | 11/1965 | Newell et al. |
| 3,297,940 A | 1/1967 | Mulligan et al. |
| 3,482,242 A | 12/1969 | Hargrove |
| 3,579,023 A | 5/1971 | Fox |
| 3,647,963 A | 3/1972 | Bailey |
| 3,772,587 A | 11/1973 | Ferrand et al. |
| 3,812,481 A | 5/1974 | Stedtnitz |
| 3,851,242 A | 11/1974 | Ellis |
| 3,873,770 A | 3/1975 | Ioannou |
| 3,895,356 A | 7/1975 | Kraus |
| 3,898,635 A | 8/1975 | Kulterman |
| 3,906,436 A | 9/1975 | Kurauchi et al. |
| 3,925,610 A | 12/1975 | French et al. |
| 3,962,663 A | 6/1976 | Visser |
| 4,005,396 A | 1/1977 | Fujiwara et al. |
| 4,014,015 A | 3/1977 | Gundlach |
| 4,065,850 A | 1/1978 | Burr et al. |
| 4,081,603 A | 3/1978 | Davis et al. |
| 4,092,852 A | 6/1978 | Fowler et al. |
| 4,094,572 A | 6/1978 | Burr et al. |
| 4,097,684 A | 6/1978 | Burr |
| 4,150,352 A | 4/1979 | Pomella et al. |
| 4,156,192 A | 5/1979 | Schedrovitsky et al. |
| 4,205,199 A | 5/1980 | Mochizuki |
| 4,210,775 A | 7/1980 | Rodgers et al. |
| 4,223,300 A | 9/1980 | Wiklund |
| 4,255,617 A | 3/1981 | Carau, Sr. et al. |
| 4,341,385 A | 7/1982 | Doyle et al. |
| 4,358,723 A | 11/1982 | Scholl et al. |
| 4,387,509 A | 6/1983 | Dechelette |
| 4,423,286 A | 12/1983 | Bergeron |
| 4,425,511 A | 1/1984 | Brosh |
| 4,482,784 A | 11/1984 | Whetstone |
| 4,504,832 A | 3/1985 | Conte |
| 4,507,638 A | 3/1985 | Brosh |
| 4,532,376 A | 7/1985 | Rockwell |
| 4,577,057 A | 3/1986 | Blesser |
| 4,577,058 A | 3/1986 | Collins |
| 4,593,245 A | 6/1986 | Viertl et al. |
| 4,609,776 A | 9/1986 | Murakami et al. |
| 4,642,321 A | 2/1987 | Schoenberg et al. |
| 4,672,154 A | 6/1987 | Rodgers et al. |
| 4,686,501 A | 8/1987 | Palmier et al. |
| 4,693,778 A | 9/1987 | Swiggett et al. |
| 4,697,050 A | 9/1987 | Farel et al. |
| 4,697,144 A | 9/1987 | Howbrook |
| 4,697,244 A | 9/1987 | Murakami et al. |
| 4,704,501 A | 11/1987 | Taguchi et al. |
| 4,709,209 A | 11/1987 | Murakami et al. |
| 4,711,026 A | 12/1987 | Swiggett et al. |
| 4,711,977 A | 12/1987 | Miyamori et al. |
| 4,723,446 A | 2/1988 | Saito et al. |
| 4,734,546 A | 3/1988 | Landmeier |
| 4,737,698 A | 4/1988 | McMullin et al. |
| 4,748,295 A | 5/1988 | Rogers |
| 4,752,655 A | 6/1988 | Tajiri et al. |
| 4,786,765 A | 11/1988 | Yamanami et al. |
| 4,820,961 A | 4/1989 | McMullin |
| 4,821,002 A | 4/1989 | Luly |
| 4,848,496 A | 7/1989 | Murakami et al. |
| 4,868,443 A | 9/1989 | Rossi |
| 4,878,553 A | 11/1989 | Yamanami et al. |
| 4,891,590 A | 1/1990 | Hammel et al. |
| 4,893,077 A | 1/1990 | Auchterlonie |
| 4,902,858 A | 2/1990 | Yamanami et al. |
| 4,963,703 A | 10/1990 | Phillips et al. |
| 4,975,546 A | 12/1990 | Craig |
| 4,985,691 A | 1/1991 | Pulyer et al. |
| 4,988,837 A | 1/1991 | Murakami et al. |
| 4,999,461 A | 3/1991 | Murakami et al. |
| 5,004,872 A | 4/1991 | Lasley |
| 5,013,047 A | 5/1991 | Schwab |
| 5,023,408 A | 6/1991 | Murakami et al. |
| 5,028,745 A | 7/1991 | Yamanami et al. |
| 5,041,785 A | 8/1991 | Bogaerts et al. |
| 5,045,645 A | 9/1991 | Hoendervoogt et al. |
| 5,059,180 A | 10/1991 | McLees |
| 5,066,833 A | 11/1991 | Zalenski |
| 5,082,286 A | 1/1992 | Ryan et al. |
| 5,088,928 A | 2/1992 | Chan |
| 5,122,623 A | 6/1992 | Zank et al. |
| 5,129,654 A | 7/1992 | Bogner |
| 5,134,388 A | 7/1992 | Murakami et al. |
| 5,134,689 A | 7/1992 | Murakami et al. |
| 5,136,125 A | 8/1992 | Russell |
| 5,160,886 A | 11/1992 | Carlen |
| 5,177,389 A | 1/1993 | Schalk |
| 5,188,368 A | 2/1993 | Ryan |
| 5,206,785 A | 4/1993 | Hukashima |
| 5,218,174 A | 6/1993 | Gray et al. |
| 5,225,637 A | 7/1993 | Rodgers et al. |
| 5,239,288 A | 8/1993 | Tsals |
| 5,239,489 A | 8/1993 | Russell |
| 5,245,336 A | 9/1993 | Chen et al. |
| 5,247,137 A | 9/1993 | Epperson |
| 5,247,138 A | 9/1993 | Landmeier |
| 5,274,198 A | 12/1993 | Landmeier |
| 5,342,136 A | 8/1994 | Fukami |
| 5,349,139 A | 9/1994 | Verrier et al. |
| 5,357,062 A | 10/1994 | Rockwell et al. |
| 5,369,227 A | 11/1994 | Stone |
| 5,381,091 A | 1/1995 | Kobayashi et al. |
| 5,396,443 A | 3/1995 | Mese et al. |
| 5,406,155 A | 4/1995 | Persson |
| 5,434,372 A | 7/1995 | Lin |
| 5,461,204 A | 10/1995 | Makinwa et al. |
| 5,486,731 A | 1/1996 | Masaki et al. |
| 5,525,981 A | 6/1996 | Abernethy |
| 5,554,827 A | 9/1996 | Oda |
| 5,557,076 A | 9/1996 | Wieczorek et al. |
| 5,571,997 A | 11/1996 | Gray et al. |
| 5,600,105 A | 2/1997 | Fukuzaki et al. |
| 5,619,431 A | 4/1997 | Oda |
| 5,625,239 A | 4/1997 | Persson et al. |
| 5,635,683 A | 6/1997 | McDermott et al. |
| 5,646,496 A | 7/1997 | Woodland et al. |
| 5,657,011 A | 8/1997 | Komatsu et al. |
| 4,878,553 B1 | 9/1997 | Yamanami et al. |
| 5,691,513 A | 11/1997 | Yamamoto et al. |
| 5,691,748 A | 11/1997 | Fukuzaki |
| 5,693,913 A | 12/1997 | Sudo et al. |
| 5,693,993 A | 12/1997 | Ito et al. |
| 5,748,110 A | 5/1998 | Sekizawa et al. |
| 5,751,229 A | 5/1998 | Funahashi |
| 5,764,052 A | 6/1998 | Renger |
| 5,783,940 A | 7/1998 | Kolomeitsev |
| 5,815,091 A | 9/1998 | Dames et al. |
| 5,818,091 A | 10/1998 | Lee et al. |
| 5,818,431 A | 10/1998 | Oh et al. |
| 5,826,473 A | 10/1998 | Saka et al. |
| 5,831,431 A | 11/1998 | Gottfried-Gottfried et al. |
| 5,854,449 A | 12/1998 | Adkins |
| 5,864,098 A | 1/1999 | Shinohe |
| 5,866,847 A | 2/1999 | Saka et al. |
| 5,895,895 A | 4/1999 | Ono et al. |
| 5,914,735 A | 6/1999 | Yamamoto et al. |
| 5,939,878 A | 8/1999 | Dong |
| 5,943,044 A | 8/1999 | Martinelli et al. |
| 6,002,387 A | 12/1999 | Ronkka et al. |
| 6,005,555 A | 12/1999 | Katsurahira et al. |
| 6,054,851 A | 4/2000 | Masreliez et al. |
| 6,118,271 A | 9/2000 | Ely et al. |
| 6,124,708 A * | 9/2000 | Dames .............. G01D 5/2053 324/207.12 |
| 6,131,457 A | 10/2000 | Sato |
| 6,236,199 B1 | 5/2001 | Irle et al. |
| 6,239,789 B1 | 5/2001 | Sekizawa et al. |
| 6,249,135 B1 | 6/2001 | Maruyama et al. |
| 6,249,234 B1 | 6/2001 | Ely et al. |
| 6,249,235 B1 | 6/2001 | Iwasaki |
| 6,255,810 B1 | 7/2001 | Irle et al. |
| 6,262,684 B1 | 7/2001 | Stewart et al. |
| 6,271,744 B1 | 8/2001 | McCarthy |
| 6,288,710 B1 | 9/2001 | Lee et al. |

(56) References Cited

U.S. PATENT DOCUMENTS

| | | |
|---|---|---|
| 6,291,907 B1 | 9/2001 | Haigh et al. |
| 6,304,014 B1 | 10/2001 | England et al. |
| 6,304,076 B1 | 10/2001 | Madni et al. |
| 6,310,473 B1 | 10/2001 | Zhao |
| 6,393,912 B2 | 5/2002 | Pchelnikov et al. |
| 6,489,899 B1 | 12/2002 | Ely et al. |
| 6,504,361 B1 | 1/2003 | Gleixner |
| 6,513,943 B2 | 2/2003 | Fukuyoshi |
| 6,522,128 B1 | 2/2003 | Ely et al. |
| 6,534,970 B1 * | 3/2003 | Ely .................... G01D 5/2086 324/207.17 |
| 6,650,106 B2 | 11/2003 | Daalmans et al. |
| 6,667,740 B2 | 12/2003 | Ely et al. |
| 6,705,511 B1 | 3/2004 | Dames et al. |
| 6,713,981 B2 | 3/2004 | Nakajima |
| 6,788,221 B1 | 9/2004 | Ely et al. |
| 6,797,895 B2 | 9/2004 | Lapstun et al. |
| 6,798,404 B2 | 9/2004 | Sharma |
| 6,810,754 B2 * | 11/2004 | May ........................ 73/862.333 |
| 6,888,538 B2 | 5/2005 | Ely et al. |
| 6,909,281 B2 | 6/2005 | Gassman et al. |
| 6,969,987 B2 | 11/2005 | Schwartzbart |
| 6,977,594 B2 | 12/2005 | Hudman et al. |
| 6,980,134 B2 | 12/2005 | Ely et al. |
| 7,005,847 B2 | 2/2006 | Gassman et al. |
| 7,019,672 B2 | 3/2006 | Ely |
| 7,219,547 B2 | 5/2007 | Suzuki |
| 7,301,333 B2 | 11/2007 | Kuwahara |
| 7,305,882 B1 | 12/2007 | May |
| 7,511,705 B2 | 3/2009 | Silk et al. |
| 8,058,865 B2 | 11/2011 | May |
| 8,570,028 B2 | 10/2013 | Ely |
| 2001/0001430 A1 | 5/2001 | Ely et al. |
| 2001/0006369 A1 | 7/2001 | Ely |
| 2001/0045858 A1 | 11/2001 | Alhoussami |
| 2001/0050556 A1 | 12/2001 | Fukushima et al. |
| 2001/0052823 A1 | 12/2001 | Hirano et al. |
| 2002/0163331 A1 | 11/2002 | Sekiya et al. |
| 2002/0179339 A1 | 12/2002 | Ely et al. |
| 2003/0006760 A1 | 1/2003 | Valles |
| 2003/0062889 A1 | 4/2003 | Ely et al. |
| 2004/0035221 A1 | 2/2004 | May |
| 2004/0169594 A1 | 9/2004 | Ely et al. |
| 2004/0232913 A1 | 11/2004 | Schott et al. |
| 2004/0233178 A1 | 11/2004 | Silk et al. |
| 2005/0021269 A1 | 1/2005 | Ely et al. |
| 2005/0171714 A1 | 8/2005 | Ely et al. |
| 2005/0174259 A1 | 8/2005 | Ely |
| 2006/0125472 A1 * | 6/2006 | Howard ............... G01D 5/2093 324/207.24 |
| 2006/0152320 A1 * | 7/2006 | Buhler ......................... 336/200 |
| 2006/0244464 A1 | 11/2006 | Kreit |
| 2008/0116883 A1 | 5/2008 | Ruehl |
| 2009/0102463 A1 | 4/2009 | May |
| 2009/0237073 A1 | 9/2009 | Uchiyama et al. |
| 2010/0156402 A1 * | 6/2010 | Straubinger ......... G01D 5/2225 324/207.25 |
| 2010/0301840 A1 | 12/2010 | Filatov |
| 2011/0043196 A1 | 2/2011 | Fujita et al. |
| 2011/0109304 A1 | 5/2011 | Suzuki et al. |
| 2012/0098527 A1 | 4/2012 | Ely |
| 2012/0223701 A1 | 9/2012 | Vaysse et al. |
| 2013/0082692 A1 | 4/2013 | Howard et al. |
| 2013/0113467 A1 | 5/2013 | Sasada |
| 2014/0117980 A1 | 5/2014 | Ely |

FOREIGN PATENT DOCUMENTS

| | | |
|---|---|---|
| DE | 36 20 412 A1 | 12/1987 |
| EP | 0 159 191 A2 | 10/1985 |
| EP | 0 182 085 A2 | 5/1986 |
| EP | 0 182 085 A3 | 5/1986 |
| EP | 0 209 513 A1 | 1/1987 |
| EP | 0 218 745 A1 | 4/1987 |
| EP | 0 307 667 A2 | 3/1989 |
| EP | 0 313 046 A1 | 4/1989 |
| EP | 0 499 641 A1 | 8/1992 |
| EP | 0 511 406 A1 | 11/1992 |
| EP | 0 537 458 A1 | 4/1993 |
| EP | 0 552 001 A1 | 7/1993 |
| EP | 0 554 900 A1 | 8/1993 |
| EP | 0 607 694 A1 | 7/1994 |
| EP | 0 657 917 A1 | 6/1995 |
| EP | 0 672 997 A2 | 9/1995 |
| EP | 0 675 581 A1 | 10/1995 |
| EP | 0 680 009 A2 | 11/1995 |
| EP | 0 709 648 A2 | 5/1996 |
| EP | 0 716 390 A1 | 6/1996 |
| EP | 0 743 508 A1 | 11/1996 |
| EP | 0 772 149 A1 | 5/1997 |
| EP | 0 915 429 A2 | 5/1999 |
| EP | 1 990 610 A1 | 11/2008 |
| EP | 2 080 992 A1 | 7/2009 |
| EP | 2 579 001 A1 | 4/2013 |
| FR | 1 325 017 A | 4/1963 |
| FR | 2 298 082 A1 | 8/1976 |
| FR | 2 682 760 A1 | 4/1993 |
| GB | 851 543 A | 10/1960 |
| GB | 1 122 763 A | 8/1968 |
| GB | 1 452 132 A | 10/1976 |
| GB | 2 012 431 A | 7/1979 |
| GB | 2 021 273 A | 11/1979 |
| GB | 2 042 183 A | 9/1980 |
| GB | 2 059 593 A | 4/1981 |
| GB | 2 064 125 A | 6/1981 |
| GB | 2 074 736 A | 11/1981 |
| GB | 1 604 824 A | 12/1981 |
| GB | 2 103 943 A | 3/1983 |
| GB | 2 141 235 A | 12/1984 |
| GB | 2 231 161 A | 11/1990 |
| GB | 0708981.6 | 5/2007 |
| GB | 0713942.1 | 7/2007 |
| JP | 60-165512 A | 8/1985 |
| JP | 60-189231 A | 9/1985 |
| JP | 63-211014 A | 9/1988 |
| JP | 02-248816 A | 10/1990 |
| JP | 02-275314 A | 11/1990 |
| JP | 60-51905 A | 2/1994 |
| TW | 287267 | 10/1996 |
| TW | 347542 | 12/1998 |
| WO | WO 92/12401 A2 | 7/1992 |
| WO | WO 94/25829 A1 | 11/1994 |
| WO | WO 95/31696 A1 | 11/1995 |
| WO | WO 96/03188 A1 | 2/1996 |
| WO | WO 97/14935 A2 | 4/1997 |
| WO | WO 97/19323 A1 | 5/1997 |
| WO | WO 98/00921 A1 | 1/1998 |
| WO | WO 98/54545 A2 | 1/1998 |
| WO | WO 98/58237 A1 | 12/1998 |
| WO | WO 99/19691 A1 | 4/1999 |
| WO | WO 99/34171 A1 | 7/1999 |
| WO | WO 99/61868 A1 | 12/1999 |
| WO | WO 00/33244 A2 | 6/2000 |
| WO | WO 2006/064236 A1 | 6/2006 |
| WO | WO 2008/139216 A2 | 11/2008 |
| WO | WO 2008139216 A2 * | 11/2008 ............ G01D 5/208 |
| WO | WO 2011/038893 A2 | 4/2011 |
| WO | WO 2012/085575 A2 | 6/2012 |

OTHER PUBLICATIONS

PCT International Search Report for PCT Application No. PCT/GB2004/003639, 2 pgs., (Apr. 11, 2005).

PCT International Search Report for PCT Application No. PCT/GB1999/003989, 5 pgs., (Aug. 23, 2000).

PCT International Search Report for PCT Application No. PCT/GB2003/002432, 3 pgs., (May 11, 2004).

PCT International Search Report for PCT Application No. PCT/GB2002/005247, 5 pgs., (May 23, 2005).

PCT International Search Report for PCT Application No. PCT/GB2002/002387, 5 pgs., (Jan. 8, 2004).

D.W.J. Pulle, et al., "A New Magnetoresistive Based Sensor for Switched Reluctance Drives", Proceedings of the Annual Power

(56) References Cited

OTHER PUBLICATIONS

Electronics Specialists Conference, PESC '92 Record., vol. 2, No. 23, 23$^{rd}$ Annual IEEE, pp. 839-843, (Jun. 29-Jul. 3, 1992).
J. Gordon, "Digitial xy Position Indicator using Walsh Functions", Electronics Letters, vol. 11, No. 1, pp. 5-6, (Jan. 9, 1975).
Patents Act 1977: Examination Report under Section 18(3) for United Kingdom Application No. GB0422091.9, 4 pgs., (Jun. 1, 2005).
PCT Notification of Transmittal of the International Search Report and the Written Opinion of the International Searching Authority, or the Declaration for PCT Application No. PCT/GB2008/050305, 13 pgs., (Feb. 12, 2009).
D. McDonnell, "The Use of Inductosyn to Digital Converters in Linear Control Systems", Automation, vol. 10, No. 11-12, pp. 31-32, (Nov./Dec. 1975), XP-002077774.
Robert W. Klatt, "Phase of Digital Data Fixes Shaft Angle", Electrical Design News, vol. 16, No. 12, pp. 53-56, (Jun. 15, 1971), XP002045871.
"Physics 2CL Lab Manual" Online! 1999, retrieved from the Internet on May 11, 2005: http://hep.ucsd.edu/dbmacf/1998-1999/2cl/manual/experiment3.pdf, pp. 51-61, XP00232778.
PCT International Search Report for PCT Counterpart Application No. PCT/GB2011/052550, 3 pgs., (Jun. 22, 2012).
PCT Written Opinion of the International Searching Authority for PCT Counterpart Application No. PCT/GB2011/052550, 5 pgs., (Jun. 22, 2012).
PCT Notification concerning Transmittal of International Preliminary Report on Patentability (Chapter I of the Patent Cooperation Treaty) for PCT Counterpart Application No. PCT/GB2011/052550, 7 pgs., (Jul. 4, 2013).
Patents Act 1977: Search Report under Section 17 for United Kingdom Application No. GB1119416.4, 1 pg., (Jun. 19, 2012).
Patents Act 1977: Search Report under Section 17 for United Kingdom Application No. GB1310779.2, 1 pg., (Jul. 16, 2013).
Martin Mienkina, et al., "56F80x Resolver Driver and Hardware Interface", Freescale Semiconductor, Inc., AN1942, Rev. 1, 28 pp., (Aug. 2005).
Tony R. Kuphaldt, "Lessons in Electric Circuits—vol. II (AC)", retrieved from the Internet on Jul. 21, 2015: http://www.ibiblio.org/kuphaldt/electricCircuits/AC/index.html, 41 pp., (Jul. 25, 2007).
"The Open Group Base Specifications Issue 6", IEEE Std. 1003.1, retrieved from the Internet on Jul. 21, 2015: http://pubs.opengroup.org/onlinepubs/009695399/functions/atan2.html, 3 pp., (2004).
Martin Staebler, "TMS320F240 DSP Solution for Obtaining Resolver Angular Position and Speed", Texas Instruments, Application Report, SPRA605, 23 pp., (Feb. 2000).
"Technical Journal—R&D Review of Toyota CRDL", Toyota Central R&D Labs, Inc., vol. 40, No. 4, retrieved from the Internet on Jun. 18, 2015: http://www.tytlabs.com/english/review/rev404e.html, 7 pp., (2005).
Takaji Umeno, "Detection of Tire Lateral Force Based on a Resolver Mechanism", R&D Review of Toyota CRDL, vol. 40, No. 4, 6 pp., (2005).
"Synchro and Resolver Engineering Handbook", MOOG Components Group, 35 pp., (2004).
European Patent Office Communication enclosing Third Party Observations relating to corresponding European Patent Application No. 11813803.1, 7 pp., (Mar. 9, 2015).
Raymundo C. Garcia, et al., "Robust Measurement of Angular Position Using Resolver Sensor and Adaline Neural Networks", Laboratory of Power Electronics—COPPE—Federal University of Rio de Janeiro, Power Electronics Group—Electric & Electronic Research Center of Peru and Laboratory of Artificial Intelligence, Power Electronics—Federal University of Mato Grosso do Sul, 6 pp., (2011).

* cited by examiner

POSITION SENSING TRANSDUCER

CROSS-REFERENCE TO RELATED APPLICATIONS

This patent application is a U.S. National Phase Application under 35 U.S.C. §371 of International Application No. PCT/GB2011/052550, filed Dec. 21, 2011, entitled POSITION SENSING TRANSDUCER, which claims priority to Great Britain Patent Application No. 1021981.4, filed Dec. 24, 2010, Great Britain Patent Application No. 1109883.7, filed Jun. 13, 2011, Great Britain Patent Application No. 1110586.3, filed Jun. 22, 2011, Great Britain Patent Application No. 1117628.6, filed Oct. 12, 2011, and Great Britain Patent Application No. 1119416.4, filed Nov. 10, 2011.

FIELD

The present invention relates to position sensing methods, to position sensors and to position sensing transducers that form part of the position sensors. The invention has particular, although not exclusive, relevance to the electronic measurement of a physical angle, and is applicable to machines, robotics, front panel controls and instrumentation, and other applications where such a measurement is required.

BACKGROUND

This patent application is in a similar field to the applicant's earlier PCT application WO2008/139216, the contents of which are incorporated herein by reference. WO2008/139216 describes a way to inductively measure the angle of a contactless target. The system is relatively immune to lateral misalignments of the target relative to the sensor, while at the same time providing relatively large signal levels due to the use of a resonator with a high Q-factor. However the embodiments shown in WO2008/139216 used a target placed across the axis of the sensor. This is acceptable for measuring the angle of a rotating shaft when the target can be placed at the end of the shaft ("end shaft operation"). However if the shaft must pass through the sensor and target ("through shaft") the system described in WO'216 is not appropriate.

This patent application describes a number of improvements to the earlier design described in the above PCT application that allow for through shaft operation while retaining the benefits of immunity to lateral misalignment and high signal levels.

SUMMARY

According to one aspect, the present invention provides a transducer for a rotary position sensor comprising: one or more coils arranged relative to a sensor axis between an inner radius and an outer radius; a target having first, second and third portions arranged relative to a target axis: i) so that said first portion is positioned between said inner and outer radii during the relative rotation of said target and said one or more coils; and ii) so that said second and third portions are positioned adjacent said inner radius or said outer radius during the relative rotation of said target and said one or more coils; wherein said target is arranged to magnetically couple with said coils so that signals are generated that depend on the relative rotational position of the target and the one or more coils; and wherein said second and third portions of the target are arranged on either side of the target axis to compensate for misalignments between the target axis and the sensor axis.

In one embodiment, the one or more coils are arranged relative to said sensor axis so that the signals that are generated vary sinusoidally with said relative rotational position.

The target may comprise one or more of:
i) a plurality of windings arranged on either side of said target axis;
ii) a plurality of wound magnetic members arranged on either side of said target axis;
iii) a banana shaped coil; and
iv) air cored coils arranged on either side of said target axis.

In one embodiment, the target is asymmetric relative to the one or more coils. For example, the target may comprise asymmetric windings that have an oval or an egg shape. In a preferred embodiment, the target comprises a resonator and the transducer comprises one or more excitation coils for energising the resonator and one or more sensor coils in which said signals are generated. The one or more coils arranged relative to the sensor axis between an inner radius and an outer radius may form at least part of at least one of: said one or more excitation coils and said one or more sensor coils. In the preferred embodiments, at least one of: i) the one or more excitation coils; and ii) the one or more sensor coils; is patterned so that the magnetic coupling between the target and the at least one of the one or more excitation coils and the one or more sensor coils varies sinusoidally with said relative rotational position.

The coils may lie in a plane and the target may be arranged to rotate in a plane that is parallel to the planar coils.

In one embodiment, the target comprises first and second elongate field concentrating members having a winding thereon, wherein the winding on each field concentrating member is offset from a central position of the corresponding field concentrating member.

According to another aspect, the present invention provides a transducer for a position sensor comprising: first and second coils arranged along at least a portion of a measurement path; and a target having first and second target portions that are separated along the measurement path and each target portion having first and second sub-portions (or locations) that are separated in a direction perpendicular to the measurement path; wherein the target and the first and second coils are relatively moveable; wherein the magnetic coupling between the first coil and the second coil is modulated by the presence of the target to generate signals that depend on the relative position between the target and the first and second coils; and wherein said first and second target portions are asymmetrically arranged relative to the first and second coils such that the magnetic coupling between the first coil and the second coil, when the first sub-portion of the first target portion is adjacent a location of the first coil, is opposite to the magnetic coupling between the first coil and the second coil, when the first sub-portion of the second target portion is adjacent the same location of the first coil.

In one embodiment, the first and second coils extend along the measurement path over a sensor extent that is less than 70% (in some cases less than 50%) of a measurement range of the transducer and the first and second target portions are separated along the measurement path such that: i) in a first range of relative positions, the first target portion is adjacent the first and second coils; and ii) in a second range of relative positions, the second target portion is adjacent the first and second coils. In other embodiments, the first and second coils extend along the measurement path over a sensor extent that is less the same as the measurement range of the sensor. The first and second target portions may be separated along the measurement path by a distance corresponding to at least 70% of an extent of the first and second coils along the measurement path.

The first and second coils are preferably arranged along the measurement path so that the generated signals vary sinusoidally with said relative position.

In the preferred embodiments, each target portion comprises one or more of a winding and a magnetic field concentrating member. Where the targets include windings, they are preferably electrically connected together, directly or via a capacitor to form a resonant circuit. In this case, the first coil may be an excitation coil for energising the resonant circuit and the second coil may be a sensor coil in which said signals are generated. In one embodiment, at least one of: i) the excitation coil; and ii) the sensor coil; is patterned so that the magnetic coupling between the resonant circuit and the at least one of the excitation coil and the sensor coil varies sinusoidally with said relative rotational position.

In one embodiment, the first and second coils lie in a sensor plane and said target is arranged to rotate in a plane that is parallel to the sensor plane. Alternatively, the coils may be curved around an axis of rotation and the target portions may be arranged to rotate around the axis of rotation adjacent the coils.

The transducer of this aspect may be used for sensing the relative rotational position of a target and the first and second coils over 360° and yet the target and said first and second coils may each extend over an arc that is less than 360°. For example, each of the target and the first and second coils may be C-shaped.

The first and second coils will normally be separated in a direction perpendicular to the measurement path, although his is not essential. In this case, the first and second coils may be sensor coils and one or more excitation coils may be positioned between the first and second sensor coils. Alternatively, the first and second coils may be first and second excitation coil portions and one or more sensor coils may be positioned between the first and second excitation coil portions. In this case, each target portion preferably extends between the first and second excitation coil portions or between the first and second sensor coils. They may extend between these coils in a direction that is perpendicular to the measurement path or in a direction that is inclined to a direction that is perpendicular to the measurement path.

In one embodiment, each target portion comprises an elongate field concentrating member having a winding thereon, wherein the winding on each field concentrating member is offset from a central position of the field concentrating member and wherein the windings on the field concentrating members are offset in different positions around the corresponding field concentrating member.

Additional target portions may be provided that are separated along the measurement path from the first and second target portions.

Two or more groups of coils may also be provided, the coils of one group having a first repetition pitch and the coils of another group having a second, greater, repetition pitch. The coils of the first group may be used for fine position measurement and the coils of the second group may be used for coarse position measurement.

The present invention also provides a position sensor comprising a transducer as described above for generating signals that vary with the relative position of the target and the first and second coils and processing circuitry that processes the signals to determine the relative position.

The present invention also provides a method of determining rotary position comprising: providing one or more coils arranged relative to a sensor axis between an inner radius and an outer radius; providing a target having first, second and third portions arranged relative to a target axis: i) so that said first portion is positioned between said inner and outer radii during the relative rotation of said target and said one or more coils; and ii) so that said second and third portions are positioned adjacent said inner radius or said outer radius during the relative rotation of said target and said one or more coils; causing said target to magnetically couple with said coils to generate signals that depend on the relative rotational position between the target and the sensor coils; processing the generated signals to determine said relative rotational position; and arranging said second and third portions of the target on either side of the target axis to compensate for misalignments between the target axis and the sensor axis.

The present invention also provides a position sensing method comprising: arranging first and second coils along at least a portion of a measurement path; providing a target having first and second target portions that are separated along the measurement path and each target portion having first and second sub-portions that are separated in a direction perpendicular to the measurement path; arranging the target and the one or more sensor coils so that they are relatively moveable and so that the magnetic coupling between the first coil and the second coil is modulated by the presence of the target to generate signals that depend on the relative position between the target and the first and second coils; arranging the first and second target portions asymmetrically relative to the first and second coils such that the magnetic coupling between the first coil and the second coil, when the first sub-portion of the first target portion is adjacent a location of the first coil, is opposite to the magnetic coupling between the first coil and the second coil, when the first sub-portion of the second target portion is adjacent the same location of the first coil; and processing the generated signals to determine the relative position of the target and the one or more sensor coils.

BRIEF DESCRIPTION OF THE DRAWINGS

These and other aspects of the invention will become apparent from the following detailed description of embodiments described with reference to the accompanying drawings in which:

FIG. 5b illustrates coupling factors between the target and the sensor coils for the arrangement shown in FIG. 5a;

FIG. 5c is a plot illustrating the coupling of target ends B and D for the target position shown in FIG. 5a;

FIG. 7b illustrates the position of the two oval shaped target coils shown in FIG. 7a;

FIG. 22b illustrates a cross-section of the alternative sensor arrangement shown in FIG. 22a;

DETAILED DESCRIPTION

First Embodiment

The first embodiment uses a sensor 1 that is built using conventional PCB (Printed Circuit Board) technology, and has four copper layer patterns that are illustrated in FIGS. 1a to 1d.

Figure 1B:
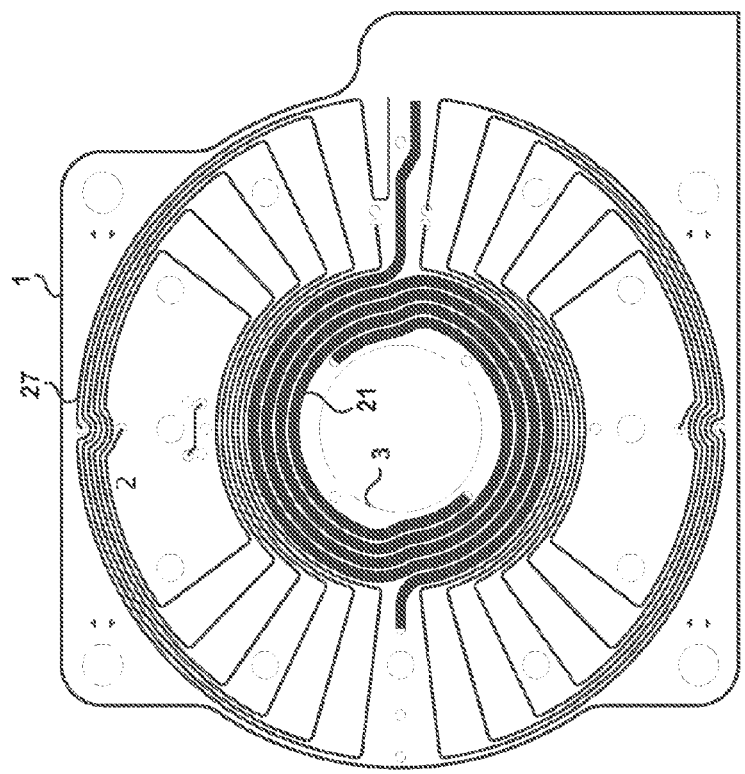
FIG. 1b illustrates a second layer of copper tracks on the PCB that form another part of the sensor and excitation coils.
Figure 1A:
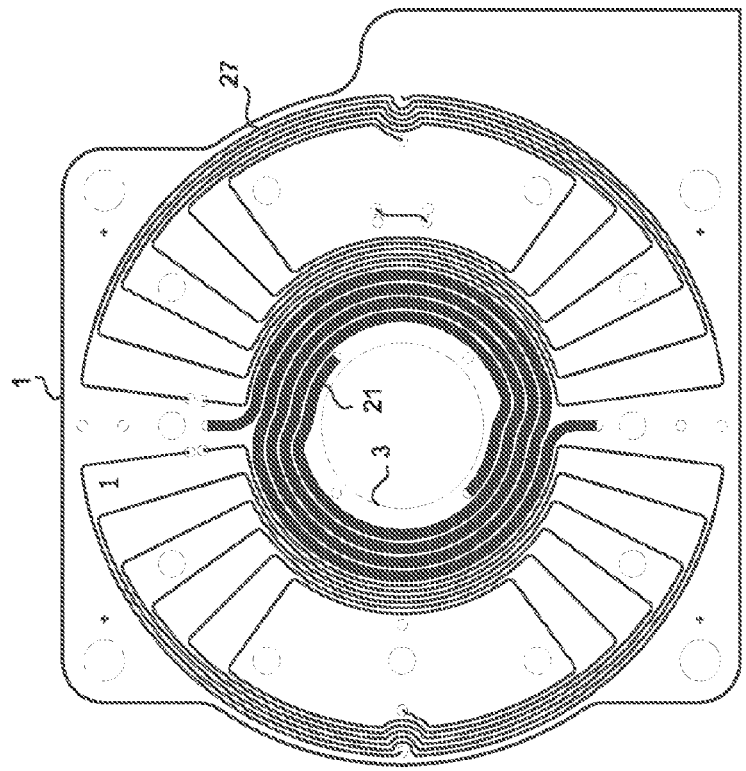
FIG. 1a illustrates a first layer of copper tracks on a printed circuit board (PCB) that form part of sensor and excitation coils.
Figure 1D:
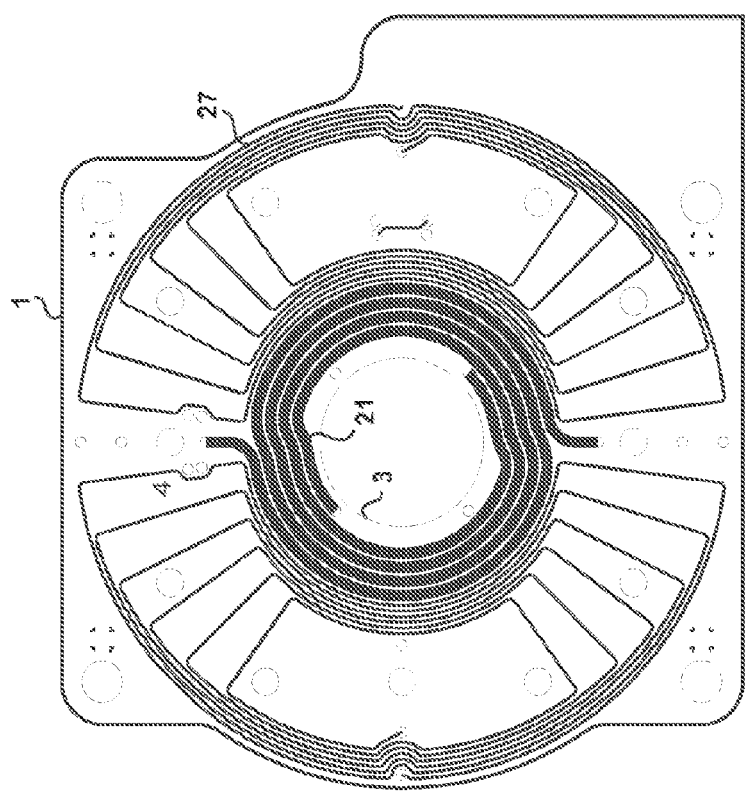
FIG. 1d illustrates a fourth layer of copper tracks on the PCB that form another part of the sensor and excitation coils.
Figure 1C:
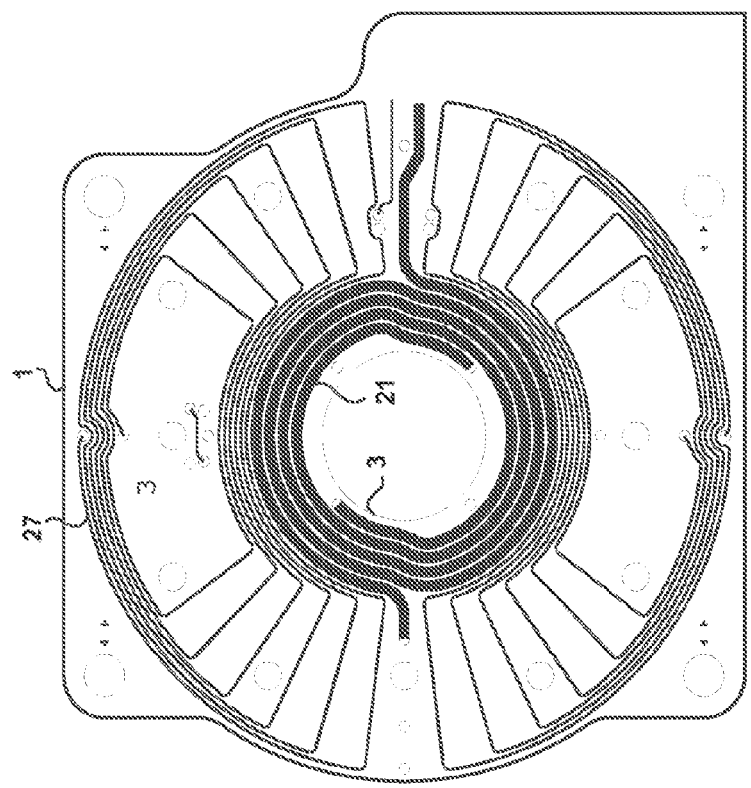
FIG. 1c illustrates a third layer of copper tracks on the PCB that form another part of the sensor and excitation coils.
Figure 2:
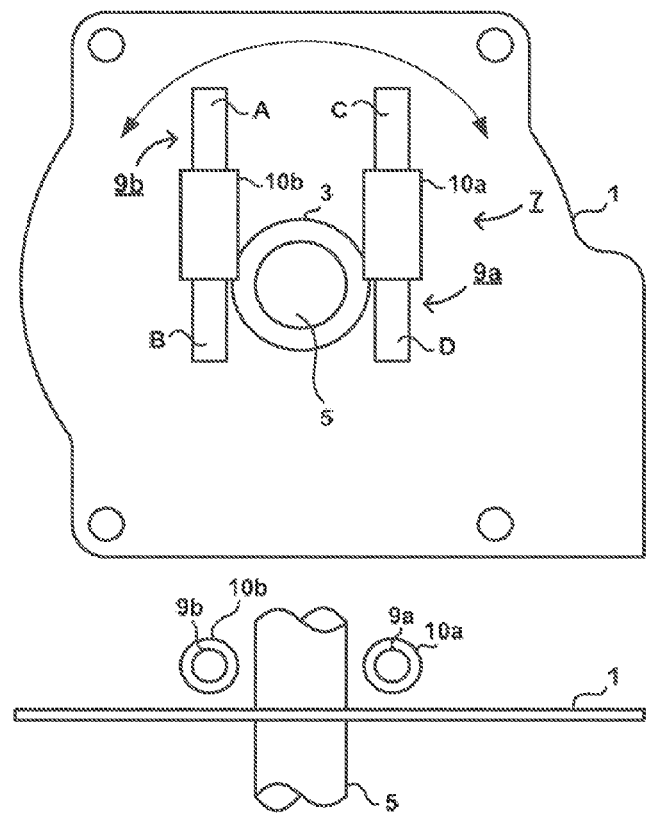
FIG. 2 is a plan and side view of the sensor board illustrated in FIG. 1 together with a target that is mounted for rotation with a rotatable shaft that passes through a central hole of the sensor board shown in FIG. 1.

The sensor board 1 includes a hole 3 at its centre large enough to accommodate a rotatable shaft 5 through the centre, as illustrated in FIG. 2. A target 7 is mounted for rotation with this rotatable shaft 5. In this embodiment, the target 7 comprises two ferrite rods 9a and 9b that each carries a winding 10a and 10b respectively. The windings 10 are connected in series such that the magnetic fields from the upper half of each ferrite rod (labelled A and C), are in the same direction—which is opposite to the direction of the magnetic fields from the lower half of each ferrite rod (labelled B and D). The windings 10 are connected together by a capacitor 11 (shown in FIG. 3a) to form a resonant target 7. The two ferrite rods 9 are fixed in position relative to each other, so that as the target 7 rotates with the shaft 5, the relative positions and orientations of the rods 9 with respect to each other remains fixed.

Figure 3A:
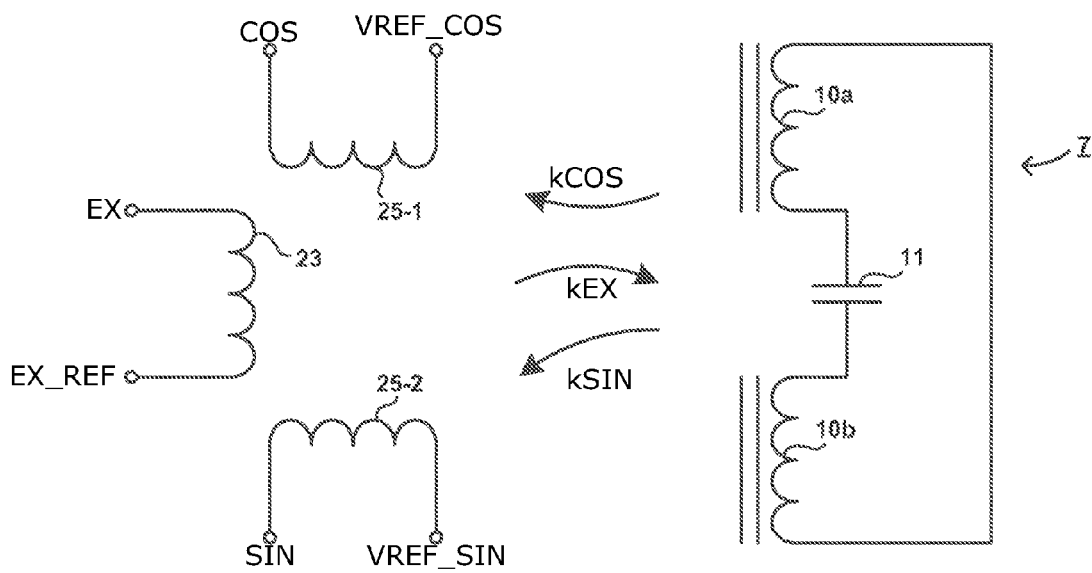
FIG. 3a is an electronic equivalent circuit illustrating the sensor coils and the coupling to a resonant circuit formed by windings on the target shown in FIG. 2.

The tracks on the sensor PCB include thick tracks 21 that form an inner coil having a number of spirally wound segments to form an excitation coil 23 (shown schematically in FIG. 3a). Since the ferrite rods 9 and their windings 10 are offset from the centre of the sensor (upwards as drawn in FIG. 2) the excitation coil 23 always couples into the resonant target 7, in the same direction, as the target 7 rotates about the axis of the sensor (which passes through the centre of the hole 3 perpendicular to the plane of the paper), and the magnitude of the coupling is largely independent of any lateral misalignment between the sensor 1 and the rotatable shaft 5 and target 7 assembly.

Once powered to resonance by the excitation magnetic field, the resonant target 7 generates its own AC magnetic field in response. This field passes along the ferrite rods 9, such that the field at the ends of the rods 9 furthest from the shaft 5 (ends A and C) is approximately equal and opposite to the field at the ends closest to the shaft 5 (ends B and D). This resonator field couples into sensor coils 25 formed by conductor tracks 27 located on the sensor PCB 1. In this embodiment, the sensor coils 25 are patterned so that the coupling of this resonator field with the sensor coils 25 varies with the angular position of the target 7 relative to the sensor coils 25. In this embodiment, the copper tracks 27 on the sensor PCB 1 form two sensor coils 25-1 and 25-2. The first sensor coil 25-1 will be referred to as a COS sensor coil 25 as the inductive coupling between the resonant target 7 and that sensor coil 25-1 varies with the cosine of the angle to be measured; and the second sensor coil 25-2 will be referred to as a SIN sensor coil 25 as the inductive coupling between the resonant target 7 and that sensor coil 25-2 varies with the sine of the angle to be measured. The conductor track patterns are such that 360 degrees of rotation of the target 7 corresponds to one cycle of the SIN and COS variation, and thus an unambiguous determination can be made of the angle of the target 7 relative to the sensor 1. Various different conductor track patterns can be used to provide this sine and cosine variation and the track patterns illustrated in FIG. 1 are illustrated by way of example only.

Figure 3B:
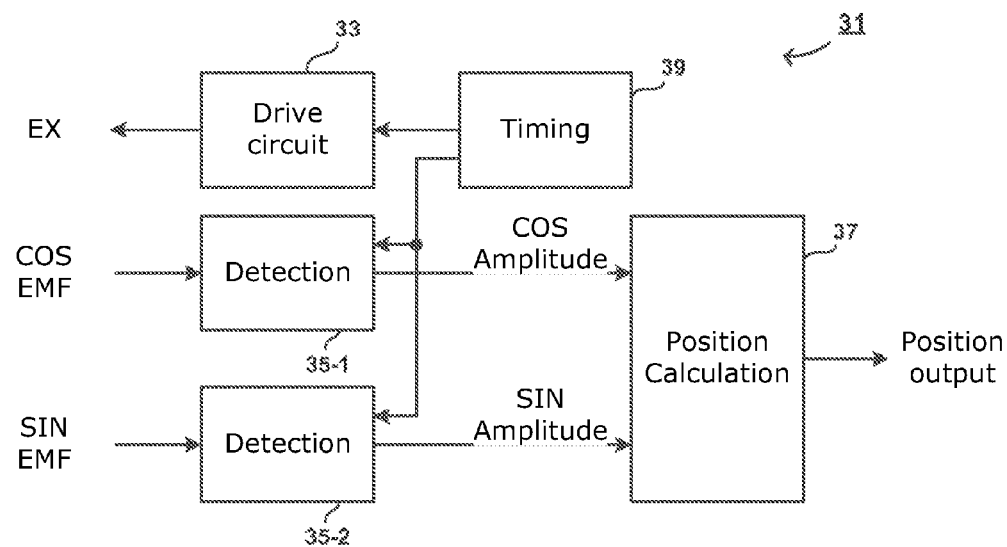
FIG. 3b is a block diagram illustrating the main components of processing electronics used to energise the resonant circuit illustrated in FIG. 3b and used to detect the position of the target from signals induced in the sensor coils.

Therefore, the magnetic fields generated due to the resonating current flowing in the target's windings 10 couple back to the sensor 1 and induce EMFs (Electro-Motive Forces) in the COS sensor coil 25-1 and the SIN sensor coil 25-2, whose amplitudes vary with the angle to be measured. The signals induced in the sensor coils are detected by processing electronics and converted to position using an A TAN 2 calculation, as described in WO2008139216. FIG. 3b is a block diagram illustrating the main components of the processing electronics 31 used in this embodiment. As shown, the processing electronics 31 include a drive circuit 33 for driving the excitation coil 23 and detection circuitry 35-1 and 35-2 for processing the signals induced in the COS sensor coil 25-1 and the SIN sensor coil 25-2 respectively and for providing a measure of the amplitude of the sensor signals to a position calculation unit 37 which performs the above position calculation. The processing electronics 31 also includes a timing circuit 39 that controls the timing of when the excitation coil 23 is energised and when the signals from the sensor coils 25 are detected. In particular, in this embodiment, because the target 7 is resonant, the target 7 can be energised during a first time period and then after the excitation has been removed the signals from the sensor coils 25 can be detected. This is because the resonant target 7 continues to resonate after the excitation signal has been removed.

Offset Immunity

The reason for the immunity to lateral misalignment between the sensor 1 and the rotatable shaft 5 and target 7 assembly will now be explained. As illustrated in FIG. 2, the target 7 is mounted to the shaft 5 so that the ends of the ferrite rods 9 furthest from the shaft 5 (ends A and C) are positioned and rotate between the inner and outer radius of the tracks 27 that form the sensor coils 25 (even when there is some lateral misalignment). The other ends of the ferrite rods 9 (ends B and D) are positioned and rotate inside the inner radius of the tracks 27 that form the sensor coils 25. As the two windings 10 of the resonant target 7 are located on opposite sides of the shaft 5, if one of the ends (B or D) moves closer to the sensor coils 25, then the other one of the ends (D or B) moves further away from the sensor coils 25; and, as will be illustrated in more detail below, this acts to counter positional changes caused by any such lateral misalignment.

Figure 4:
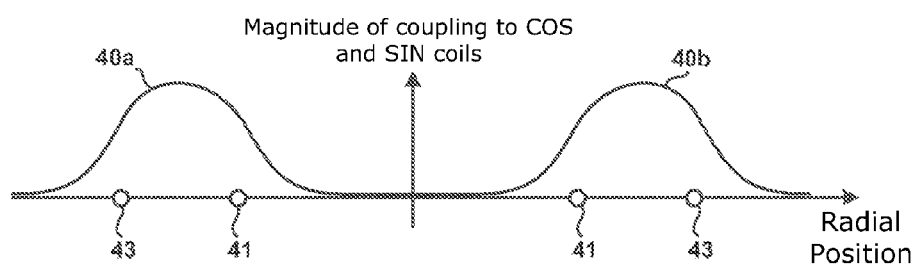
FIG. 4 is a plot illustrating the way in which the magnitude of the coupling to COS and SIN coils varies with radial position.

FIG. 4 is a plot illustrating the way in which the magnitude of the coupling to the sensor coils 25 varies with radial position along the sensor PCB 1. The origin of the plot corresponds to the sensor axis that passes through the centre of the hole 3, perpendicular to the page of FIG. 1. As shown, the coupling peaks (at 40a and 40b) approximately at the mid-radius of the COS and SIN coils, and drops off rapidly for radii less than the coils' inner radius 41 and greater than the outer radius 43. Thus, as the ends A and C of the ferrite rods 9 are arranged to be positioned above and rotate between the inner and outer radii of the sensor coils 25, the ends A and C couple most strongly with the sensor coils 25; whilst the opposite ends of the ferrite rods (ends B and D) couple less strongly as they rotate on the inside of the inner radius 41 of the sensor coils 25.

Figure 5A:
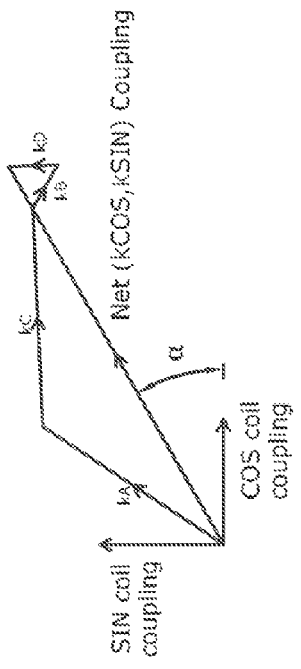
FIG. 5a illustrates the target for a given angular position when a sensor axis and a target axis are aligned.
Figure 5B:
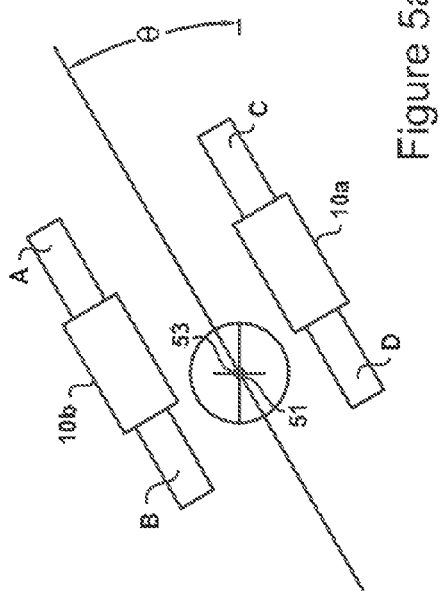

FIG. 5a illustrates the target 7 rotated to an arbitrary angle (θ) when the sensor board axis 51 and the rotation axis 53 of the shaft coincide (i.e. no lateral misalignment); and FIG. 5b is a plot of the coupling amplitudes between the target 7 and the sensor coils 25 for this position. These are shown in the form of couplings to the COS sensor coil 25-1 (kCOS) and the SIN sensor coil 25-2 (kSIN), with the two plotted against each other in the form of a coupling vector (kCOS,kSIN). The couplings between the target 7 and the sensor coils 25 are shown split into 4 separate contributions: from each of the two ends of each of the two ferrite rods 9. In reality, there are contributions from all along each of the two ferrite rods 9. However this simplification is a useful approximation which helps with the explanation.

Figure 5C:
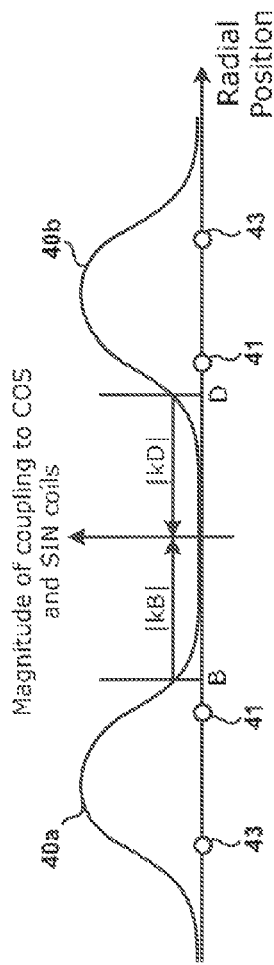

The majority of the coupling between the target 7 and the sensor coils 25 is due to the coupling between ends A and C of the ferrite rods 9, since these ends lie directly over the SIN and COS sensor coils 25. By the design of the COS and SIN sensor coils 25, the angle of the coupling contributions from ends A and C are in the same direction as their location relative to the sensor axis 51. The angle of the coupling vector to rod end A (kA) is greater than the actual angle (θ) by an amount due to the deliberate mechanical offset between the ferrite rod 9b and the sensor board axis 51; and the angle of the coupling vector to rod end C (kC) is less than the actual angle (θ) by the same amount due to the deliberate mechanical offset between the ferrite rod 9a and the sensor board axis 51. The magnitudes of the contributions from rod ends B and D are relatively small, since they lie inside the inner radius 41 of the sensor coils 25. In this case, as there is no misalignment between the axis of rotation 53 and the sensor board axis 51, rod ends B and D will lie the same distance from the sensor axis 51 and so the contributions from rod ends B and D are equal (as illustrated in FIG. 5c). The coupling vectors kB and kD shown in FIG. 5b point in the opposite direction to their location relative to the sensor axis 51, since the resonator field at rod ends B and D is opposite in polarity to the resonator field from rod ends A and C.

The net (kCOS,kSIN) coupling due to the whole target 7 is the sum of the contributions from rod ends A, B, C and D: kA, kB, kC and kD respectively. Due to the symmetry factors described above, the resulting net coupling vector shown in FIG. 5b is at a measured angle ($\alpha$) equal to the actual angle ($\theta$). The processing electronics 31 connected to the sensor board 1 therefore reports the correct angle for the target 7 relative to the sensor 1.

Figure 5D:
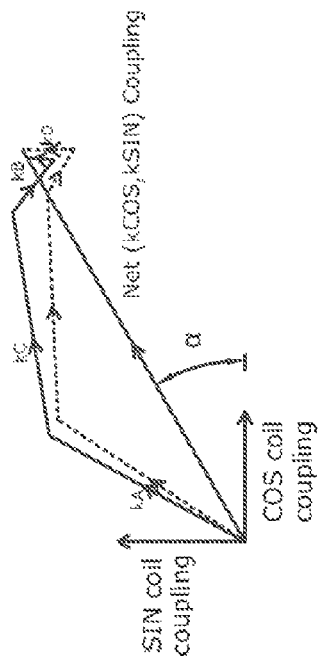
FIG. 5d illustrates the target for a given angular position when a sensor axis and a target axis are misaligned.
Figure 5E:
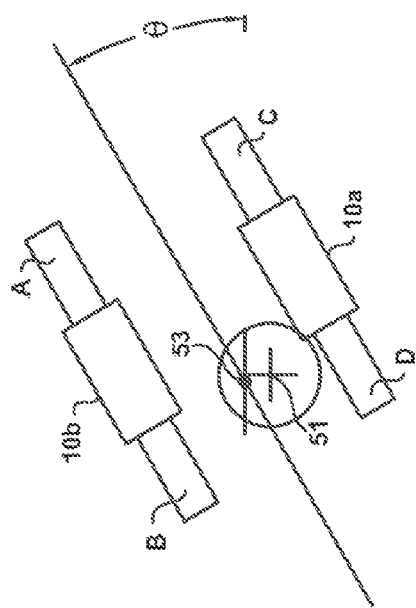
FIG. 5e illustrates coupling factors between the target and the sensor coils for the arrangement shown in FIG. 5d.
Figure 5F:
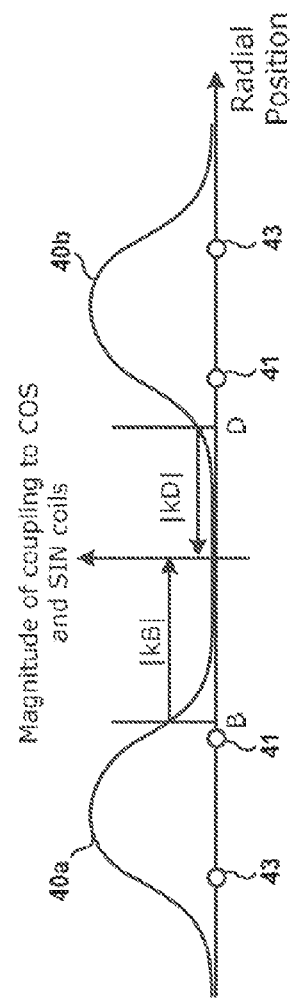
FIG. 5f is a plot illustrating the coupling of target ends B and D for the target position shown in FIG. 5d.

FIGS. 5d and 5e illustrate a different situation where the rotation axis 53 of the shaft 5 has been laterally misaligned relative to the sensor axis 51, for example due to manufacturing tolerance stack-ups and/or vibration. The coupling vectors kA and kC shown in FIG. 5e due to rod ends A and C respectively have both rotated anticlockwise (compared with those shown in FIG. 5b—and included in the plot shown in FIG. 5e in dashed lines). A position sensor based on these contributions alone would register a position error due to the lateral misalignment. However the novel arrangement of the ferrite rods 9 yields compensating contributions from rod ends B and D. The directions of their contributions kB and kD also rotate slightly relative to the sensor axis 51 due to the misalignment. More importantly, however, their relative magnitudes are no longer equal. The magnitude of coupling vector kB, denoted |kB|, increases because rod end B has moved closer to the mid radius of the sensor coils 25, while the magnitude of coupling vector kD, denoted |kD|, reduces because rod end D has moved further away from the sensor coils 25. This is illustrated in FIG. 5f.

The exact dimensions of the sensor coils 25 and the target 7 are designed so that these changes in kB and kD compensate for those in kA and kC, so that the net coupling vector remains in the same direction as the actual angle ($\theta$). The processing electronics 31 connected to the sensor 1 therefore reports the correct angle (within small residual errors), even through the target 7 and sensor board 1 are misaligned.

The approach described above and the one described in WO2008139216 both achieve immunity to lateral misalignment between the target 7 and the sensor 1. However the mechanisms are different, as explained below.

In WO2008139216, the effective angle of the "near end" of the target increased due to a misalignment while the effective angle of the "far end" decreased, or vice versa. The combined angle contributions cancelled to yield immunity to misalignment. The amplitudes of the coupling vector contributions from the near and far ends of the target were similar, otherwise the cancellation would not occur correctly.

In the approach described above, the effective angular error due to a first portion of the target (rod ends A and C taken together) is cancelled by contributions from second and third portions (here rod ends B and D respectively). There is a small change in the angle of the contributions from each of the second and third portions. However these angle changes do not make a significant contribution to the correction. Instead, it is the significant change in the relative amplitudes of the contributions from the second and third portions which yields the correction for lateral misalignment required. In the embodiment above, the change in relative amplitude is due to a change in radial location of each portion relative to the COS and SIN sensor coils 25.

In addition to the benefit of immunity to lateral misalignments, the system described above is also largely immune to angular misalignment of the target 7 relative to the sensor 1. For the sake of explanation, two tilt directions will be defined—yaw angle (in the positive direction) will be defined as tilt such that rod ends A and C move closer to the sensor board 1 and rod ends B and D move further away from the sensor board 1; and pitch angle (in the positive direction) will be defined as tilt such that rod ends A and B move closer to the sensor board and rod ends C and D move further away from the sensor board 1.

Figure 5G:
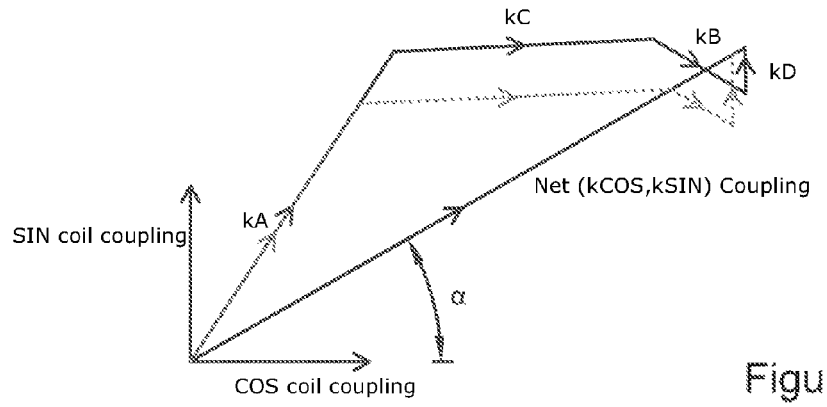
FIG. 5g illustrates coupling vectors obtained for the target position shown in FIG. 5a with and without a pitch angle offset.

FIG. 5g is a plot illustrating the effects of a positive change in the pitch angle. As shown, the magnitudes of vectors kA and kB become larger (as ends A and B are now closer to the sensor board 1), while the magnitudes of vectors kC and kD become smaller (as ends C and D are now further away from the sensor board 1). However, the net coupling remains in the same (kCOS,kSIN) direction as before. The processing electronics 31 connected to the sensor 1 therefore reports the correct rotation angle (within small residual errors), even through the target 7 and sensor 1 are misaligned in the pitch angle direction.

Figure 5H:
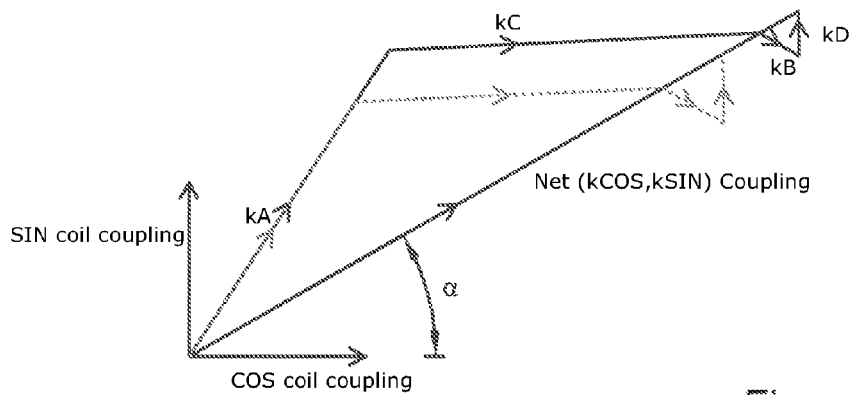
FIG. 5h illustrates coupling vectors obtained for the target position shown in FIG. 5a with and without a yaw angle offset.

FIG. 5h is a plot illustrating the effects of a positive change in the yaw angle. As shown, the magnitudes of vectors kA and kC become larger (as ends A and C are now closer to the sensor board 1), while the magnitudes of vectors kB and kD become smaller (as ends B and D are now further away from the sensor board 1). As a result, the net coupling remains in the same (kCOS,kSIN) direction as before and so the processing electronics 31 report the correct rotation angle as before.

Second Embodiment

In the above embodiment, the sensor coils 25 used were designed to give a sine and cosine response to target angular position, with one revolution of the target 7 corresponding to one cycle of sine and cosine variation. This second embodiment provides a more accurate angular position determination by using sensor coils 25 that have multiple periods of COS/SIN tracks of different pitches arranged around the sensor board 1.

U.S. Pat. No. 6,534,970 describes an inductive sensor having multiple periods of COS/SIN tracks of different pitches used for high accuracy absolute rotary sensing systems, and allowing a shaft to pass through the centre. However the system described in US'970 uses a resonator that has a specially patterned inductor coil. The angular spatial harmonics of this inductor coil are carefully adjusted by the location of conductors within it. Since these conductors require precise location, the system is practically limited to the use of a resonator formed using a PCB. Since the amount of copper on such a PCB is limited, so is the resulting Q-factor when the inductor is made resonant with a capacitor. This limits the detected power from the sensor's output, so that signal to noise suffers. A further limitation of the system described in US'970 is that the moving resonator surrounds the rotating shaft, and can not be mounted onto the shaft from the side. Side mounting is preferable for some applications, for example where a sensor system is retrofitted, or where it can only be mounted from the side for mechanical reasons inherent in the application. This second embodiment aims to address some of these issues with this prior art.

This second embodiment provides a precise angle measurement that, like the sensor of the first embodiment, is relatively immune to lateral and angular misalignment. Furthermore, the moving member comprises a resonant target built from simple components that yield high Q-factor for high signal to noise and therefore high resolution and immunity to interference. The resonant target can also be designed for side mounting since it need not completely surround the rotating axis to be measured.

FIGS. 6a to 6f illustrate the 6 layers of a sensor PCB 1 used to implement the sensor in this second embodiment. Each of these figures illustrates the copper traces on its respective copper layer. The circles mark the location of vias used to make connections to other layers.

Figure 6G:
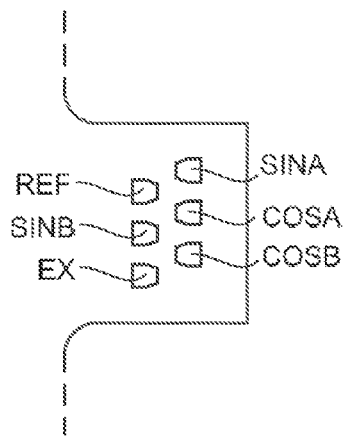
FIG. 6g illustrates connection pads that are made on the PCB for connecting the sensor and excitation coils to excitation and processing circuitry.
Figure 6A:
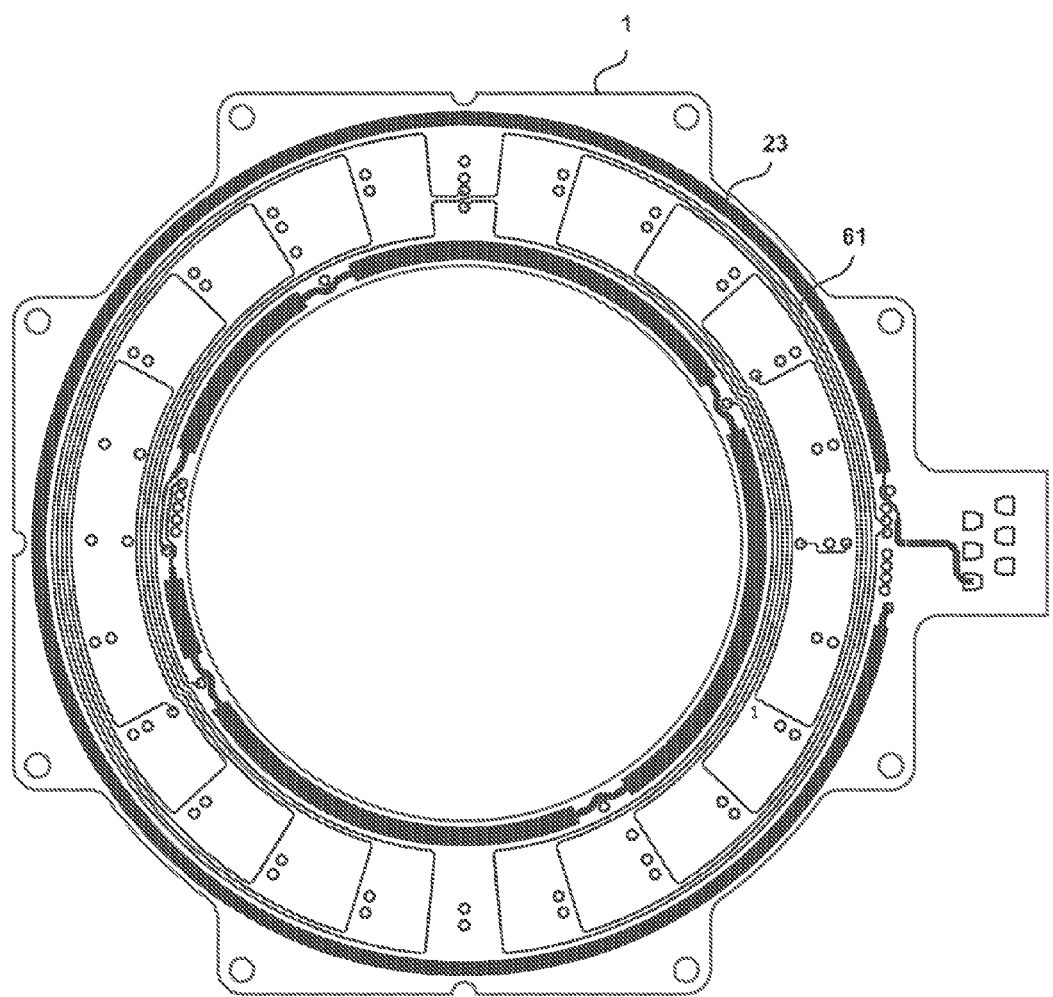
FIG. 6a illustrates a first layer of copper tracks on a printed circuit board (PCB) that form part of sensor and excitation coils.

The copper traces 61 of FIG. 6a form most of a COSB sensor coil 25-1, whose sensitivity to AC magnetic field varies sinusoidally with angle, with one sinusoidal repeat per complete 360° rotation of the target 7. The positive peak in sensitivity occurs for a source of AC field between the sensor coil's outer and inner diameters at the right hand side of the sensor 1 (as drawn). The negative peak occurs at the left hand side (as drawn). The COSB sensor coil 25-1 is completed with a cross connection 62 at the top made on layer 6 (shown in FIG. 6f), and connections to the processing electronics 31 are provided at the right hand side on layers 3 and 4 (shown in FIGS. 6c and 6d).

Figure 6B:
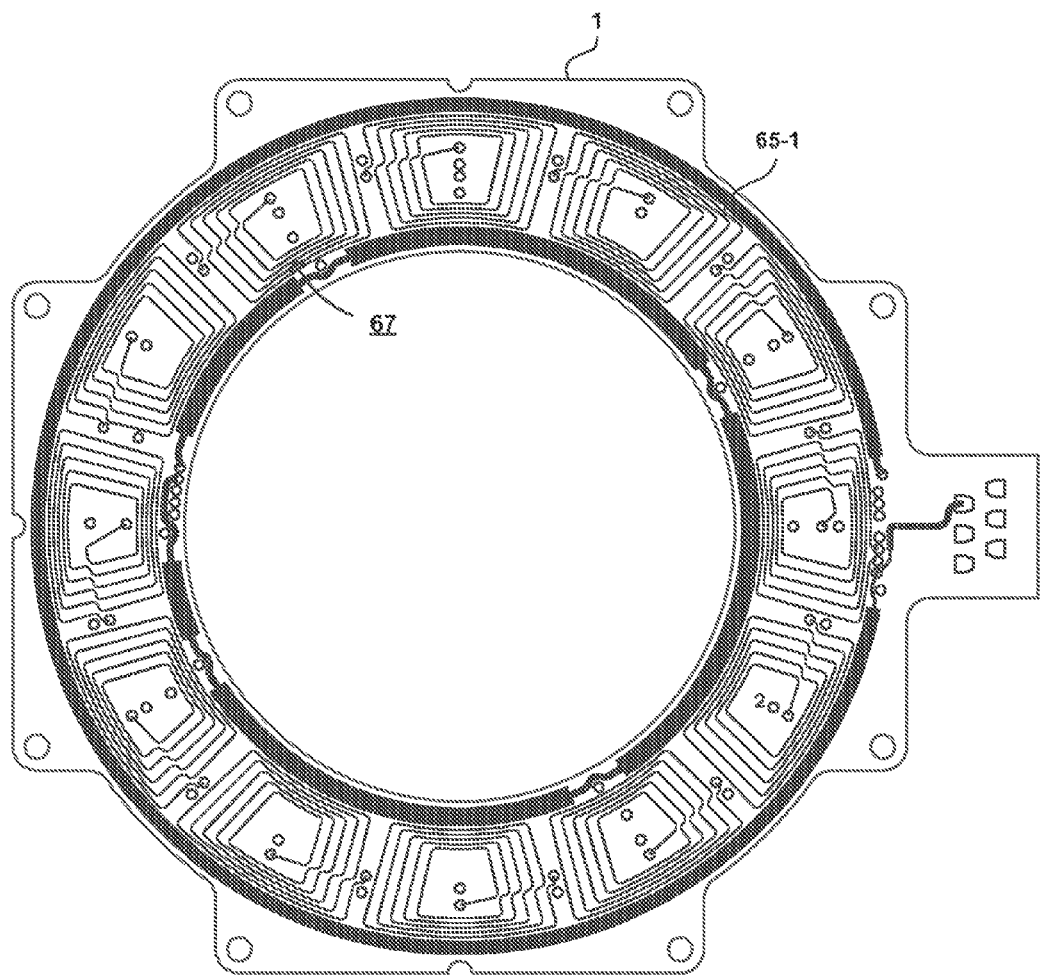
FIG. 6b illustrates a second layer of copper tracks on the PCB that form another part of the sensor and excitation coils.
Figure 6C:
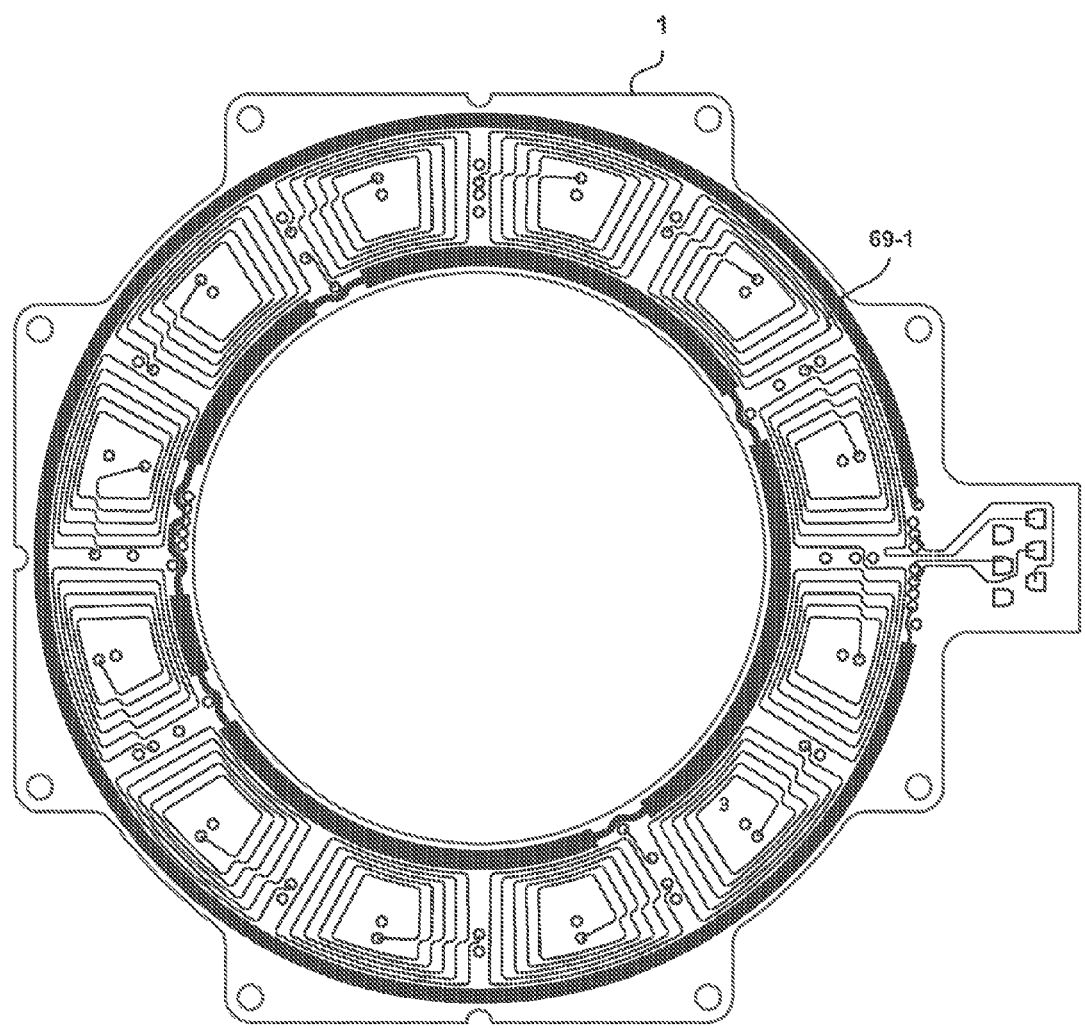
FIG. 6c illustrates a third layer of copper tracks on the PCB that form another part of the sensor and excitation coils.
Figure 6D:
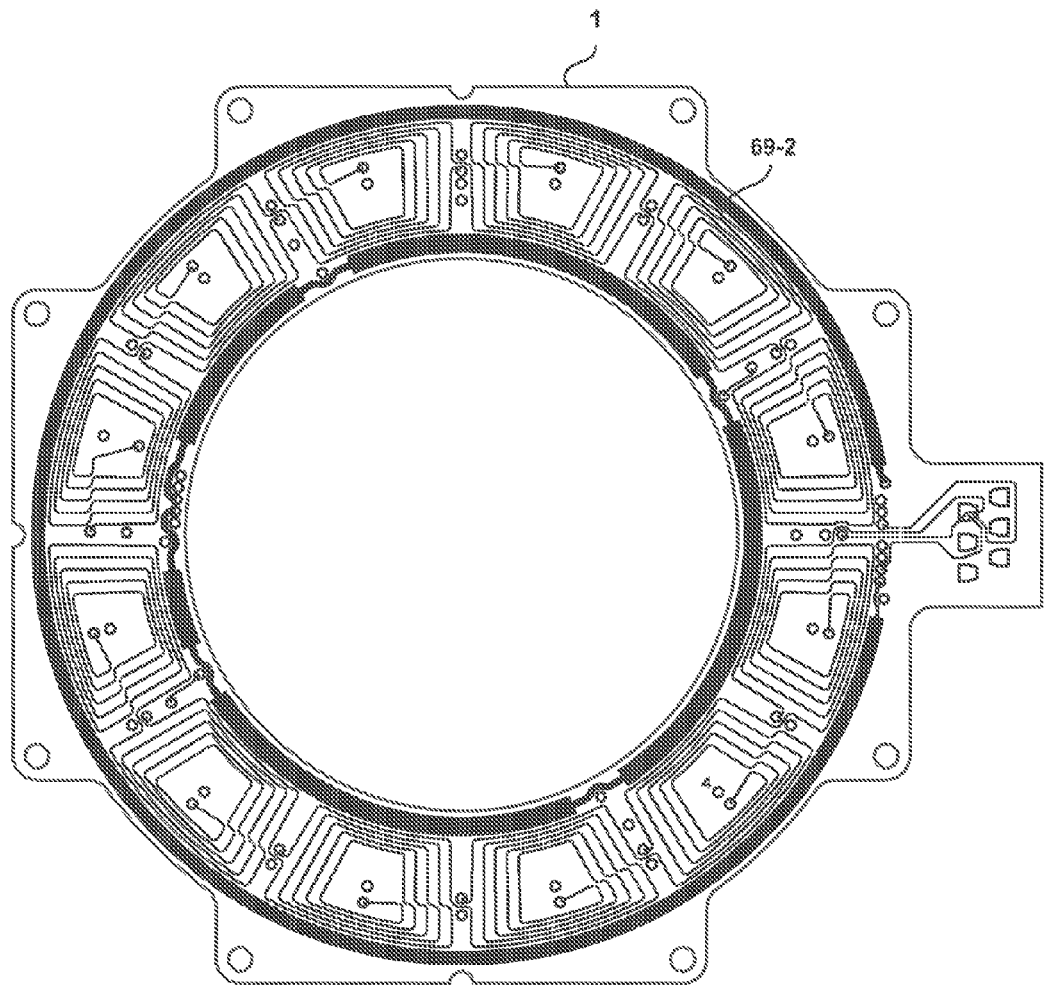
FIG. 6d illustrates a fourth layer of copper tracks on the PCB that form another part of the sensor and excitation coils.
Figure 6E:
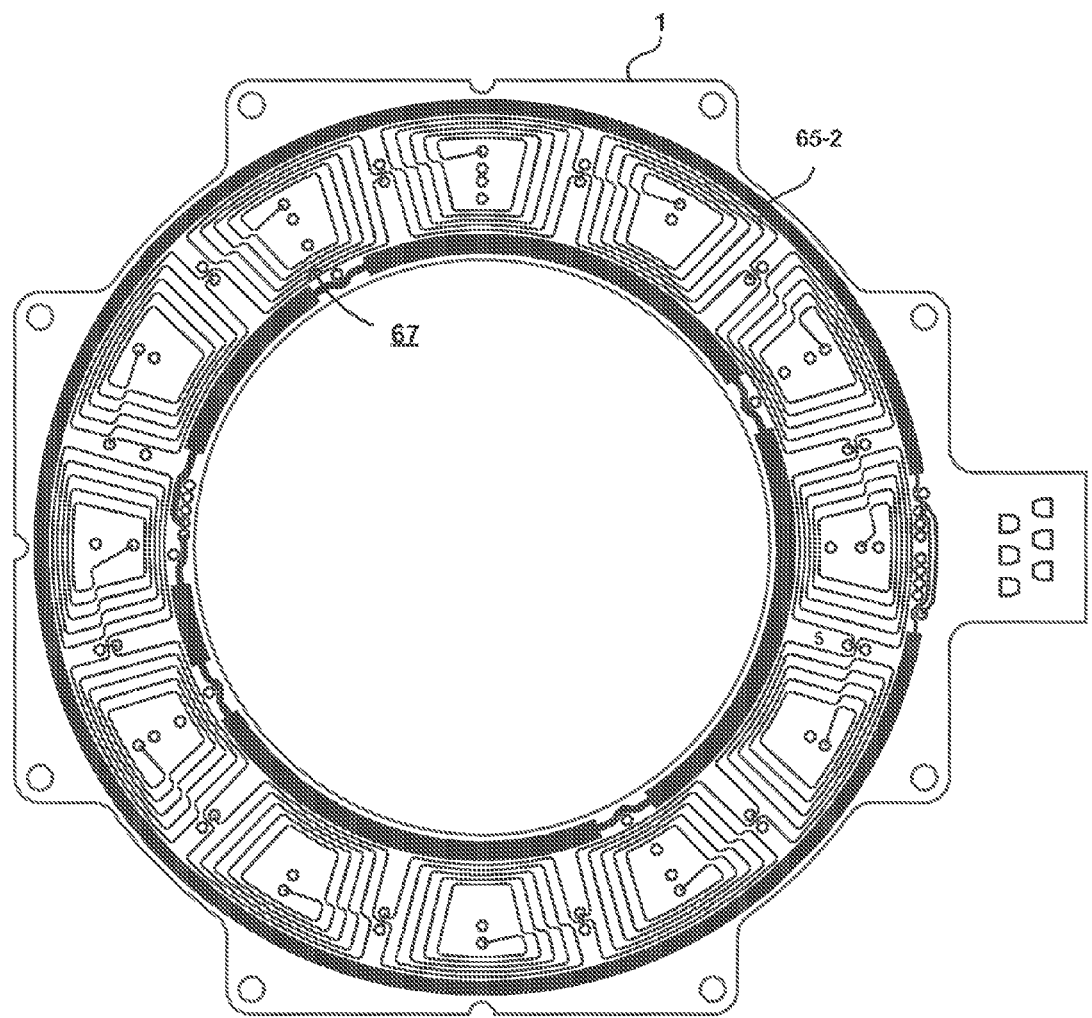
FIG. 6e illustrates a fifth layer of copper tracks on the PCB that form another part of the sensor and excitation coils.
Figure 6F:
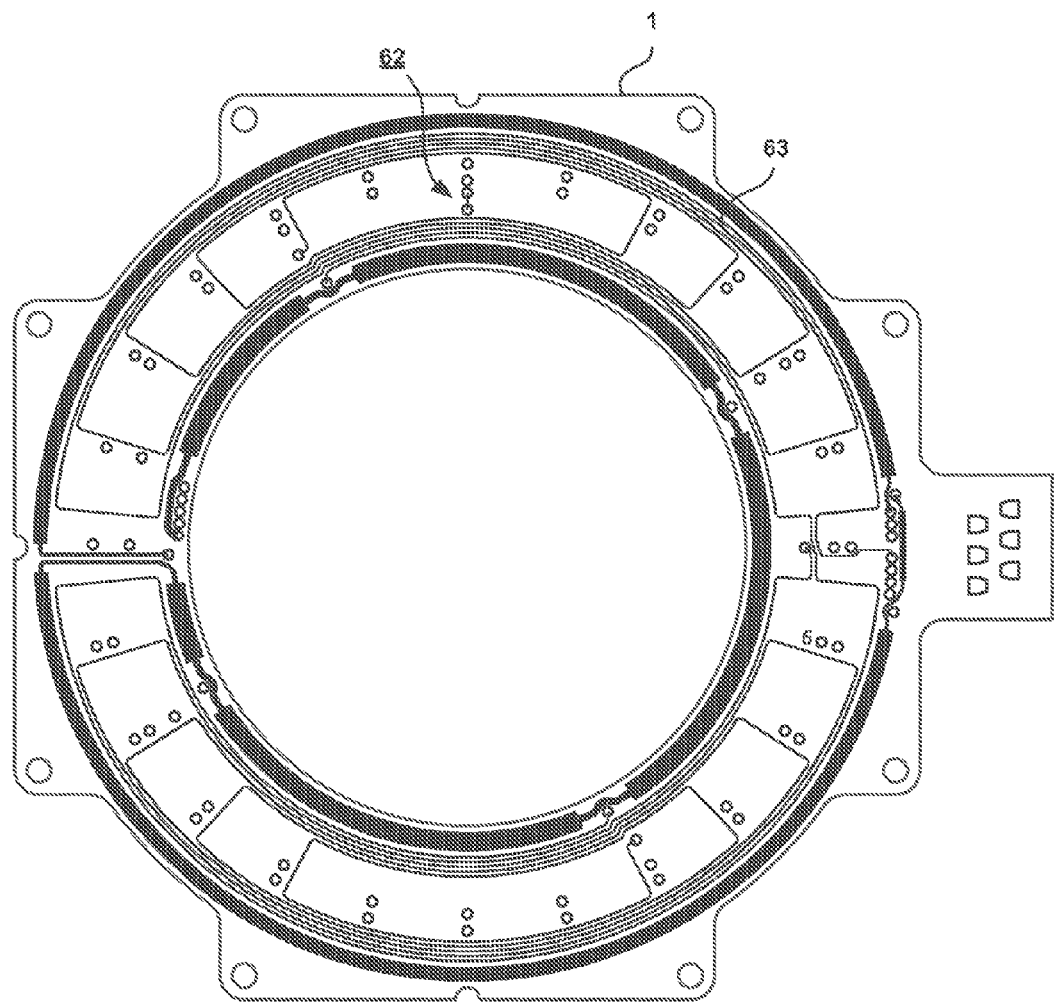
FIG. 6f illustrates a sixth layer of copper tracks on the PCB that form another part of the sensor and excitation coils.

The copper traces 63 of FIG. 6f form most of a SINB coil 25-2, in a similar way to the COSB coil 25-1 on layer 1 but rotated physically by 90°.

A COSA coil 25-3 is formed mainly by the combination of copper traces 65-1 and 65-2 on layers 2 and 5 shown in FIGS. 6b and 6e respectively. The COSA coil 25-3 has 12 "lobes" 67 around a circle, with adjacent lobes 67 connected in the opposite sense ("figure of 8" arrangement) so that its sensitivity to AC magnetic field varies sinusoidally with angle, with six sinusoidal repeats per complete 360° of the target 7.

A SINA coil 25-4 is formed mainly by the combination of copper traces 69-1 and 69-2 on layers 3 and 4 shown in FIGS. 6c and 6d respectively. The SINA coil 25-4 is similar to the COSA coil 25-3 except rotated physically by 15°, such that its inductive coupling is in phase quadrature (90° electrically out of phase) with that of the COSA coil 25-3.

The sensor PCB 1 also includes an excitation coil 23 comprising four turns around the outside perimeter of the sensor coils 25 plus six turns on the inside wound in the opposite sense. This arrangement is designed to generate an excitation field concentrated between the inner and outer radii of the sensor coils 25, with a minimum of field on the outside or inside.

As mentioned above, layers 3 and 4 (shown in FIGS. 6c and 6d) are also used to connect the processing electronics 31 to the sensor coils 25 and the excitation coil 23 mounted on the sensor board 1. All four sensor coils 25 and the excitation coil 23 share a common return (reference or ground) connection. The connection pins used to connect the four sensor coils 25 and the excitation coil 23 to the processing electronics are shown in FIG. 6g.

Figure 7A:
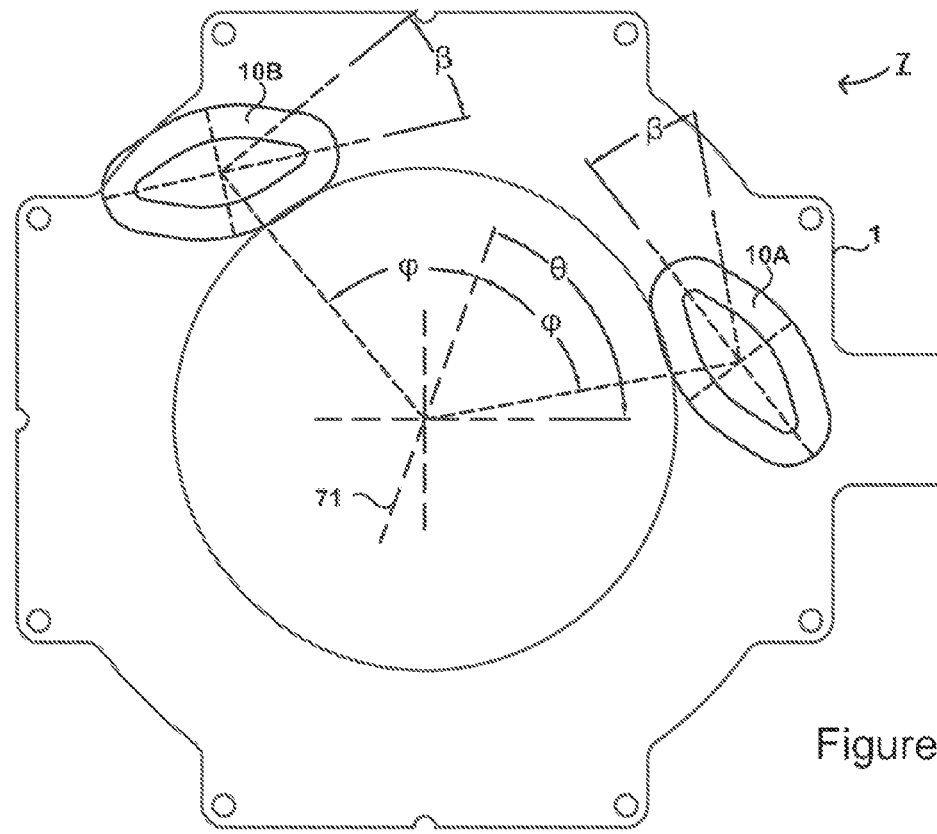
FIG. 7a schematically illustrates an alternative form of target arrangement that uses oval shaped windings.

FIG. 7a illustrates schematically the design of the target 7 used in this embodiment with the sensor PCB 1 shown in FIG. 6. The target 7 comprises two target windings, 10A and 10B. These are connected in series or parallel in the same sense, and the combination is connected in parallel with a capacitor (not shown) to form a resonant circuit. The target windings 10 are generally oval in shape when viewed from above, as shown. In this embodiment, the target coils 10 are relatively thin in the direction parallel to the axis of rotation measurement. As in the first embodiment, the target 7 is mounted to and rotates with the rotatable shaft (not shown); and the two target coils 10 are fixed relative to each other so that their relative positions and orientations do not change as the target 7 rotates with the shaft.

The inductive coupling between the COSA coil 25-3 and the SINA coil 25-4 to each target winding 10, individually, is generally sinusoidal with measured angle, with six repeats per 360° of target rotation. The two target windings 10A and 10B are positioned at an offset angle ($\phi$) either side of the target's axis of symmetry 71. In this embodiment, the offset angle is 60°, so that they are separated by 120° which corresponds to two sinusoidal repeats of the COSA coil 25-3 and of the SINA coil 25-4. As a result of the separation being an integer multiple of the sensor coil repeat, signals induced in the COSA and SINA coils by each target winding 10 reinforces the other, resulting in a beneficial doubling of signal levels relative to a single winding 10 alone. The target windings 10A and 10B are also angled relative to the axis of rotation by an inset angle ($\beta$) which helps to provide immunity to lateral misalignments.

The inductive coupling between the COSB sensor coil 25-1 and each target winding 10A and 10B and between the SINB sensor coil 25-2 and each target winding 10A and 10B, individually, is generally sinusoidal, with one repeat per 360° of rotation of the target 7. In the example shown with an offset angle of 60° and a separation of 120°, the contribution from each target winding 10 does not reinforce the other in the same way as with the COSA and SINA coils. However their combination still yields a net coupling, so that current flowing in the target windings 10 yields an EMF in the COSB and SINB coils 25-1 and 25-2 that varies sinusoidally with the measured angle.

As mentioned above, the sensor coils 25 and the excitation coil 23 are connected to processing electronics 31, for example the applicant's CAM204 chip and its external circuitry. This processing electronics 31 generates an AC current in the excitation coil 23 whose frequency matches the resonant frequency of the resonant target 7. The excitation current is then removed, and the processing electronics 31 detects the EMF induced in the COSA, SINA, COSB and SINB coils by the target 7. The processing electronics 31 calculates a "fine" position from the signals obtained from the COSA and SINA coils 25-3 and 25-4, and "coarse" position from the COSB and SINB coils 25-1 and 25-2. The fine position is accurate and high resolution but is not absolute (as the sensor signals repeat every 60° of target rotation), while the coarse position is absolute but not accurate. The processing electronics 31 uses the coarse position measurement to resolve the period ambiguity problem with the fine position measurement, to yield an accurate figure for absolute position which it reports to a host device or host software.

Offset Immunity

The arrangement of target windings 10 illustrated in FIG. 7a yields immunity to lateral and angular misalignments between the target 7 and the sensor axes, the origins of which will now be explained.

Figure 7B:
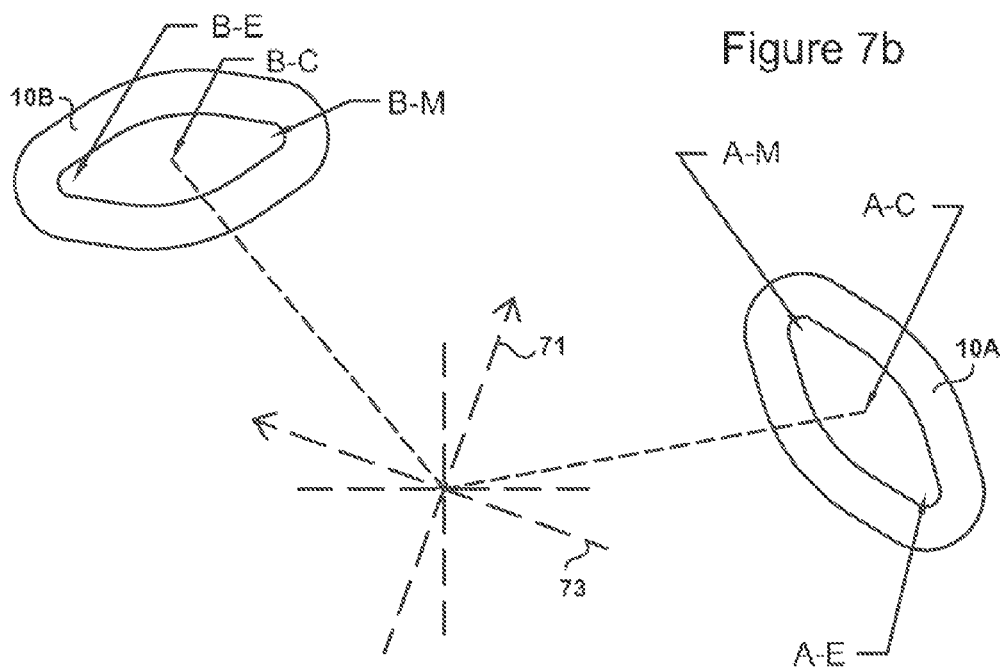

FIG. 7b shows the two target windings 10A and 10B and labels three locations on each target winding. Locations A-C and B-C are in the centre of the respective target winding 10 and represent the effective location of the bulk of the coupling between that winding 10 and the sensor coils 25. Locations A-E and B-E represent a portion of the respective target winding 10 that couples with the exterior circumference of the sensor coils 25; and locations A-M and B-M represent a portion of the respective target winding 10 that couples with the portion of each sensor coil 25 towards the middle of the sensor PCB 1. FIG. 7b also illustrates the target's symmetry axis 71 and the target's cross axis 73, for ease of explanation below.

Small lateral misalignments between the target 7 and the sensor board 1 along the target's symmetry axis 71, or small angular misalignments about the target's cross axis 73, do not induce significant errors in the system's measurement of either fine or coarse position. This immunity arises out of the symmetry of the target arrangement: angular changes due to movement of target winding 10A are equal and opposite to those of target winding 10B.

Small lateral misalignments in the target's cross axis direction are not corrected in the same way, because the centre of both target winding 10A and target winding 10B experience an angular deviation in the same direction. Instead, the immunity arises from the shape of the target windings 10. To illustrate this effect, we consider the contribution that individual portions of each target winding 10 makes to the measurement of fine position. Fine position will be discussed in terms of the spatial phase angle ($\alpha$)—which is the angle formed by the coupling factor vector (kCOSA, kSINA), which in this case is six times the measured angle because the COSA and SINA coils 25-3 and 25-4 repeat six times per revolution of the target 7.

Figure 8A:
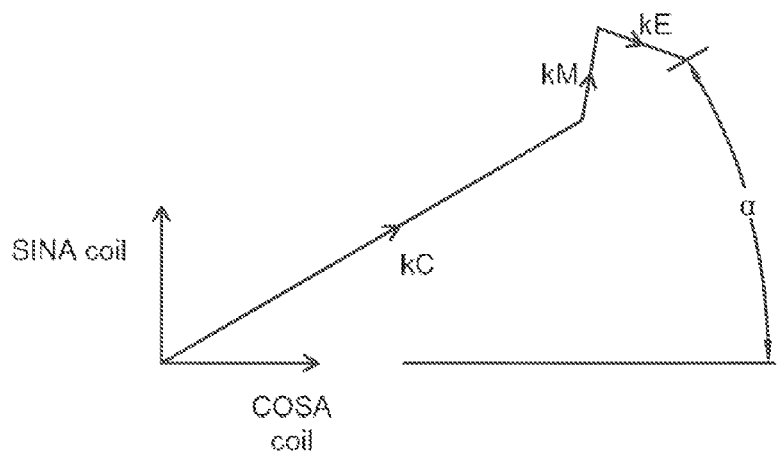
FIG. 8a is a plot of coupling vectors for the target shown in FIG. 7 when there is no misalignment between the sensor axis and the target axis.

FIG. 8a illustrates the contributions made by target winding 10A to the coupling factor between the target 7 and each of the fine sensor coils, COSA and SINA. These contributions are shown plotted SINA against COSA, so that the angle they form with the COSA axis represents the spatial phase angle. FIG. 8a illustrates the situation with no lateral misalignment. Coupling vector kC represents the coupling contribution from location A-C of target winding 10A. Coupling vectors kM and kE represent the contributions from locations A-M and A-E of target winding 10A respectively. Coupling vectors kM and kE are smaller in magnitude than coupling vector kC because they represent coupling factors from smaller areas of the target winding 10, and they are closer to the sensor coils' inner and outer radii respectively. The angle of coupling vector kM relative to the COSA axis is greater than the angle of kC because location A-M (towards the inside of the target winding 10A) is more anticlockwise than location A-C. The angle of kE relative to the COSA axis is less than the angle of kC because location A-E (towards the exterior of target winding 10A) is more clockwise than location A-C. Target winding 10A is designed such that coupling vectors kE and kM have approximately the same magnitude and have approximately equal and opposite relative angles to kC when the target and sensor axes are perfectly aligned. The net result is that the contribution made by kE plus kM is in the same direction as kC, as shown in FIG. 8a.

Figure 8B:
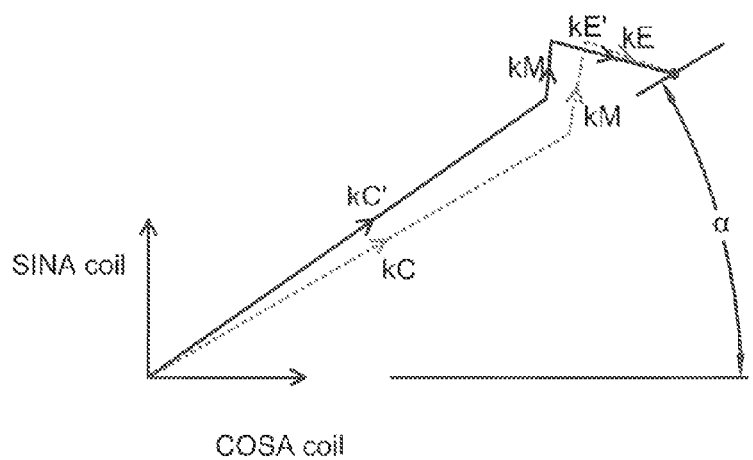
FIG. 8b is a plot of coupling vectors for the sensor illustrated in FIG. 7 when there is a misalignment between the sensor axis and the target axis.
Figure 8C:
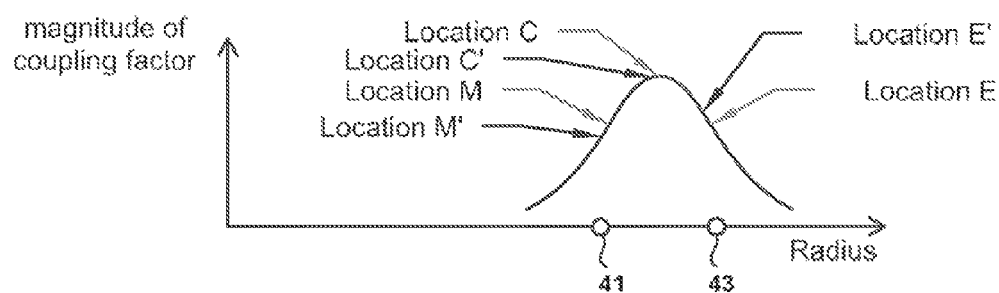
FIG. 8c is a plot illustrating the way in which the magnitude of the coupling factor between different portions of the target winding varies with radial position.

FIG. 8b illustrates the case where the target 7 has been misaligned to the left (as drawn) in the target cross axis direction 73, so that the new contributions made by the same portions of the target winding 10A (at locations A-C, A-E and A-M) are coupling vectors kC', kE' and kM' respectively. The angle of coupling vector kC' is larger than that of coupling vector kC due to the misalignment. The magnitude of coupling vector kC' is similar to that of coupling vector kC, because location A-C is near the mid radius of the sensor coils 25—where there is less sensitivity to radial movement. The angles of coupling vectors kE' and kM' are both rotated in a similar way to kC' due to the misalignment. However, critically, the magnitude of coupling vector kM' decreases relative to coupling vector kM and coupling vector kE' increases relative to coupling vector kE. This happens because displacement to the left in the target cross axis direction moves location A-M away from the mid radius of the sensor coils 25 and moves location A-E towards the mid radius of the sensor coils 25 (since location A-M is already on the inner radius 41 of the sensor coils 25 and location A-E is already on the outer radius 43 of the sensor coils 25). The dependence of coupling magnitude to radius position is illustrated in FIG. 8c. As shown in FIG. 8b, the net result of the changes in angle and magnitude of the individual coupling vectors kC', kM' and kE' is a (COSA,SINA) vector whose spatial phase angle ($\alpha$) is largely unchanged relative to the case where there is no misalignment.

The same reasoning applies to target winding 10B. In this case a misalignment to the left in the target cross axis direction also results in an increase in the spatial phase angle of location B-C, which is compensated for by an increase in the magnitude of coupling vector kM (as location B-M moves closer to the sensor windings 25) and a decrease in the magnitude of coupling vector kE (as location B-E moves away from the sensor windings 25).

The spatial phase angle ($\alpha$), and hence fine position (and position reported to the host) is therefore substantially unchanged as a result of misalignment in the target cross axis direction.

The final misalignment to consider is angular misalignment about the target's symmetry axis 71. If such a misalignment causes the gap between the target winding 10A and the sensor windings 25 to get smaller, then the gap between the target winding 10B and the sensor windings 25 will get bigger. Changes in gap between the target 7 and the sensor board 1 causes a change in the coupling magnitudes. However the ratio of SIN to COS coupling remain unchanged. Thus the contributions that each winding 10 makes to the spatial phase angle ($\alpha$) will remain unchanged, because the location of each winding 10 remains substantially the same. Once again fine position and hence reported position remain substantially unchanged.

Note that lateral and angular misalignments between the target 7 and the sensor board 1 may cause an error in coarse position measurement. However these do not affect the reported position, provided the amount of misalignment is not grossly excessive so that the system determines absolute position to be in error by more than a full period of fine position, 60° in this embodiment.

The discussion above illustrates how this embodiment achieves immunity to lateral and angular misalignment. A further aspect of this embodiment is the possibility to attach a target 7 to a rotatable member for angular measurement without the target having to pass through the rotation axis. In particular, as those skilled in the art will appreciate, the target windings 10 of FIG. 7 can be mounted from the side, because the target windings 10 are only required on one side of the target 7.

Alternatives

As those skilled in the art will appreciate, a number of modifications and alternatives can be made to the above first and second embodiments whilst still benefiting from the inventions embodied therein. A few of these alternatives will now be described.

Figure 9:
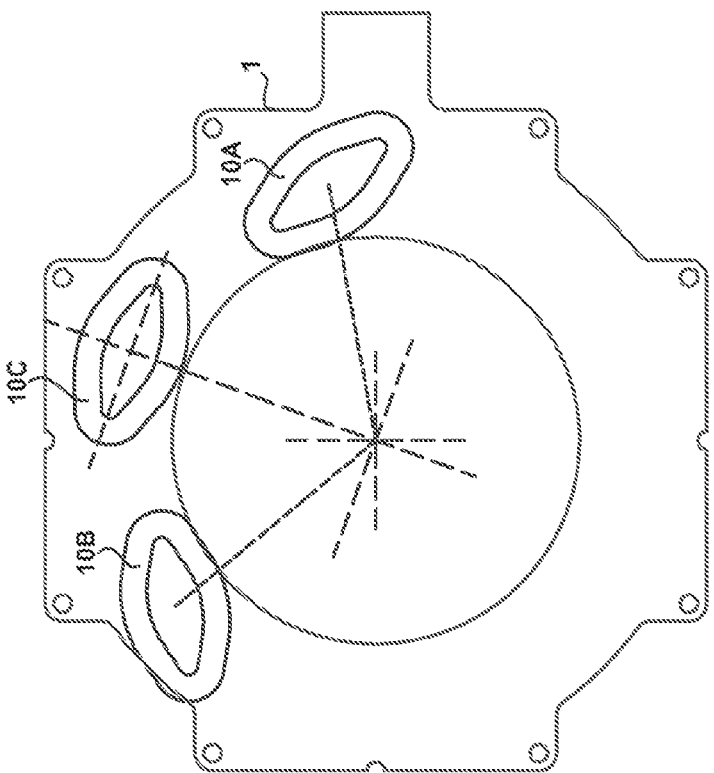
FIG. 9 illustrates an alternative target arrangement to that shown in FIG. 7, comprising three oval shaped coils.

The system described in the above embodiments used two windings 10 mounted on the target 7. A different number of windings may be used, for example three as shown in FIG. 9. In this case the target windings 10A and 10B are similar to those used in the second embodiment and positioned 60° apart so that their couplings to the COSA and SINA coils reinforce each other. The new target winding 10C does not itself contribute to immunity to misalignment in the target cross axis direction 73; it actually yields a net positive error in the spatial phase angle ($\alpha$). Instead, target windings 10A and 10B are designed to compensate for this error, for example by making the contributions from locations A-M and A-E greater (and from B-M and B-E), so they correct for the movement of location A-C (and B-C) and correct for the movement of the whole of target winding 10C.

Figure 10:
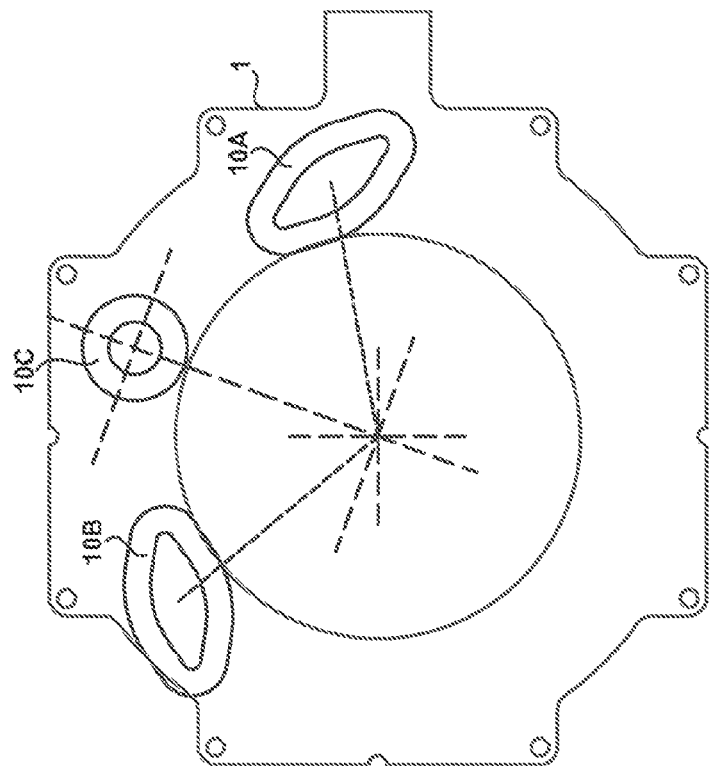
FIG. 10 illustrates a further alternative in which a third winding is circular rather than oval.

Since target winding 10C does not perform a correcting action for misalignment in the target cross axis direction, it need not have the same shape as target coils 10A and 10B. It may for example be circular as shown in FIG. 10.

Figure 11B:
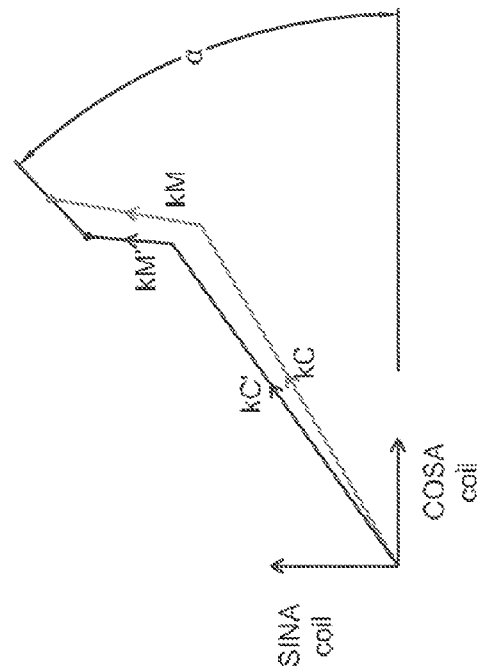
FIG. 11b is a plot showing magnetic coupling vectors with and without misalignment between the sensor board axis and the target axis.
Figure 11A:
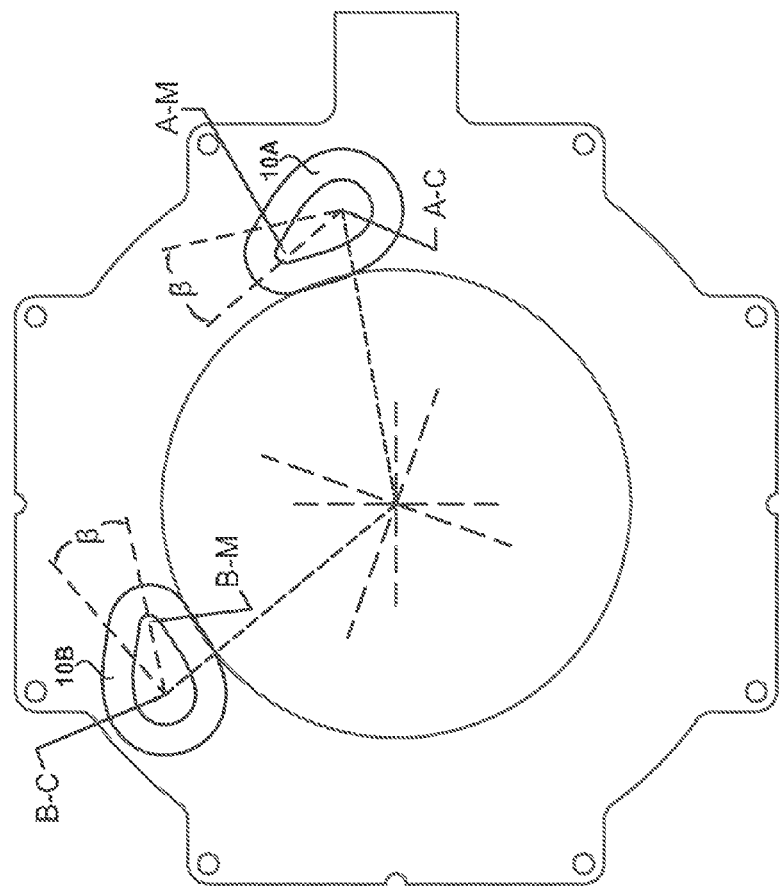
FIG. 11a illustrates a further alternative arrangement of target that uses egg shaped windings.

The target 7 described in the second embodiment used generally oval windings 10, having a central location C and extremes E and M. However there is considerable freedom to vary the shape of the target windings 10 and still achieve the misalignment immunity described above. FIG. 11a illustrates an alternative, egg shaped, form for the target windings 10. Like the original oval shape, each individual winding, 10A or 10B, remains asymmetric such that the shape can never be replicated by reflection about any chosen plane parallel to the rotation axis. The egg shaped target windings 10 illustrated do not have a location A-E or B-E to compensate for misalignment together with locations A-M and B-M. As shown in FIG. 11b, misalignment of target winding 10A to the left causes a rotation in both kC and kM as before. However the magnitude of kM is reduced due to location M moving away from the sensor coils 25, and the exact shape of the winding 10A and its inset angle ($\beta$) are designed so that the net angle (COSA, SINA) remains unchanged, as shown.

The target windings 10 used in the second embodiment are all wound in the same direction. However the winding directions may be varied, provided there remains a net non-zero coupling between the target windings 10 and the excitation coil 23, and between the target windings 10 and each set of the sensor coils 25.

The second embodiment described above used fine sensor coils 25-3 and 25-4 that had six repeats per revolution of the target 7. A similar design approach may be applied to any number of repeats. Similarly, the coarse sensor coils 25-1 and 25-2 had one repeat per revolution of the target 7. The same approach may be modified to work with a different number, for example with sensor coils 25 that have five repeats per revolution of the target. The combination of six period fine sensor coils and five period coarse sensor coils can be used to determine full absolute position in a similar way to the above six period fine and one period coarse arrangement described above. Absolute position is determined by the spatial phase difference measured between the fine and coarse sensor coils.

The target windings used in the second embodiment were built from air cored coils. The same design approach also works for coils having magnetically permeable cores, for example used for flux concentration, shaping and/or for screening purposes.

The first embodiment described above used a sensor having a single COS/SIN period around its circumference. It is equally applicable to sensors having multiple periods, or sensors having multiple sets of COS/SIN tracks of different periods used for high accuracy absolute systems, or a different number of copper layers. The exact dimensions of the target and the locations of the magnetic members would be changed for optimum immunity to lateral misalignment. However the underlying principles remain the same.

The embodiments described above used COS/SIN coil pairs: a 2-phase arrangement. It is equally applicable to use multi-phase coils, for example a 3-phase (a,b,c) arrangement illustrated in WO2008139216.

The sensor boards described in the above embodiments used sensor coils that span a full 360° of rotation. The coils may instead span a smaller angular range to provide an "arc" sensor. In order for the correction for lateral misalignment to remain effective, there should always be sensor coils under each part of the target windings/rods.

The sensor systems described above used a resonant target powered from an excitation coil on the sensor PCB. The exact form of the excitation coil is not important, provided that it powers the resonator across the angular angles of interest. Alternatively, current may be directly driven into the target's windings by processing electronics, for example by wires or slip rings. Alternatively still, the target 7 may be self powered and may directly generate a target magnetic field.

Figure 12:
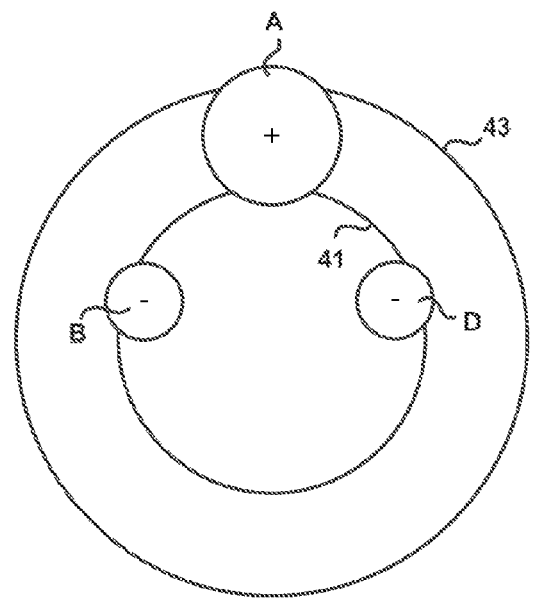
FIG. 12 schematically illustrates a further alternative arrangement of windings that may be used as part of the target.

The first embodiment described above had a target built from wound ferrite rods. These could equally be built from other magnetic materials, for example iron powder. Further, the use of magnetic materials may be avoided altogether by using air cored coils, for example as illustrated in FIG. 12. In this case, the target 7 comprises 3 windings: A, B and D, connected in series. As represented by the "+" and "−" signs, windings B and D are wound in the opposite sense to winding A, and provide the above described compensation for lateral misalignment. As in the first embodiment detailed above, radial misalignment causes the relative coupling between the sensor coils 25 and the target windings B and D to change, and correct for angular changes of target winding A.

Figure 13:
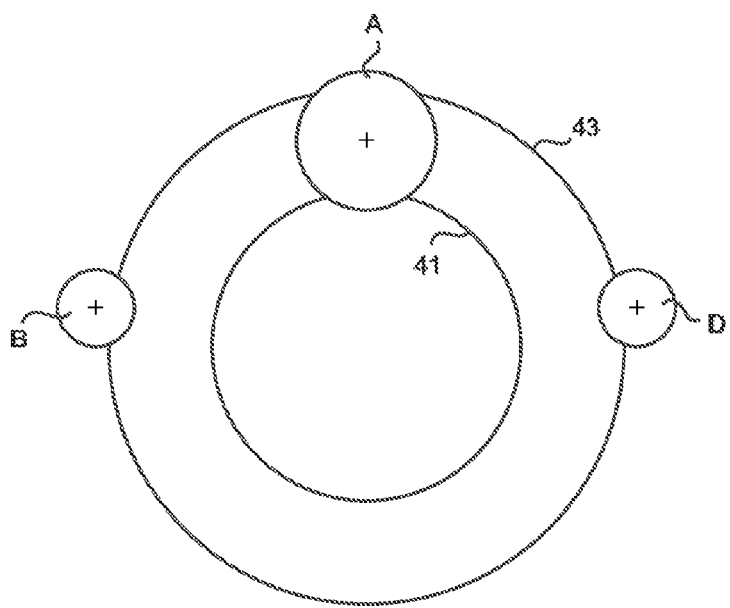
FIG. 13 illustrates the form of a further arrangement of coils that may be used for the target.

A further alternative arrangement is illustrated in FIG. 13, which is similar to FIG. 12, except that all three target windings are wound in the same direction, and windings B and D are now at the outer radius 43 of the sensor coils instead of the inner radius 41. These changes mean that the correcting signals remain in the correct direction. This is because, for a radial displacement in the same direction as FIG. 5d, the magnitude of coupling vector kB becomes larger than the magnitude of coupling vector kD as required. The disadvantage of this alternative is that the system is no longer immune to changes in pitch angle.

The target 7 illustrated in FIG. 12 or 13 had second and third portions located very roughly +110° and −110° from the centre of the first portion measured about the sensor axis 51. The correcting mechanism can work at a wide range of angles, provided they are sufficiently far from 0° and 180°.

Figure 14:
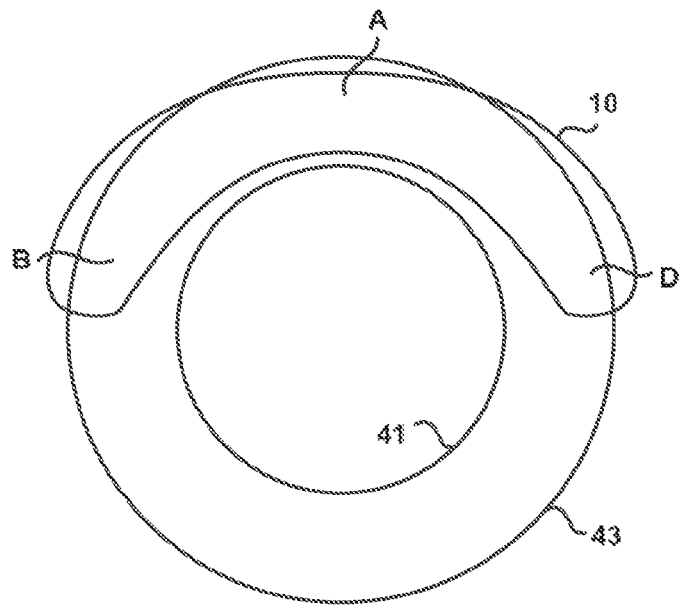
FIG. 14 illustrates a banana shaped target coil that may be used in a further alternative.

The alternative illustrated in FIG. 14 is similar to the alternative shown in FIG. 13, except that it replaces the 3 separate windings A, B and D with a single banana shaped winding 10 having portions A, B and D in similar locations to windings A, B and D in FIG. 13. The exact shape and location of the banana coil 10 is determined to yield the same correcting effect as above. Portions B and D correct for lateral misalignment of the main portion A. The portions are not so distinct as before, but perform the same underlying task.

Figure 15:
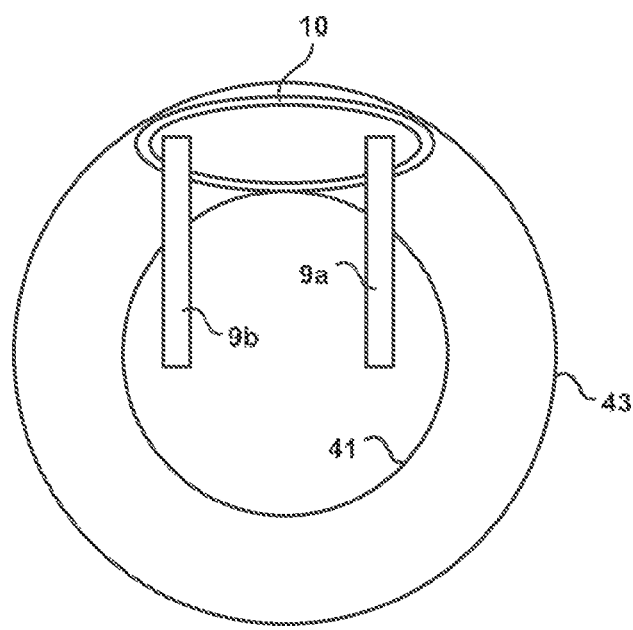
FIG. 15 illustrates a hybrid target arrangement that has a coil and first and second ferrite rods.

The embodiments described above use targets with either wound ferrite rods or air cored windings. A hybrid approach is illustrated in FIG. 15. The first portion of the target 7 yielding the majority of the coupling to the sensor coils 25 is formed by the emitting area of the winding 10 plus fields concentrated at ferrite rod ends A and C. Ferrite rod ends B and D emit field in the opposite direction and compensate for lateral offsets in the same manner as described above.

Third Embodiment

The first embodiment described above included a sensor 1 built from a PCB and operated with a target 7 comprising dual wound ferrite rods 9. A drawback of this embodiment is the requirement for the rotating shaft to pass through the sensor PCB 1. This means that the sensor can only be positioned for measuring shaft angle by removing the shaft and placing it through the hole 3 in the sensor PCB 1. Similarly, the sensor PCB 1 could only be removed by also removing the shaft 5. A similar difficulty is encountered if wires need to pass through the middle of the sensor PCB, for example in applications such as pan axis feedback in a motorised surveillance camera.

This third embodiment uses a sensor and target that can both be mounted onto a continuous shaft without the need to mount either the sensor or the target through the shaft. Similarly, wires may pass through the rotation axis monitored by the sensor, and the sensor may be removed from the side without having to remove the wires.

Figure 16:
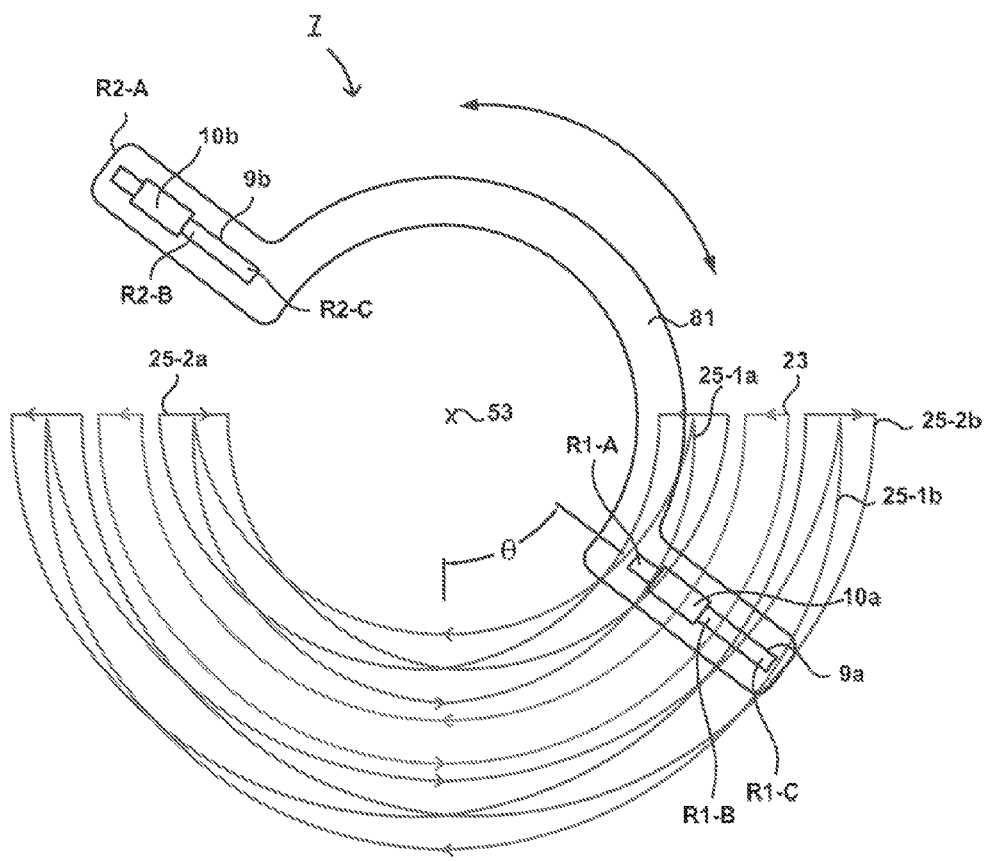
FIG. 16 schematically illustrates excitation and sensor coils and a further target arrangement that interact with the coils to provide 360° angular position sensing.

FIG. 16 schematically illustrates the form of a "C" shaped target 7 used in this embodiment. Although not illustrated for clarity, the target 7 is mounted for rotation with the rotatable shaft. The target 7 comprises a yoke 81 or other supporting means that holds two wound ferrite rods 9 on opposing sides of the target rotation axis 53. Each ferrite rod 9 has a respective winding 10a and 10b wound thereon and the two windings 10a and 10b are connected in series with each other and a capacitor (not shown) to form a resonant circuit, as in the first embodiment. The relative connection polarity of the two windings 10 is such that when a current passes through them both, the magnetic field in ferrite rods 9 at locations R1-C and R2-C have the same polarity that is opposite to the magnetic field polarity at locations R1-A and R2-A.

FIG. 16 also schematically shows sensor coils 25 and an excitation coil 23, which would be mounted onto a support (not shown). The target 7 and its yoke 81 are shown transparent to illustrate the sensor patterns underneath. The sensor coils 25 and the excitation coil 23 are typically manufactured using conductors printed onto one or more layers of a PCB, but they may be formed from separate wire conductors if desired. In this embodiment there are two sensor coils: a COS coil 25-1 and a SIN coil 25-2. The COS coil 25-1 includes an inner portion 25-1a and an outer portion 25-1b that are connected in series, with the winding directions indicated by the arrows—that is with the winding directions reversed between the inner portion 25-1a and the outer portion 25-1b. Similarly, the SIN coil 25-2 also includes an inner portion 25-2a and an outer portion 25-2b that are connected in series and with the winding directions reversed between the inner and outer portions. The excitation coil 23 is formed in an arc between the inner and outer portions of the sensor coils 25. Connections (not shown) to each sensor coil 25 and to the excitation coil 23 are made to the processing electronics 31.

The processing electronics 31 has the same general architecture as shown in FIG. 3b. In operation, the processing electronics 31 drives current into the excitation coil 23 to energise the resonant target 7 and detects the signals from the resonant target 7 in the two sensor coils 25-1 and 25-2. The excitation preferably comprises a number of cycles of AC current, with the frequency matching that of the resonant target 7 so as to efficiently drive it to oscillation at its resonant frequency. The detection process preferably integrates a number of cycles' worth of EMF from the resonant target 7, with the beginning of detection being shortly after the end of excitation so that there is minimum influence of parasitic coupling directly from the excitation coil 23 to the sensor coils 25. The processing electronics 31 then takes the resulting COS and SIN amplitudes and calculates position from them using an A TAN 2 (arctangent) function.

As those skilled in the art will appreciate, the placement of the wound ferrite rods 9 in this embodiment allows them to be mounted to a rotating shaft or other rotating member without a portion of the target 7 or its support having to pass through the rotation axis. Similarly, the arrangement of sensor coils 25 and excitation coil 23 allows their supporting member to be formed into a C shape which also does not have to pass through the rotation axis for mounting.

The target 7 is free to rotate over a full 360°. When the target angle (θ) is within approximately 80° of 0° (shown as being at the "6 o'clock" position as drawn in FIG. 16), only ferrite rod 9a couples with the sensor coils 25 and the excitation coil 23; and when target angle (θ) is within approximately 80° of 180° only ferrite rod 9b couples with the sensor coils 25 and the excitation coil 23. In the remaining regions, both ferrite rods 9 couple with the sensor coils 25 and the excitation coil 23, to a degree that varies with angle (θ).

In the ferrite rod 9a only state, the magnetic field from the excitation coil 23 enters the ferrite rod in the vicinity of location R1-B, which forces the resonant target 7 to resonate producing its own magnetic field that is in phase at locations R1-B and R1-C, and out of phase at location R1-A. The magnetic field generated by the target 7 at location R1-A couples into the inner portion of the COS coil 25-1a and the inner portion of the SIN coil 25-2a; and the magnetic field generated by the target 7 at location R1-C couples into the outer portion of the COS coil 25-1b and the outer portion of the SIN coil 25-2b. As the inner and outer portions of the COS and SIN coils 25 are wound in opposite directions and as the polarity of the target magnetic field is opposite at the two ends of the ferrite rod 9, the resulting EMF induced in each COS/SIN coil 25 includes contributions from both inner and outer portions which reinforce each other. The amplitude of the EMF induced in the COS coil 25-1 is a positive maximum at a target angle 0°, and tends towards zero at +90° and −90°. The COS coil portions 25-1 are designed for sinusoidal variation of signal with angle, so that the amplitude of the EMF has the form:

$$\text{COS coil amplitude} = A_0 \cos(\theta) \qquad \text{Equation 1}$$

... in the region in question. The amplitude of the EMF induced in the SIN coil 25-2 is zero at a target angle 0°, and tends towards a maximum value at +90° and −90°. The SIN coil portions 25-2 are designed for sinusoidal variation of signal with angle, so that the amplitude of the EMF has the form:

$$\text{SIN coil amplitude} = A_0 \sin(\theta) \qquad \text{Equation 2}$$

... in the same region.

In the ferrite rod 9b only state, the resonant target is forced to resonate as before, but since location R2-C is now on the inside and location R2-A on the outside, the polarity of the signals induced in the COS and SIN coils are equal and opposite to those for the ferrite rod 9a only state, given the same ferrite rod positions. This is the desired result because ferrite rod 9b is actually 180° rotated from ferrite rod 9a. The equations relating sensor coil amplitude to target angle in this region are therefore ...

$$\text{COS coil amplitude} = -A_0 \cos(\theta + 180°) = A_0 \cos(\theta) \qquad \text{Equation 3}$$

$$\text{SIN coil amplitude} = -A_0 \sin(\theta + 180°) = A_0 \sin(\theta) \qquad \text{Equation 4}$$

These are the same as for the ferrite rod 9a only state.

When the target angle (θ) is such that both ferrite rods 9 couple to the sensor coils 25 and the excitation coil 23, the signals detected in the sensor coils are the sum of the two contributions. At 90° and −90° their contributions are equal by symmetry. When the target angle (θ) is less than 90° and more than −90° ferrite rod 9a is closer to the sensor and excitation coils and makes a larger contribution than ferrite rod 9b, and when the target angle (θ) is greater than 90° or less than −90° ferrite rod 9b makes the larger contribution. In all cases, though, the amplitude of the EMF detected in the COS and SIN coils 25 remains of the form in Equation 1 and Equation 2 respectively. The electronic processing circuit can therefore determine the target angle (θ) from the calculation:

$$\theta = a\tan 2(\text{COS coil amplitude}, \text{SIN coil amplitude}) \qquad \text{Equation 5}$$

This is the standard form of calculation required for a sinusoidally patterned resonant inductive sensor, so a standard processing chip developed for such resonant inductive sensors can be used, without any modification, with this novel sensor arrangement.

Alternatives

As those skilled in the art will appreciate, a number of modifications and alternatives can be made to the above third embodiment whilst still benefiting from the inventions embodied therein. A few of these alternatives will now be described.

Figure 17:
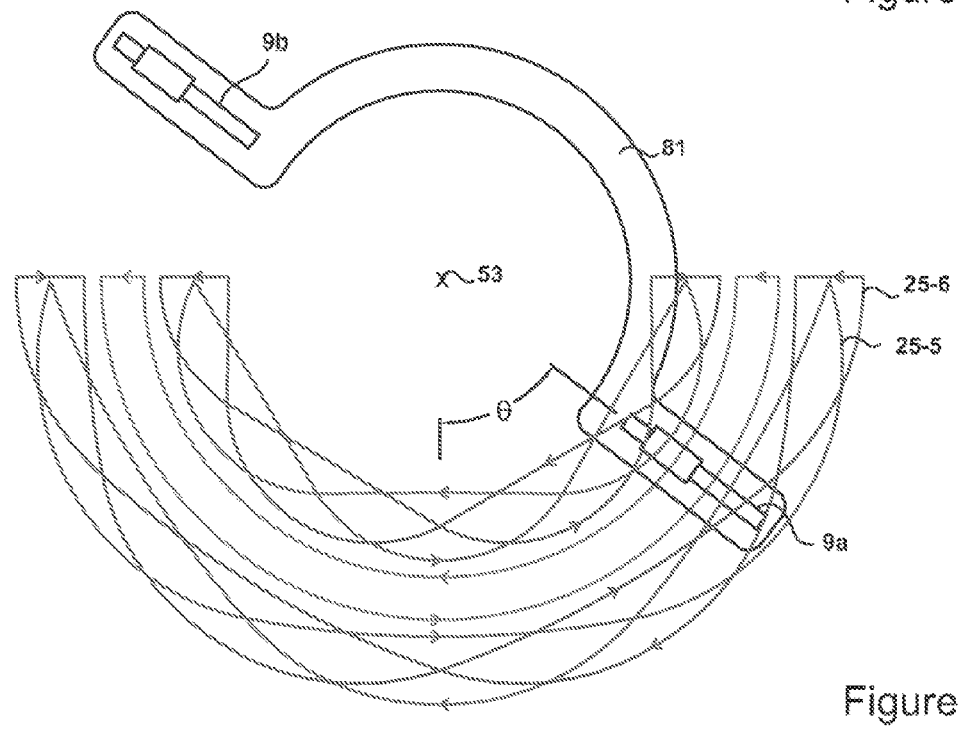
FIG. 17 illustrates an alternative arrangement to that shown in FIG. 16, that uses multi-period sensor coils.

The COS and SIN sensor coils of FIG. 16 yield a single period of sinusoidal variation of their outputs for a full 360° physical rotation of the target 7. As discussed in the earlier embodiments, sensor coils 25 may also be patterned to yield multiple periods of sinusoidal variation. In this case, however, since the magnetic fields from the two ferrite rods 9 placed 180° apart are equal and opposite, if the ferrite rods 9 both couple to the sensor their signals will only reinforce one another when the number of sinusoidal repeats is an odd integer. FIG. 17 illustrates possible patterns for COS 3 and SIN 3 coils 25-5 and 25-6, yielding 3 sinusoidal periods per rotation.

The COS 3 and SIN 3 coils 25-5 and 25-6 may be used instead of the COS and SIN coils 25 of FIG. 16, to yield an incremental sensor system with 120° unambiguous range. The calculation of position in this case proceeds according to Equation 5 above, except that the result of the a tan 2 calculation is the "electrical phase" which must be divided by 3 to yield the actual angle.

Alternatively, the sensor coils 25 of FIGS. 16 and 17 may be superimposed to yield a sensor having "coarse" COS/SIN outputs and "fine" COS 3/SIN 3 outputs. The fine coils yield precise position information at high resolution, and can be combined with coarse information in the processing circuitry for a full absolute output.

Figure 18:
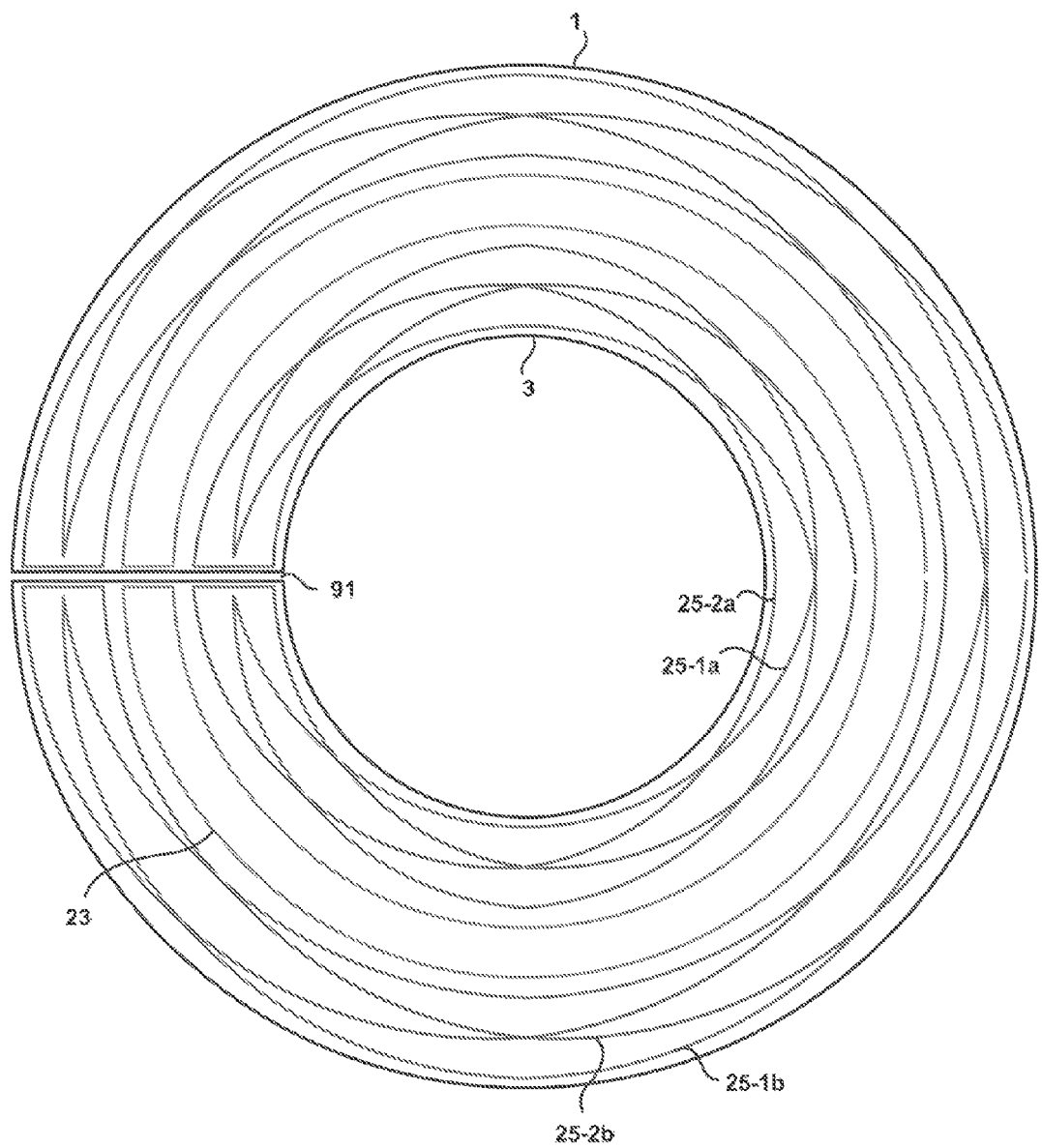
FIG. 18 illustrates an alternative arrangement of sensor and excitation coils to that shown in FIG. 16.

The sensor used in the third embodiment has an angular extent of 180° about the rotation axis 53. This extent may be made smaller or greater. For example FIG. 18 illustrates an embodiment where the angular extent of the sensor is just under 360°. The remainder may be used to allow for a small slit 91 in the sensor board 1, so that the sensor board 1 may be flexed open to fit around a shaft that passes through the central hole 3 and then secured in the shape illustrated for sensing, for example with the target 7 of FIG. 16. An advantage of this approach is improved immunity to misalignment between the target axis, the rotation axis and the sensor axis. This arises because angle error contributions from each ferrite rod 9 due to linear displacements of the target 7 relative to the sensor 1 cancel each other out. The slit 91 should be made narrow enough that the signal from a ferrite rod, when it is adjacent to the slit 91, does not dip significantly.

In the third embodiment, sensor coils 25 have been used that have their width modulated (varied) to yield the desired sinusoidal signal variation with target angle. They may be formed with any appropriate shape, which may include multiturn coils, such that sinusoidal signal variation is achieved. For example rectangular forms of multi-turn coils (like those used in the first and second embodiments) may be used, with varying winding density in the circumferential direction.

The inner and outer SIN coil portions 25-2a and 25-2b of FIG. 16 are balanced with respect to far field interference due to left-right anti-symmetry (figure of 8 arrangement), so that the nominal effect of any such interference on the coil output is zero. However the COS coil portions 25-1 are not balanced in this way. There is a certain amount of balance due to the opposite winding direction of the COS coil inner and outer portions 25-1a and 25-1b. However, as drawn, the effect of interference does not cancel completely, because the area of the outer COS coil portion 25-1b is greater than the area of the inner coil portion 25-1a. This may be rectified by making the radial extent of the outer COS coil portion 25-1b smaller than that of the inner COS coil portion 25-1a, and/or by using a greater number of winding turns on the inner portion 25-1a. However, if this is done, the same adjustment should be made to the SIN coils 25-2 so that the ratio of SIN and COS amplitudes remains the same.

In the embodiments described above, the two windings 10 forming part of the resonant target 7 were connected in series with a capacitor. Alternatively, the three components may all be connected in parallel whilst preserving the desired phase relationship between each winding 10.

In the third embodiment described above, the COS and SIN coils 25-1 and 25-2 ended abruptly in the circumferential direction, and cross connections at that location were generally radial. The shape of the coils 25 may be varied so that their sensitivity to target signals is a more gradual function of target angle (θ) when a neighbouring ferrite goes out of range. This improves differential non-linearity in the regions around target angles of +90° and –90° by increasing the angular range over which both ferrite rods 9 make a contribution, because there is a less abrupt transition from the position readings largely due to one ferrite and then the other.

Similarly, the width and/or number of turns of the excitation and/or sensor cols may be modulated near the –90° and +90° regions so that the net detected amplitude (e.g. Ao in Equation 1) remains a sufficiently constant figure across angle. This avoids having dips in amplitude at these angles which can cause poor resolution, or peaks which must be accommodated in the system's dynamic range, requiring a reduction in amplitude and hence lower resolution elsewhere.

In the third embodiment described above, the target 7 was built using wound ferrite rods 9, which acted as field concentrating members. Alternative field concentrating materials may be used to suit the application, for example layers of spin melt ribbon from Vacuumschmelze which allow for a low-profile wound component, with thicknesses smaller than are possible with ferrite due to greater toughness. Similarly, the field concentrating members described above were generally long and thin, for example rod shaped. This is not necessary, for example they may be made with bulges at their ends to increase coupling.

Figure 19:
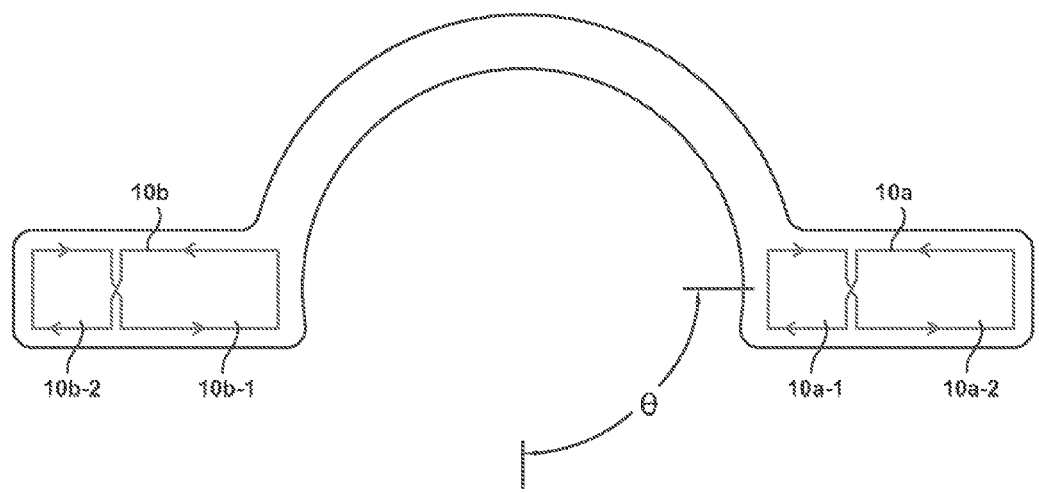
FIG. 19 illustrates a further alternative form of target that uses air cored coils instead of windings wound around a magnetic member.

Further, a field concentrating member may be eliminated altogether by using wound coils alone as the inductive component of the resonant target 7. FIG. 19 shows one possible configuration of coils 10a and 10b that could be used with the sensor coils 25 and excitation coil 23 shown in FIG. 16. As shown, a target coil 10 is wound on two sides of the target axis, with the right hand side having a coil 10a that has the equivalent function to ferrite rod 9a and the left hand side having a coil 10b that has equivalent function to ferrite rod 9b of FIG. 16. As shown, each of the coils 10a and 10b is formed from an inner coil portion 10a-1, 10b-1 and an outer coil portion 10a-2, 10b-2 that are connected together in a figure of eight arrangement. The inner coil portions 10a-1, 10b-1 are designed to couple with the inner sensor coils 25-1a and 25-2a and with the outer coil portions 10a-2, 10b-2 being arranged to couple with the outer sensor coils 25-1b and 25-2b. The right and left sensor coils may be connected in series with a capacitor to form a resonant circuit as before. Instead of using figure of eight coils 10a and 10b, a single coil may be provided on each side of the target 7, but with one coil (for example coil 10a) being arranged to couple only with the excitation coil 23 and the inner sensor coil portions 25-1a and 25-2a and with the other coil (for example coil 10b) being arranged to couple only with the excitation coil 23 and the outer sensor coil portions 25-1b and 25-2b.

Further, instead of using a resonant target 7, simple ferrite rods 9 may be used instead of the wound rods shown in FIG.

Figure 20:
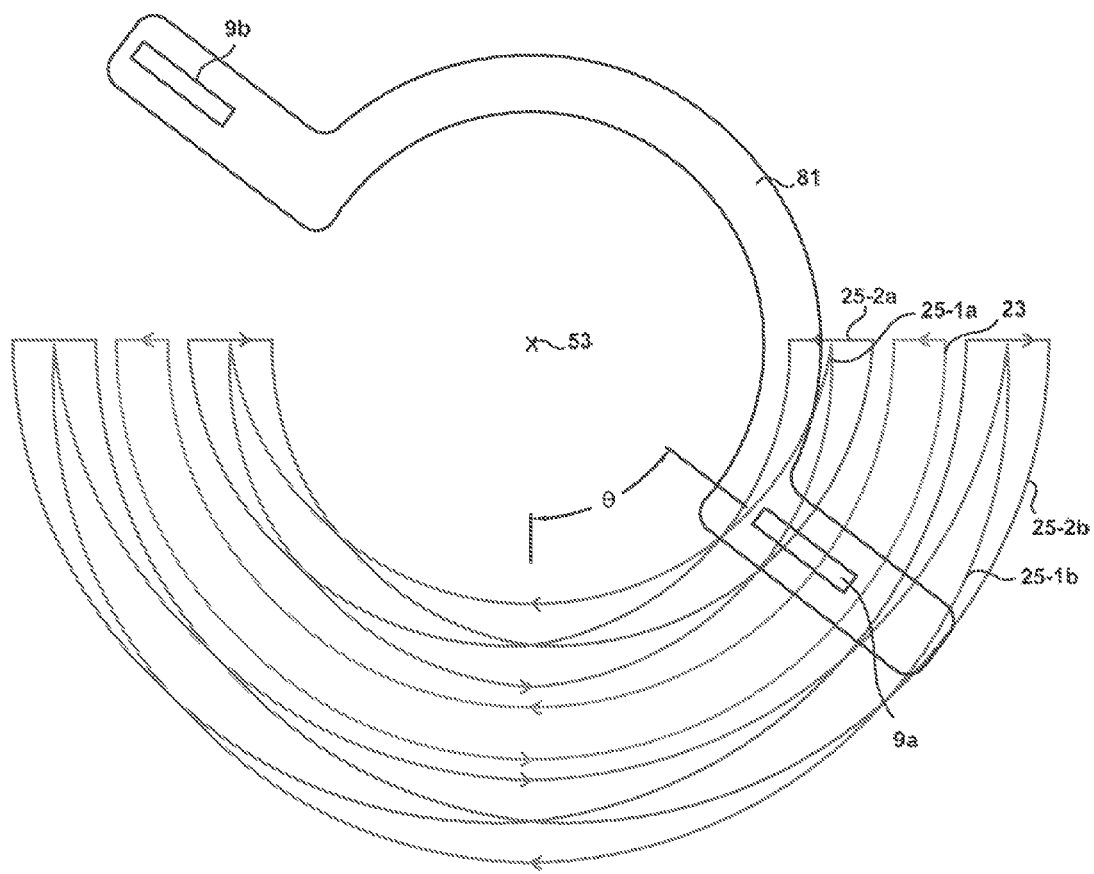
FIG. 20 illustrates a further alternative arrangement of target that uses asymmetrically positioned ferrite rods without windings thereon.

16. Such an embodiment is illustrated in FIG. 20. As shown, ferrite rod 9a is positioned to extend between the excitation coil 23 and the inner sensor coils 25-1a and 25-2a and the ferrite rod 9b is positioned to extend between the excitation coil 23 and the outer sensor coils 25-1b and 25-2b. Thus the rods 9 function in a similar manner to that of the wound rods of the third embodiment—except that the system has to perform excitation and detection at the same time since the target 7 is not now resonant.

Figure 21:
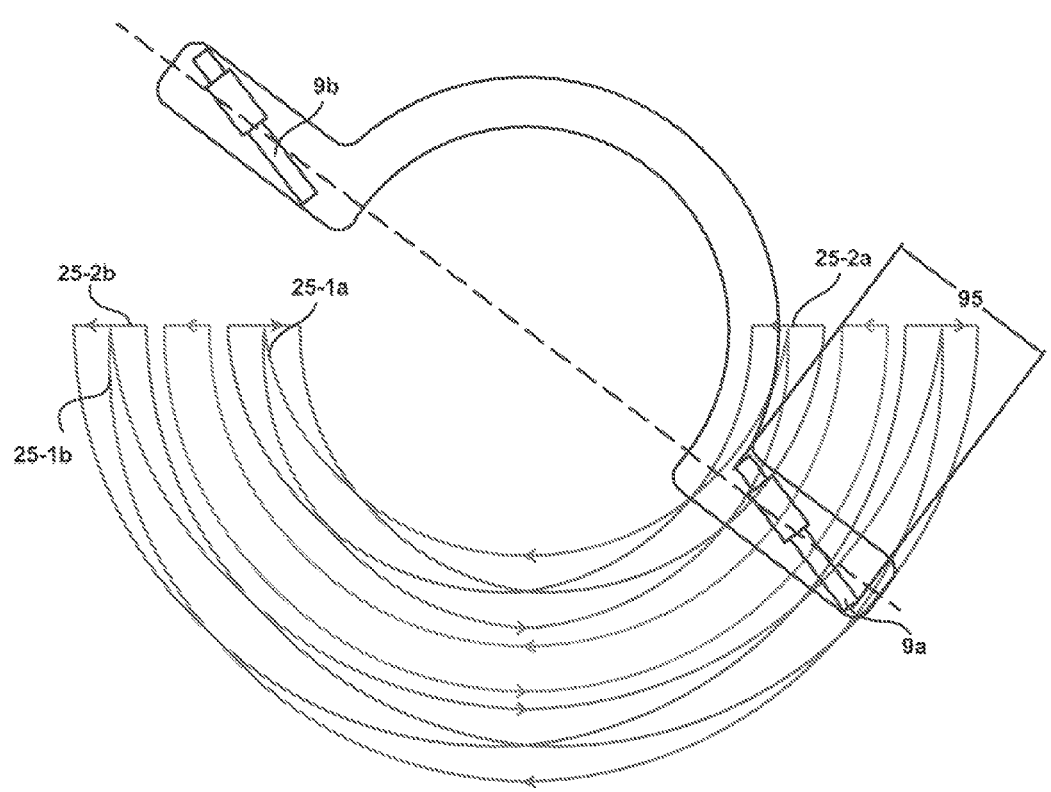
FIG. 21 illustrates a further alternative arrangement of target that uses first and second ferrite rods with offset axes.

In the embodiments described above the coils 10 of the resonant target were generally aligned along a line intersecting the rotation axis 53. They may instead be twisted as illustrated FIG. 21. Benefits of this alternative include a smaller radial extent 95 of the ferrites 9 and/or coils 10. The inner sensor coils 25-1a and 25-2a shown in FIG. 21 have not been rotated relative to the outer ones to match the angular displacement of the ferrite rod 9 ends, but this could be done to improve immunity to misalignment and increase signal amplitudes slightly.

Figure 22A:
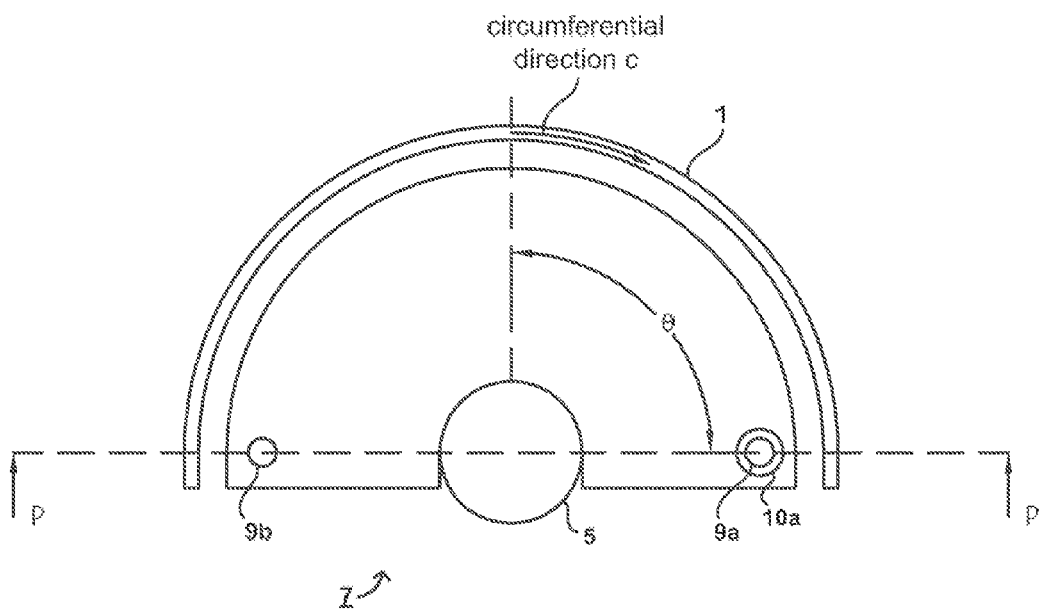
FIG. 22a is a plan view of a further alternative arrangement of sensor board and target arrangement for circumferentially measuring the rotation of a rotatable shaft.
Figure 22B:
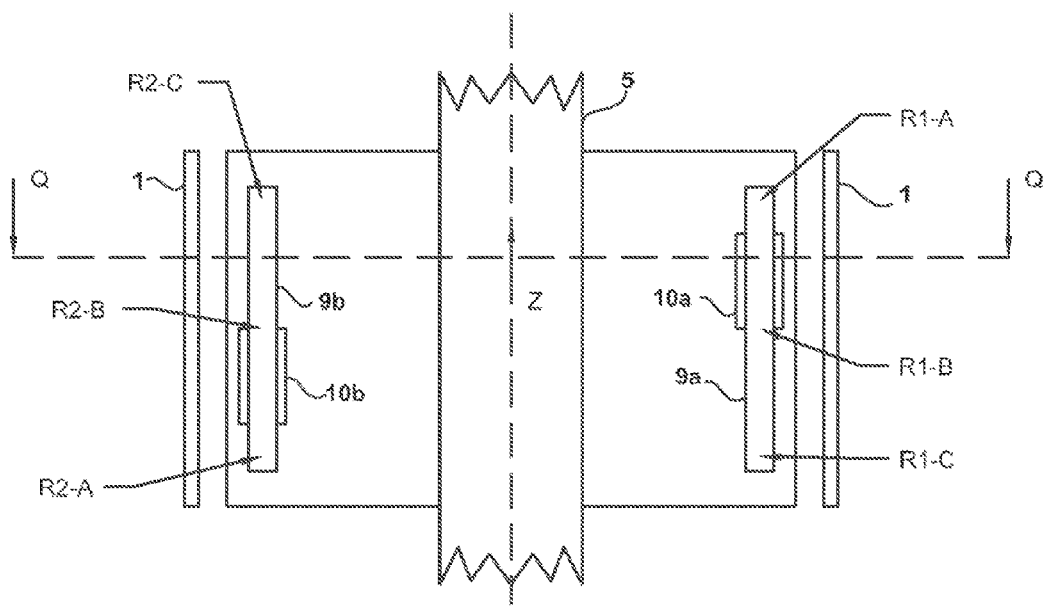
Figure 22C:
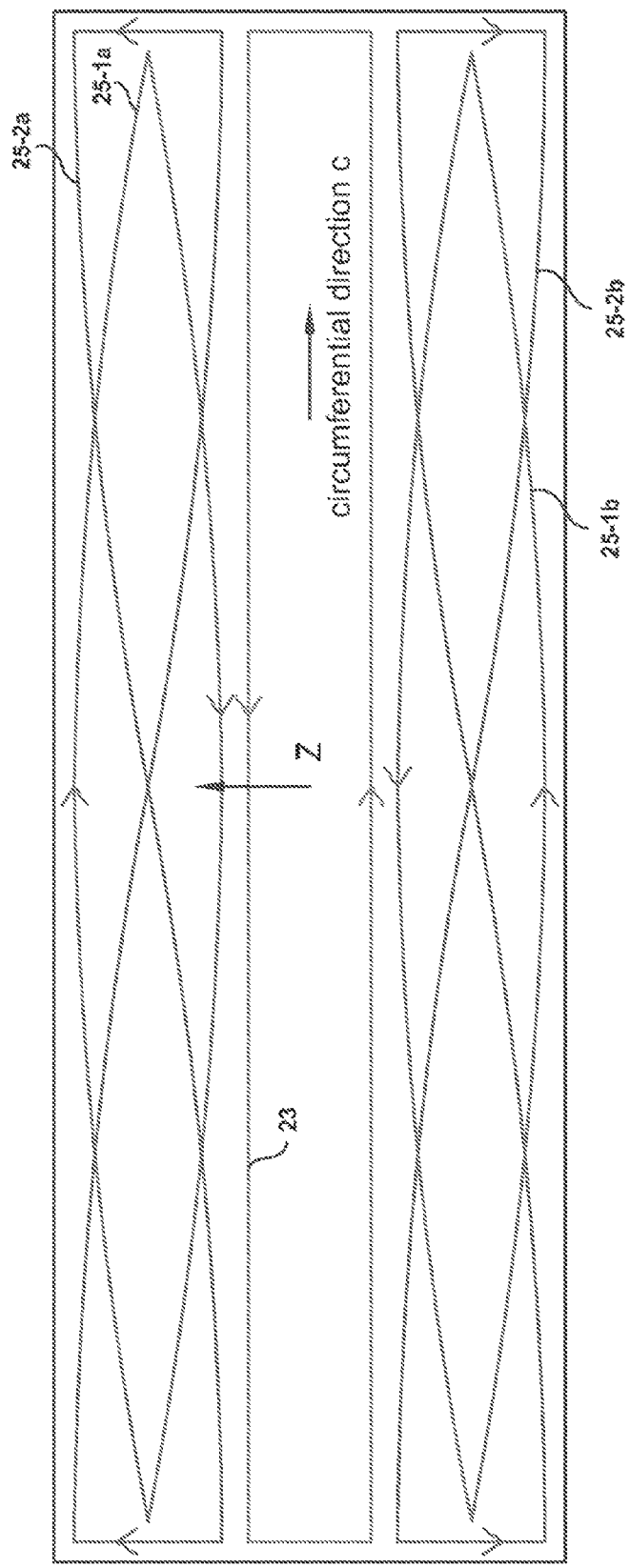
FIG. 22c illustrates sensor and excitation coils used in the sensor shown in FIGS. 22a and 22b laid out flat.

All the embodiments described above used flat sensors extending in a plane perpendicular to the rotation axis 53, and the axes of the ferrite rods 9 were parallel to the same plane. Instead, the ferrite rods 9 may be placed parallel to the rotation axis 53, with the sensor board 1 curved around the rotation axis 53 in the manner illustrated in FIGS. 22a and 22b. FIG. 22a is a view of the sensor taken along the line Q-Q shown in FIG. 22b; and FIG. 22b is a cross-section of the sensor along the line P-P shown in FIG. 22a. The sensor board 1 may be implemented on a thin rigid PCB or flexi PCB, curved into the required shape during an assembly operation and attached to a holder (not shown) to maintain its shape. A possible coil pattern (shown flat for ease of illustration) is shown schematically in FIG. 22c. The operation of this sensor is equivalent to the one shown in FIG. 16, with the upper sensor coil portions 25-1a and 25-2a corresponding to the inner sensor coil portions of FIG. 16 and with the lower sensor coil portions 25-1b and 25-2b corresponding to the outer sensor coil portions of FIG. 16. The excitation coil 23 drives the resonant target 7 that includes winding 10a in series with winding 10b and connected to a capacitor as before. Locations R1-C and R2-C have the same polarity of magnetic potential as locations R1-B and R2-B powered by the excitation coil 23; and locations R1-A and R2-A have the opposite polarity. As before, the target windings 10 are connected so that when the target angle (θ) is such that both windings 10 couple to the excitation coil 23, the EMF induced in each target winding 10 from the excitation coil 23 is in the same direction, to ensure that the resonant target 7 is powered at all angles, preferably with substantially the same amplitude. One of the useful consequences of this arrangement is that the magnetic dipoles generated by resonator current flowing through each ferrite rod 9 and its winding 10 are in opposite directions, so that the net dipole emission from the resonant target 7 is zero. The resonant target 7 is not susceptible to spurious powering from far field interference for the same reason.

Figure 23A:
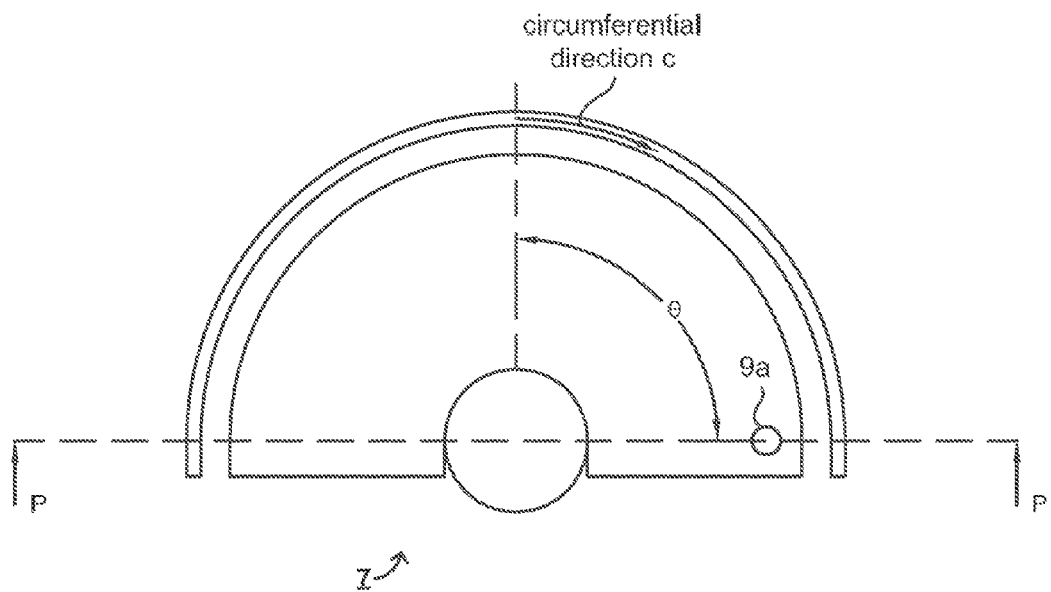
FIG. 23a and FIG. 23b illustrate an alternative sensor arrangement to that illustrated in FIG. 22, with wound ferrite rods forming part of the target being replaced with shortened and asymmetrically positioned ferrite rods.
Figure 23B:
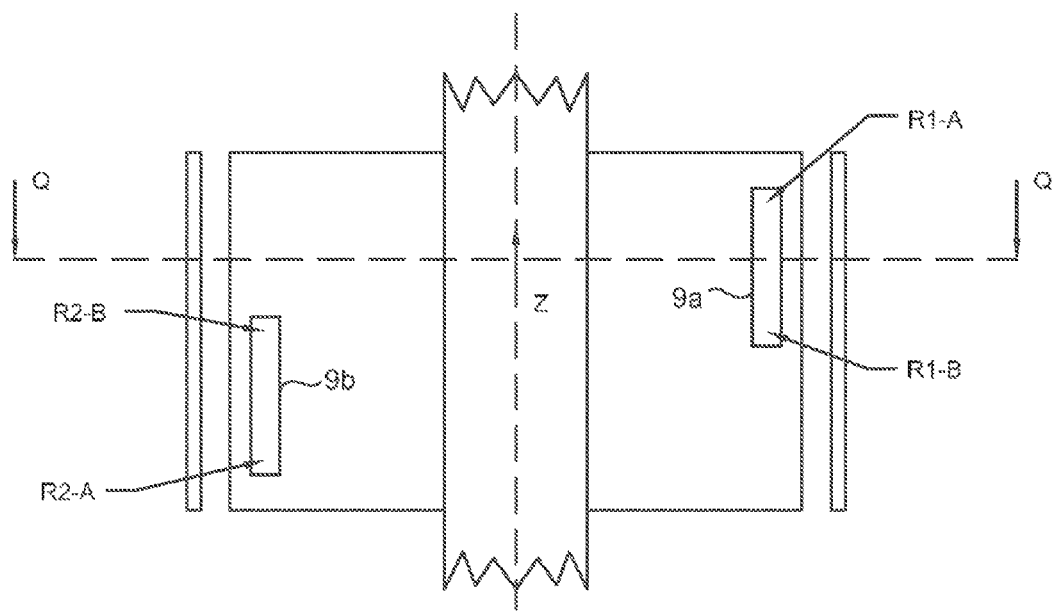

In the alternative illustrated in FIG. 22, the target 7 comprised wound ferrite rods 9 that extended between the upper and lower sensor coils 25 on the sensor board 1 and that had windings 10 that were offset in the z direction in order to provide equal and opposite field polarity at the ferrite rod ends. Instead, the ferrite rods 9 may be shortened as illustrated in FIGS. 23a and 23b. The ferrite rods 9 may be wound as before, and may be connected in series with a capacitor to form a resonant circuit. Alternatively, they may be unwound as shown in FIG. 23, with the electronic processor exciting and detecting continuously.

Figure 24:
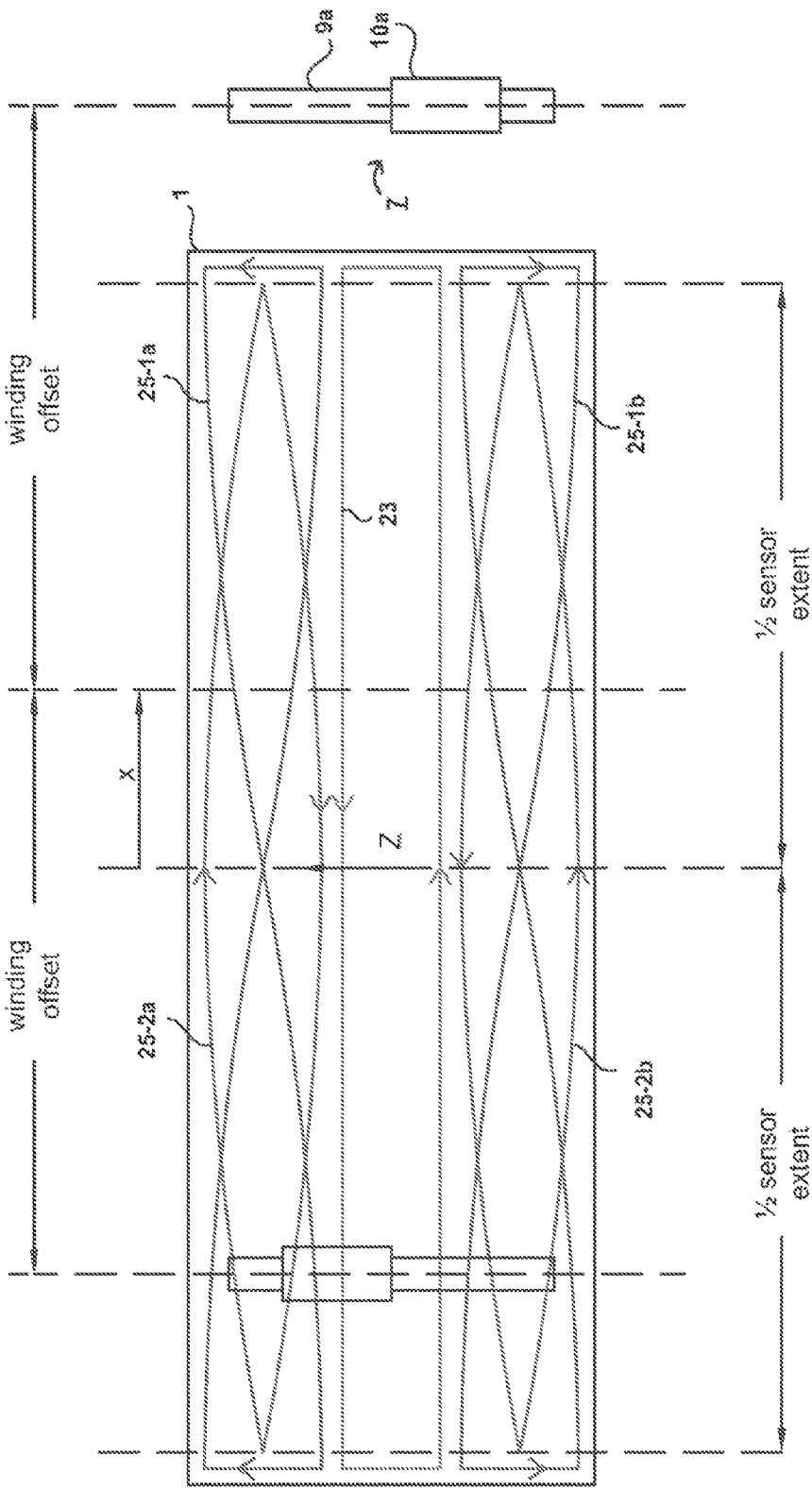
FIG. 24 schematically illustrates a target and sensor board configuration for a linear position sensor.
Figure 25:
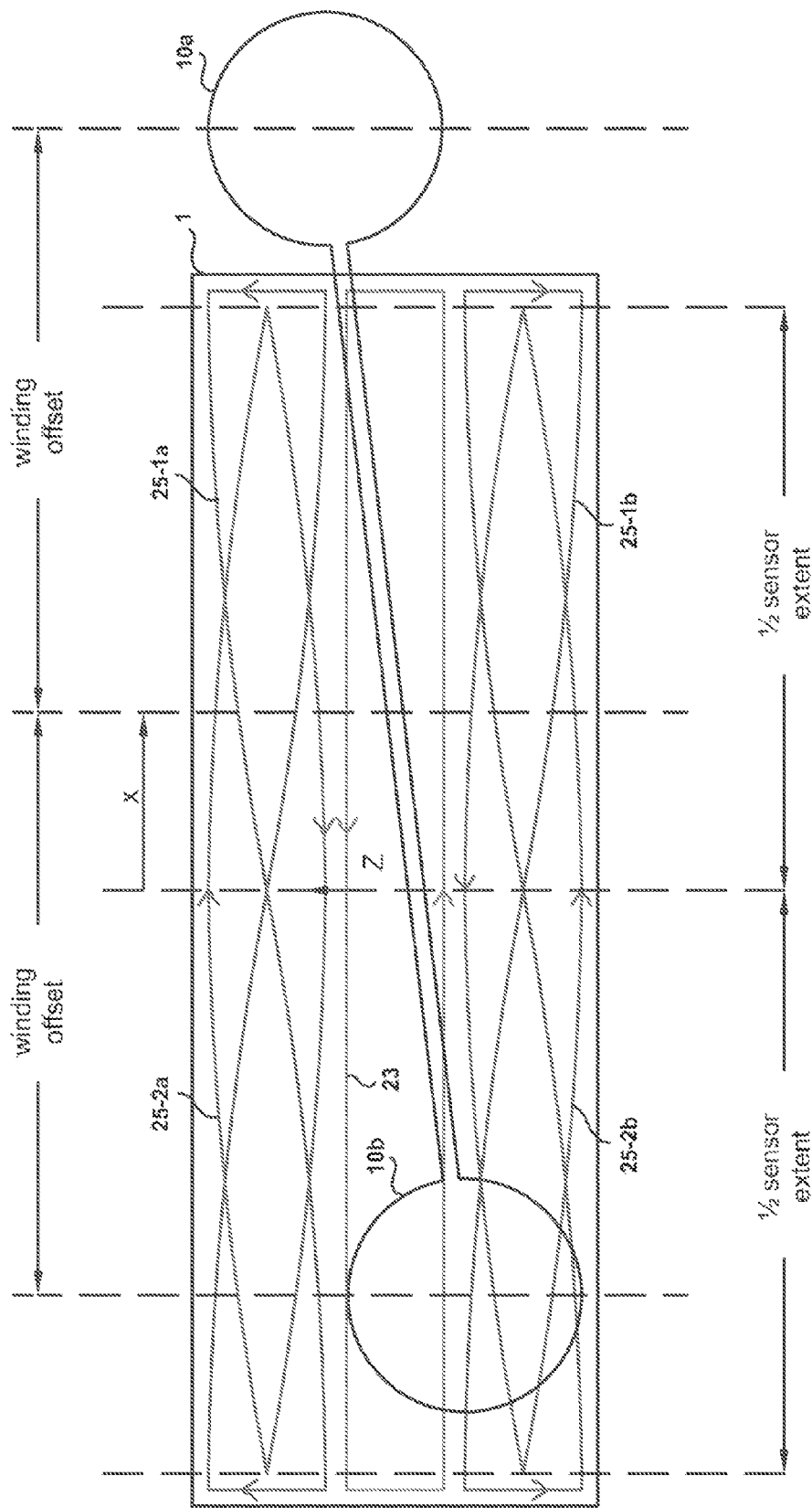
FIG. 25 illustrates an alternative arrangement using air-cored coils.

The measuring path need not be rotary. For example, FIG. 24 illustrates a sensor 1 and target 7 for linear sensing. The target's windings 10a and 10b are separated in the direction of the measuring path as before, each a fixed distance "winding offset" from a centre point relative to a moving member. The sensor board 1 extends either side of a central axis by an amount "½ sensor extent". In this example these two dimensions are equal, so that at position x=0 the two windings 10 are at opposite ends of the sensor board 1. At this position the contributions of each target winding 10 to the EMF induced in the SIN coil portions (25-2a and 25-2b) are equal and opposite and cancel, while the contributions of each target winding 10 to the EMF induced in the COS coil portions (25-1a and 25-1b) are equal and reinforce each other. According to the same reasoning as above for rotary sensors, the amplitudes of the resonant target signals detected in the COS and SIN coils 25 vary sinusoidally with position. For the sensor shown having "½ sensor extent" equal to 90° of SIN/COS electrical angle, a position calculation result of 90° from Equation 5 corresponds to an x="½ sensor extent". A range of x=+/−(sensor extent) therefore corresponds to a full 360° of electrical angle. Note that this range is almost twice the overall extent of the sensor coils 25. The arrangement is therefore more physically compact that a typical resonant inductive sensor having a measuring range of somewhat less than the extent of the sensor board 1. This is a feature that the linear sensor of FIG. 24 has in common with some of the above described rotary embodiments such as that of FIG. 16, which measures over a wider measuring range (360°) than the angular extent of the sensor (180°). The same benefits are achieved with other types of target—such as the air cored coils 10a and 10b shown in FIG. 25.

Figure 26:
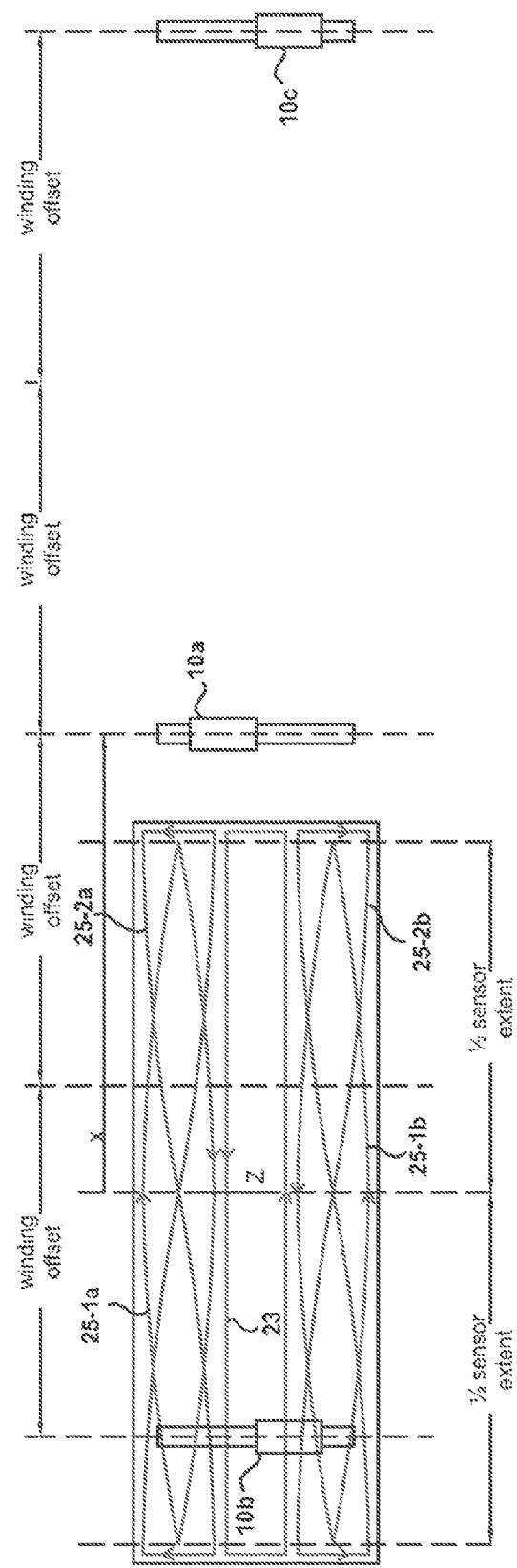
FIG. 26 illustrates a further alternative linear embodiment.

The embodiment of FIG. 24 uses two target windings 10 to achieve full absolute position readings across a measuring range of x=+/−(sensor extent). Additional target windings 10 may be provided to increase the measuring range further, as illustrated in FIG. 26. An additional winding 10c is connected to windings 10a and 10b. Winding 10c has the same winding direction as winding 10b. The direction of windings 10a and 10b have been reversed, and the COS and SIN coils switched, in order to maintain the convention that COS amplitude is a peak at x=0 (when the winding 10a is in the middle of the sensor board 1. The sensor system will now measure position across the range x=+/−(1.5×sensor extent). However since the (COS,SIN) amplitude vector describes a full circle across the smaller range x=+/−(sensor extent), the output from the sensor is incremental and therefore ambiguous.

Figure 27:
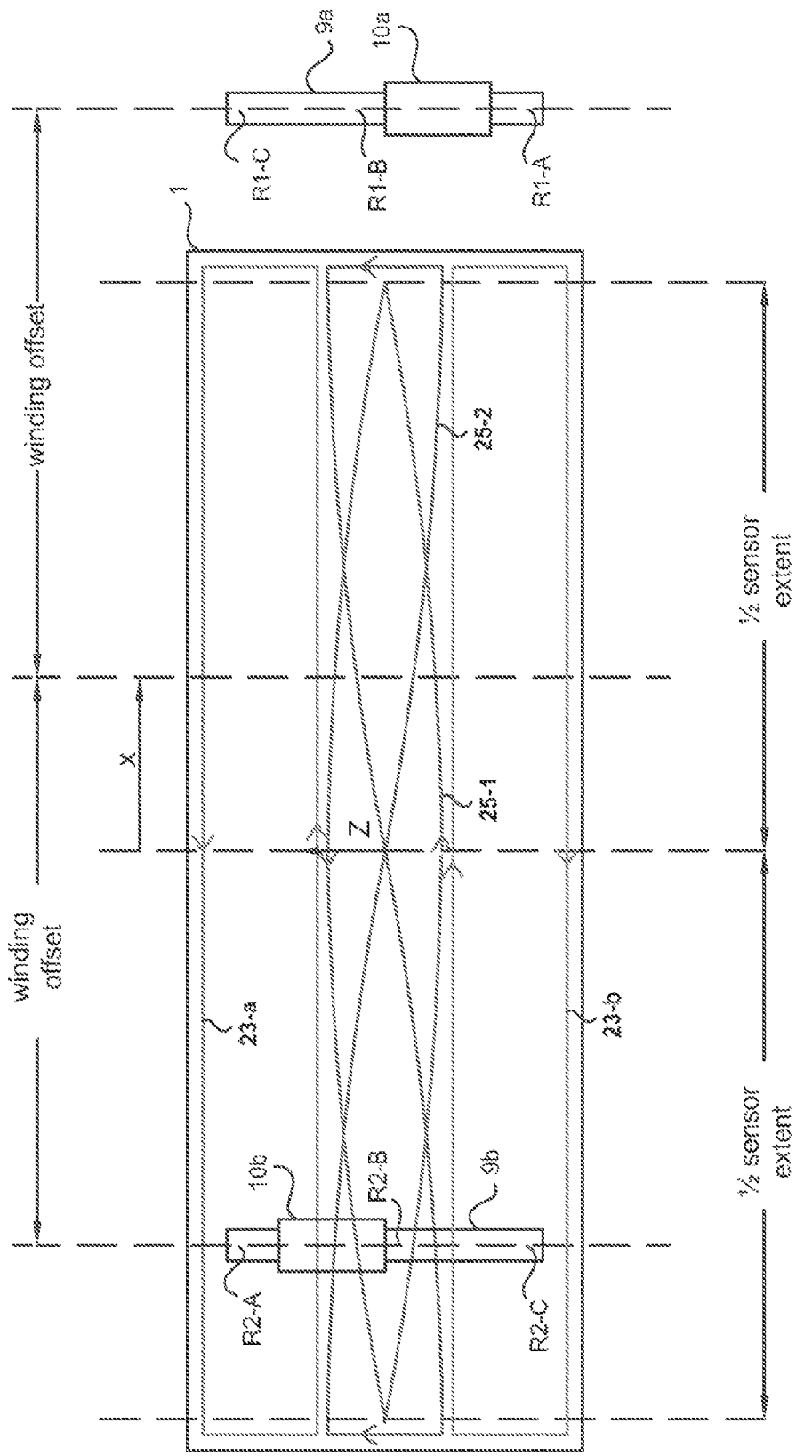
FIG. 27 illustrates an alternative arrangement of sensor and excitation coils.

In the embodiment of FIG. 24, the excitation coil 23 was patterned and located such that the field induced in the two target windings 10a and 10b was equal and opposite (left hand ferrite magnetised upwards when the right hand one was magnetised downwards, say), and the target windings 10 were connected with a polarity such that the excitation drove both in the same direction when both were coupled to the excitation coil 23. The top and bottom of both ferrite rods 9, as drawn, had opposite magnetic potentials and therefore induced opposite polarity signals for the same physical winding 10 position relative to the sensor board 1. An alternative is for the excitation coil 23 to drive both target windings 10 in the same direction, as illustrated in FIG. 27. In this example the excitation and sensor coil locations have been reversed. The excitation coil 23 now has an upper portion 23-a and a lower portion 23-b connected together and wound in opposite senses (in a figure of 8 manner). A single row of SIN and COS sensor coils 25 occupy the central region of the sensor board 1. When ferrite rod 9b couples with the excitation coil portions 23-a and 23-b, location R2-B couples with the sensor coils 25 and the magnetic field at location R2-B of ferrite rod 9b will be in phase with the magnetic field at location R2-C. This is similarly true for ferrite rod 9a. However, since the locations of R1-A and R1-C are reversed compared to R2-A and R2-C, the two windings 10 and their ferrites 9 induce opposite polarity signals in the COS and SIN sensor coils 25 as before. Therefore, the overall function of the sensor of FIG. 27 remains the same as that of FIG. 24. The sensor of FIG. 27 has a balanced excitation coil 23, so that magnetic emissions are reduced relative to the emissions from the excitation coil 23 used in FIG. 24. However the magnetic field from the two target windings 10 no longer oppose each other, so there is a net coupling to and from far field magnetic field sources (not shown).

In the embodiment of FIG. 27, the excitation coil 23 is formed in two portions—above and below the sensor coils 25. Since each excitation coil portion can individually power each target winding 10 with the correct phase, it is possible to eliminate one of the excitation coil portions to achieve a narrower sensor, at the expense of unbalancing the excitation coil.

The embodiments described above used excitation coils 23 that generate largely uniform magnetic fields along the measuring direction the extent of the sensor, and the sensor coils 25 were patterned for a sinusoidal signal variation. As those skilled in the art will appreciate, the functions of the excitation coil and of the sensor coils may be reversed. In this case, two coils could be used to excite the target and one coil could be used to detect the signal back from the target in response to the two excitations. Alternatively, both excitation and sensor coils may be patterned with sinusoidally varying fields, each having a different periodicity. The reader is referred to WO98/58237 for details of how such reverse operation may be achieved.

The third embodiment described above used sinusoidally patterned coils for sensing and/or driving the target windings and/or magnetic flux concentrating members. This is not absolutely necessary. For example, the sinusoidally patterned coils may be replaced by segmented coils (loop coils) such as those used in U.S. Pat. No. 4,878,553. When using such simple loop coils as detection coils, the location of the target winding 10 or field concentrator can be determined by interpolation, while the polarity of the signal can be used to tell which of the two windings 10 or flux concentrators was detected and hence absolute position.

The descriptions above were for inductive sensors detecting the AC field from a resonating target and/or field concentrator. The role of the target windings or field concentrator may instead be performed by a permanent magnet, with an appropriate magnetic detector in place of the sensor coils. Possible sensors include that of U.S. Pat. No. 6,118,271. In this case, two magnets would be positioned on the moving member pointing in opposite directions such that their effect on the sensed signal amplitudes are equal and opposite.

Figure 28:
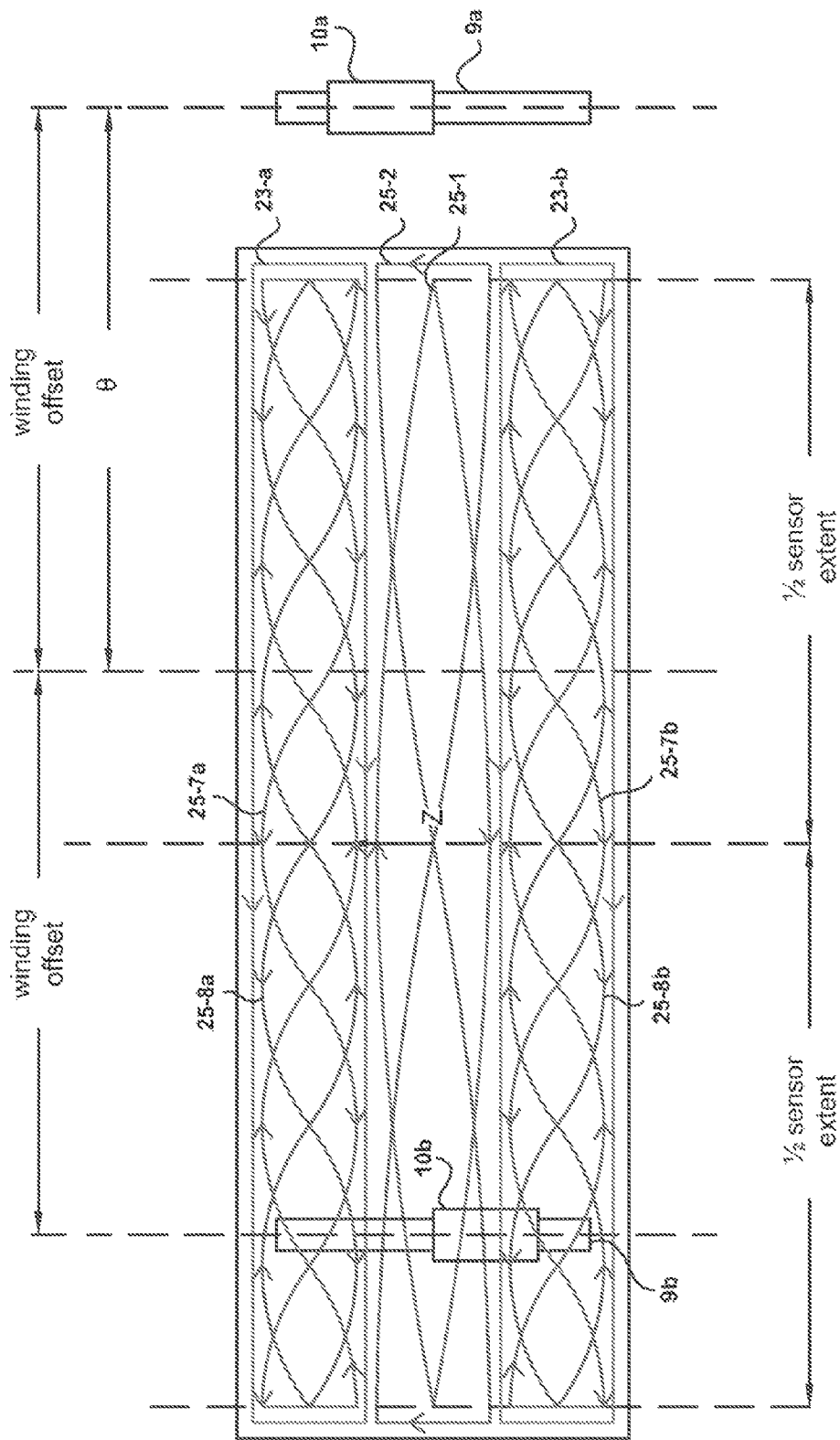
FIG. 28 illustrates a further sensor arrangement using coarse and fine sensor coils.

FIG. 28 illustrates a further modification that is based on the embodiment shown in FIG. 27. In particular, the sensor board used in this embodiment has the same excitation coil portions 23-a and 23-b, the same COS coil 25-1 and the same SIN coil 25-2. In addition, in this embodiment, the sensor board 1 also carries upper and lower "fine" COS coil portions 25-7a and 25-7b that are connected in series so that, for a given target winding 10 position, signals induced in the upper coil portion will reinforce the signals induced in the lower coil portion; and upper and lower SIN coil portions 25-8a and 25-8b that are connected in series so that, for a given target winding 10 position, signals induced in the upper coil portion will reinforce the signals induced in the lower coil portion. As shown, these fine coils 25 are formed inside the respective upper and lower portions of the excitation coil 23. This means that the fine coils 25-7 and 25-8 detect magnetic fields from each target winding 10 that are in the same phase when each target winding 10 is at the same position relative to the sensor board 1. As a result, these fine coils must have an even number of repeats around 360° otherwise there will be a 180° phase change in the output signals when one target winding 10 moves off the sensor board 1 and the other one moves onto the sensor board 1. In FIG. 28, there are 2 sinusoidal periods across the 180° extent of the sensor board 1. This corresponds to four repeats across 360°.

The sensor coil arrangement of FIG. 28 has the advantage that it makes efficient use of the sensor board area. The fine coils 25-7 and 25-8 can be located inside the excitation windings, which would otherwise be unused space. The extent of the COS and SIN coils 25-1 and 25-2 in the z direction may be made small relative to the extent of the excitation coli 23 and the fine coils 25-7 and 25-8, since the COS and SIN coils 25-1 and 25-2 need only deliver approximate position measurements in order to detect position within half a period of the fine coils 25-7 and 25-8. The accuracy and resolution of the system derives from the performance of the fine coils. That performance generally derives from the physical size of the coils.

Figure 29:
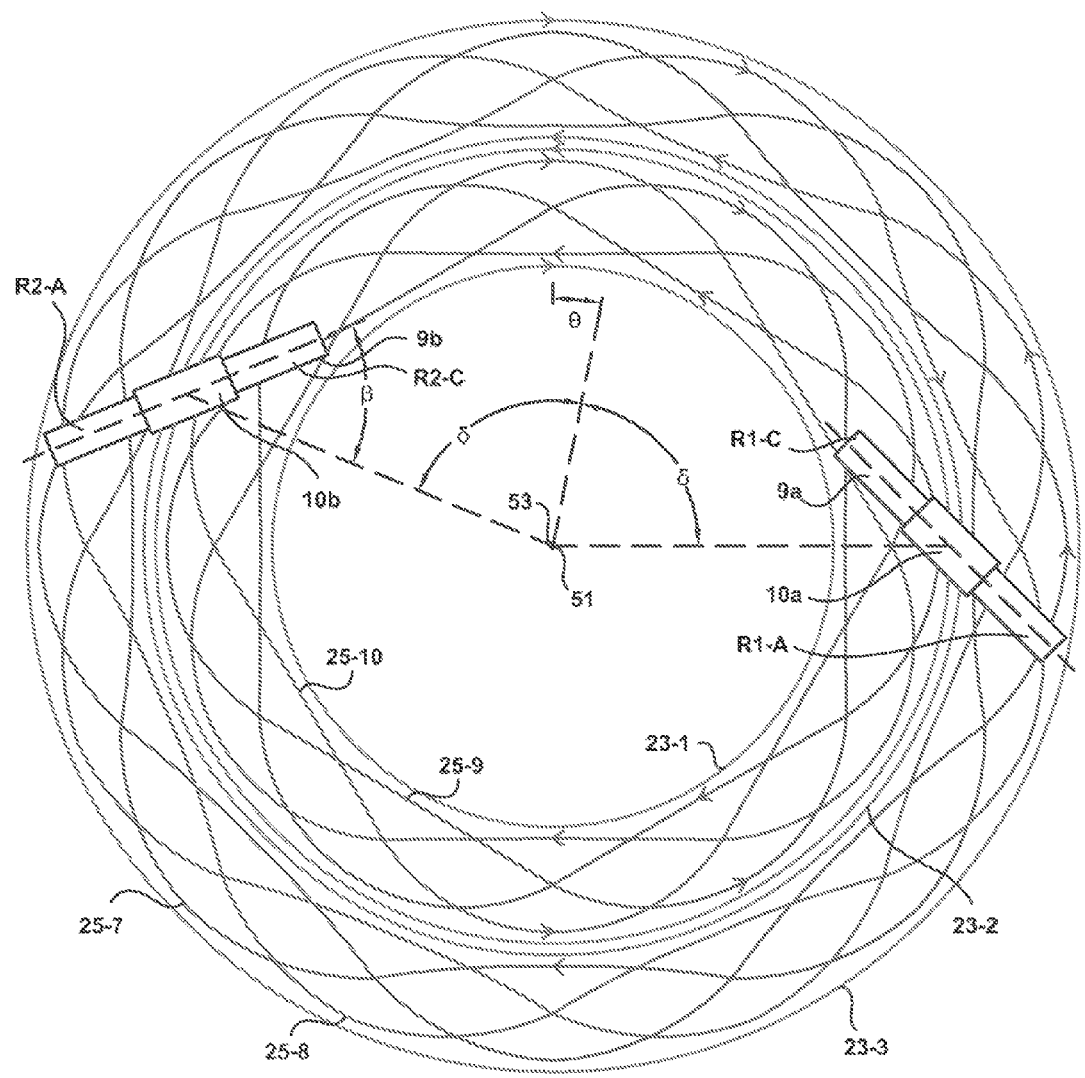
FIG. 29 schematically illustrates a further arrangement of sensor coils and target configuration for a rotary position sensor.
Figure 30:
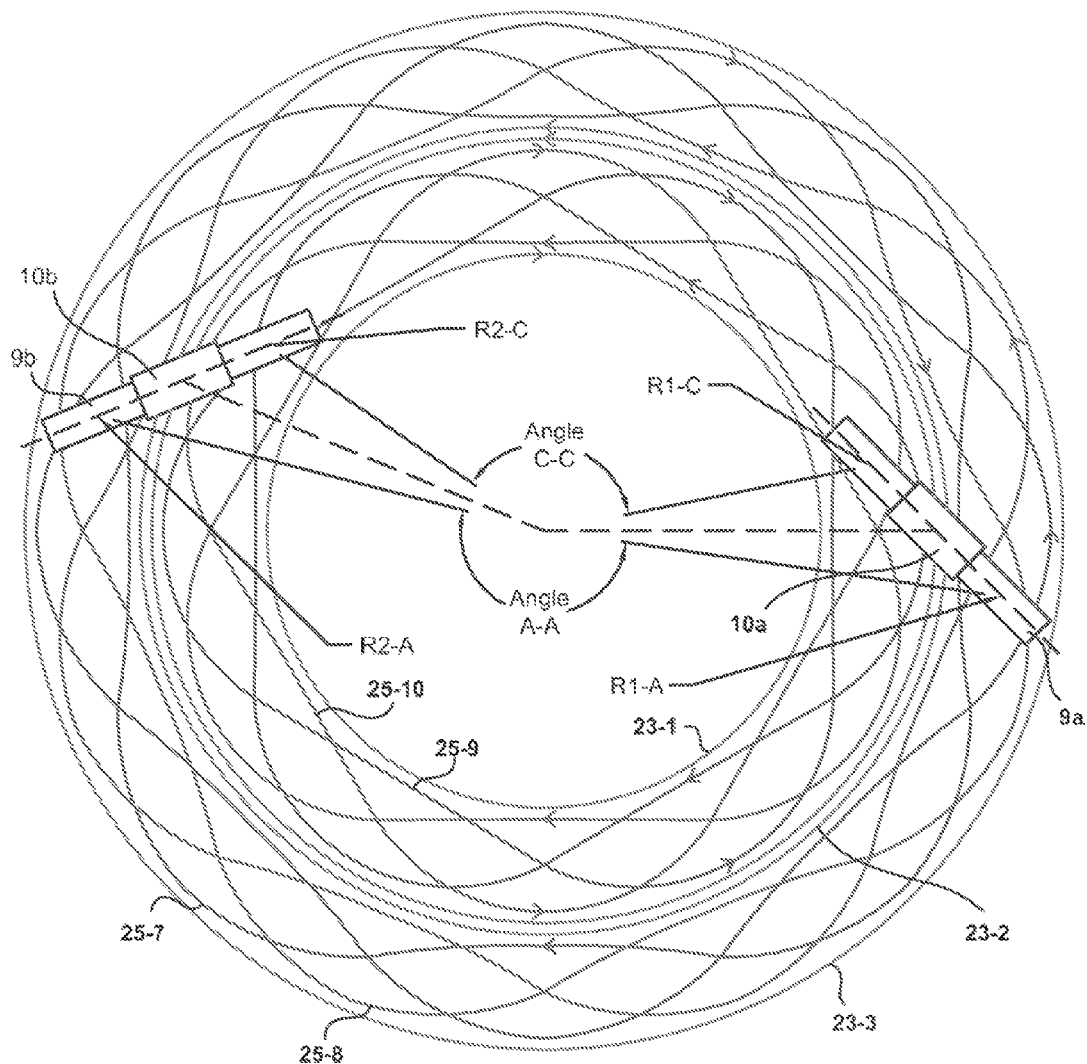
FIG. 30 schematically illustrates separation angles between different portions of the target shown in FIG. 29.

FIGS. 29 and 30 illustrate another embodiment for measuring the angle of a rotatable target 7, this time using planar type coils. The target 7 comprises two windings 10a and 10b on ferrite rods 9a and 9b that are connected in series. The windings 10 are connected so that magnetic field flows in the same direction from locations R1-A to R1-C and from R2-A to R2-C. As before, the windings 10 are preferably connected to a capacitor to form a resonant circuit.

The reference angle for the measurement of the target angle ($\theta$) is half way between the two target windings 10. As shown, the windings 10 are not diametrically opposite each other like they were in the embodiment shown in FIG. 16. Instead they are offset from the reference angle by a winding offset angle ($\delta$)—which in this embodiment is 79°. The wound ferrite rods 9 are also angled away from the axis of rotation by an inset angle ($\beta$) as shown. This means that the angles A-A and C-C illustrated in FIG. 30 are different. Angle A-A is approximately 180°, while angle C-C is approximately 135°.

The excitation coil 23 comprises an inner loop 23-1, middle loops 23-2 and an outer loop 23-3, all connected in series. The direction of current flow in the outer loop 23-3 is the same as in the inner loop 23-1 and opposite in direction to the current flow in the middle loops 23-2. This arrangement yields an excitation field that has a component along the direction of both ferrite rods 9, in the same direction (from, for example, rod end R1-A to R1-C).

In this embodiment, there are four sensor windings 25—a COS 4 coil 25-7 and a SIN 4 coil 25-8 that have four sinusoidal repeats around 360° (of angular pitch 90°) and are positioned at a radius to couple with ferrite rod locations R1-A and R2-A; and a COS 3 coil 25-9 and a SIN 3 coil 25-10 that have three sinusoidal repeats around 360° (of angular pitch 120°) and are positioned at a radius to couple with ferrite rod locations R1-C and R2-C.

Magnetic field from ferrite rod 9b at location R2-A couples into the COS 4 coil 25-7 and SIN 4 coil 25-8 in the same direction as magnetic field from ferrite rod 9a at location R1-A, because Angle A-A (180°) is an integer multiple of the angular pitch of these sensor coils (90°). Magnetic field from target windings 10a and 10b make approximately equal contributions to the signals induced in the COS 4 coil 25-7 and the SIN 4 coil 25-8.

Magnetic field from ferrite rod 9b at location R2-C couples into the COS 3 coil 25-9 and SIN 3 coil 25-10 in the same direction as magnetic field from ferrite rod 9a at location R1-C, because Angle C-C (135°) is sufficiently close to the angular pitch of these sensor windings (120°) for signals induced by locations R1-C and R2-C in the COS 3 coil 25-9 and in the SIN 3 coil 25-10 to reinforce one another. Magnetic field from target windings 10a and 10b make approximately equal contributions to the signals induced in the COS 3 coil 25-9 and the SIN 3 coil 25-10. When R1-A is adjacent a particular location R1-A' above the outer SIN 4 sensor coil 25-8 and the outer COS 4 sensor coil 25-7, R1-C will be adjacent a particular location R1-C' above the inner COS 3 sensor coil 25-9 and the inner SIN 3 sensor coil 25-10. The magnetic field potentials at those two target locations (R1-A and R1-C) are opposite since magnetic field enters near one end, R1-A, say, and leaves at the other, R1-C, say. Thus the ferrite rod 9 modulates the coupling to each outer sensor coil 25-7 and 25-8 (at location R1-A') and each inner sensor coil (at location R1-C'), such that they are at opposite phases. Now if the target 7 moves half the measuring range, 180°, such that R2-A is adjacent the same location R1-A'; R2-C will be at a different location, R2-C' say, because of the inclination (β) of the ferrite rods 9. Locations R1-C' and R2-C' are separated by half a repeat period of the inner sensor coils (SIN 3 and COS 3 coils), so that the magnetic coupling from R2-C to the inner sensor coils is approximately equal and opposite to the magnetic coupling from R1-C to the inner sensor coils. The result is that the magnetic coupling between the inner and outer sensor coils, when R1-A is adjacent location R1-A', is opposite to the magnetic coupling between the inner and outer sensor coils when R2-A is opposite R1-A'. This relationship is a requirement for such a transducer having two sets of sensor coils having a number of sinusoidal repeats across a measuring range differing by one. Thus movement of the target 7 by half the measuring range should: (i) cause the magnetic coupling from the target 7 to the sensor coils having an even number of repeats to remain the same; and (ii) cause the magnetic coupling from the target 7 to the sensor coils having an odd number of repeats to invert polarity.

An electronic processing circuit 31 (like that used in the first embodiment described above) detects the amplitude of the signals induced by the target's windings 10 in the COS 3, SIN 3, COS 4 and SIN 4 coils 25; and then calculates the target angle modulo 90° (TAM90) from the COS 4 and SIN 4 amplitudes and the target angle modulo 120° (TAM120) from the COS 3 and SIN 3 amplitudes.

The difference in these two angles, TAM120-TAM90, is used to determine coarse position which is absolute over 360°. Fine position may be determined in a number of ways. It may be based on a weighted average of TAM90 and TAM120. The weighting may be adjusted to achieve best accuracy and/or immunity to misalignment.

Figure 31:
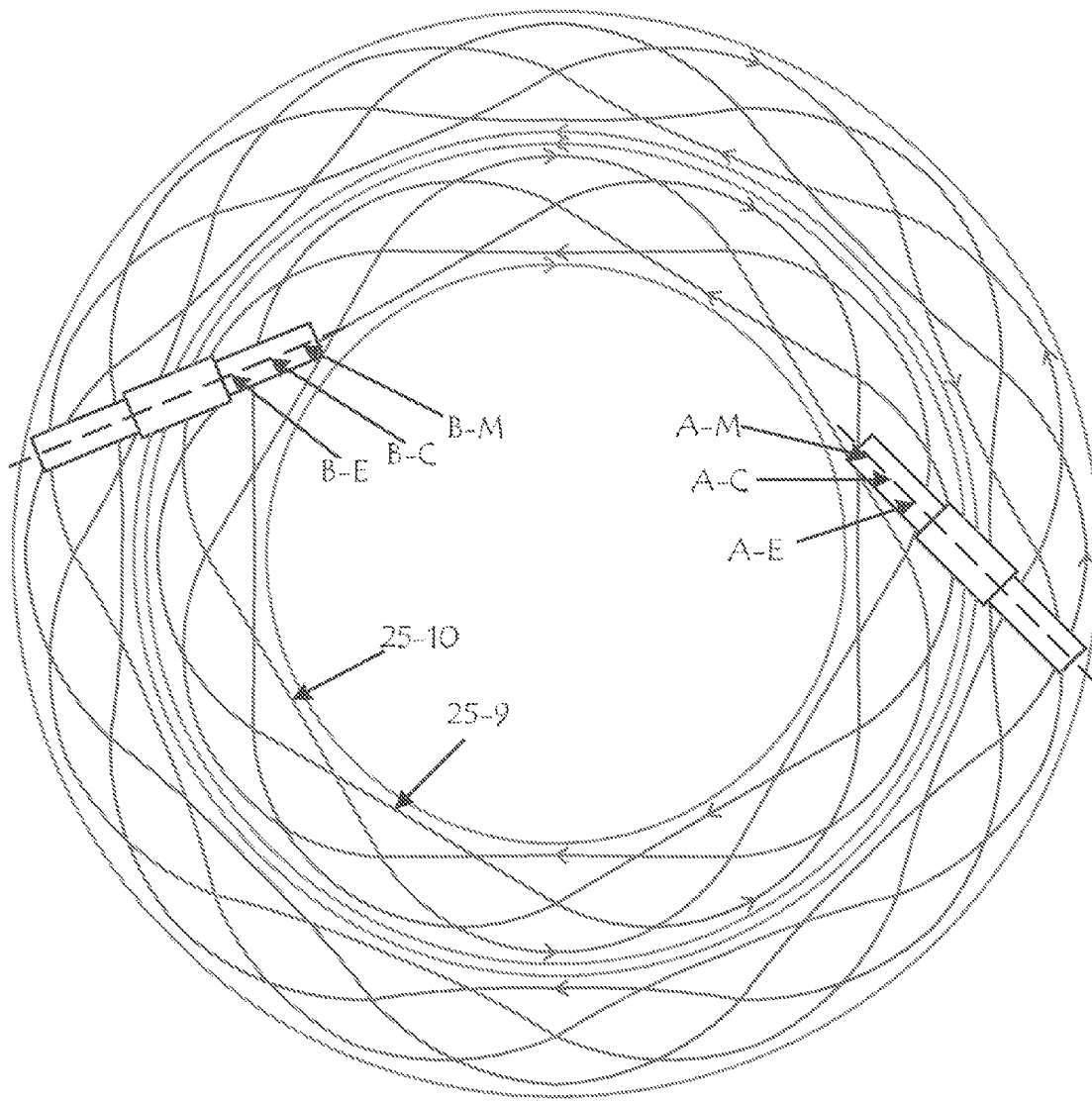
FIG. 31 schematically illustrates the equivalence of the embodiment shown in FIGS. 29 and 30 to the embodiment shown in FIG. 7.

In the example illustrated, TAM90 (calculated from the COS 4 and the SIN 4 signals) is largely immune to misalignment of the target axis of rotation 53 and the sensor axis 51, since target windings 10a and 10b are on opposite sides of the target axis 53 and contribute equal and opposite angular errors from any misalignment. TAM120 is similarly immune to misalignment for the same reasons as the first and second embodiment described above. This is illustrated in FIG. 31, which shows the target portions labelled A-M, A-C and A-E and B-M, B-C and B-E corresponding to the similar portions of the target used in FIG. 7b. With this in mind, the weighting used favours TAM90 and TAM120 approximately equally for the system to achieve best immunity to misalignment.

The embodiment shown in FIGS. 29 and 30 has the useful additional feature that long ferrite rods 9 may be used relative to the radial extent of the sensor board 1, since the rods 9 are angled by an inset angle (β). This feature maintains compactness, while also yielding large signal levels which help achieve high signal to noise ratio and hence resolution.

In the embodiments described above, ferrite rods and coils were provided on the target 7. These coils and/or ferrite rods may be replaced with magnetic screens, for example plates of aluminium or areas of copper etched onto a PCB. In this case, however and as with unwound ferrite rods, the electronic processing circuitry will need to excite and detect continuously.

In the embodiment shown in FIGS. 29 and 30, the excitation coil 23 included inner, middle and outer loops. Since each of those loops individually couples with the target windings 10, it is not necessary for them to all be present. The excitation coil 23 can instead be formed by a subset of these loops, for example the middle loops 23-2 alone.

In the embodiment of FIGS. 29 and 30, the target 7 was designed with a winding offset angle, inset angle and ferrite rod dimensions suitable to operate with outer sinusoidally patterned coils having a pitch of 90° and inner coils having a pitch of 120°. The exact angles and pitches may be varied according to the application and its specifications, for example to achieve maximum signal level, alignment immunity and accuracy.

Figure 32:
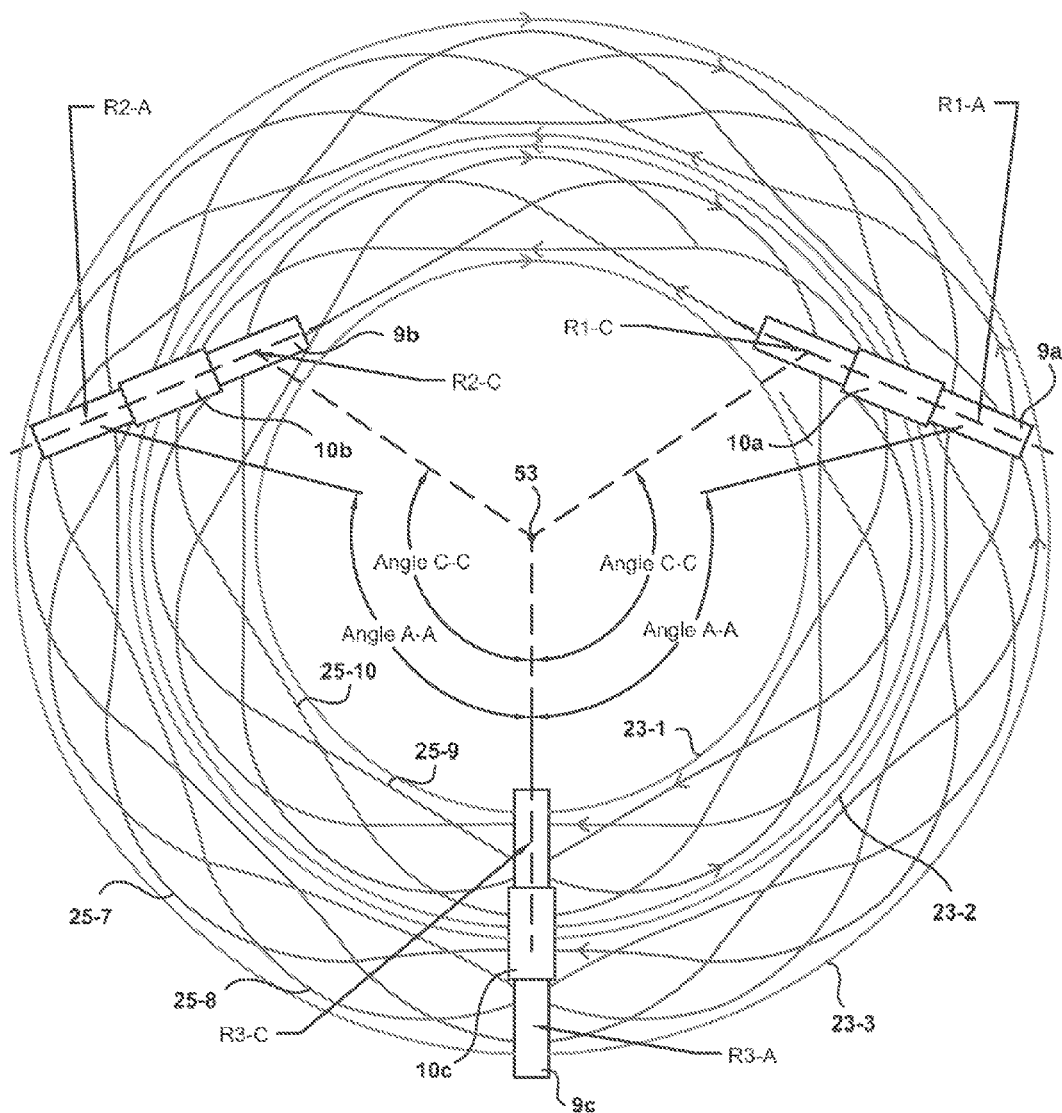
FIG. 32 illustrates a further rotary position sensor employing a target having three wound ferrite cores.

The embodiment of FIGS. 29 and 30 used two wound ferrite rods 9, each positioned so that their net coupling to the signals induced in the sensor coils 25 were non-zero. Different numbers of target windings 10 may be used. For example, FIG. 32 illustrates a target having three wound ferrite rods 9a, 9b and 9c (fixed relative to each other, but rotatable together around the rotation axis 53). In this case Angle C-C is 120°, matching the pitch of the COS 3/SIN 3 sensor coils 25-9 and 25-10, so that all three ferrite locations R1-C, R2-C and R3-C couple with the COS 3/SIN 3 coils 25-9 and 25-10 in the same direction. The measurement of the target angle from this pair of coils, TAM120, is now the one that is immune to misalignment between the sensor and target axes (51, 53), because these locations are the ones symmetrically arranged around the circumference. Magnetic field from locations R1-A, R2-A and R3-A also combine to yield a non-zero signal in the COS 4/SIN 4 sensor coils, so that an angle TAM90 may be calculated as before and used to derive coarse position over 360° in combination with TAM120.

Figure 33:
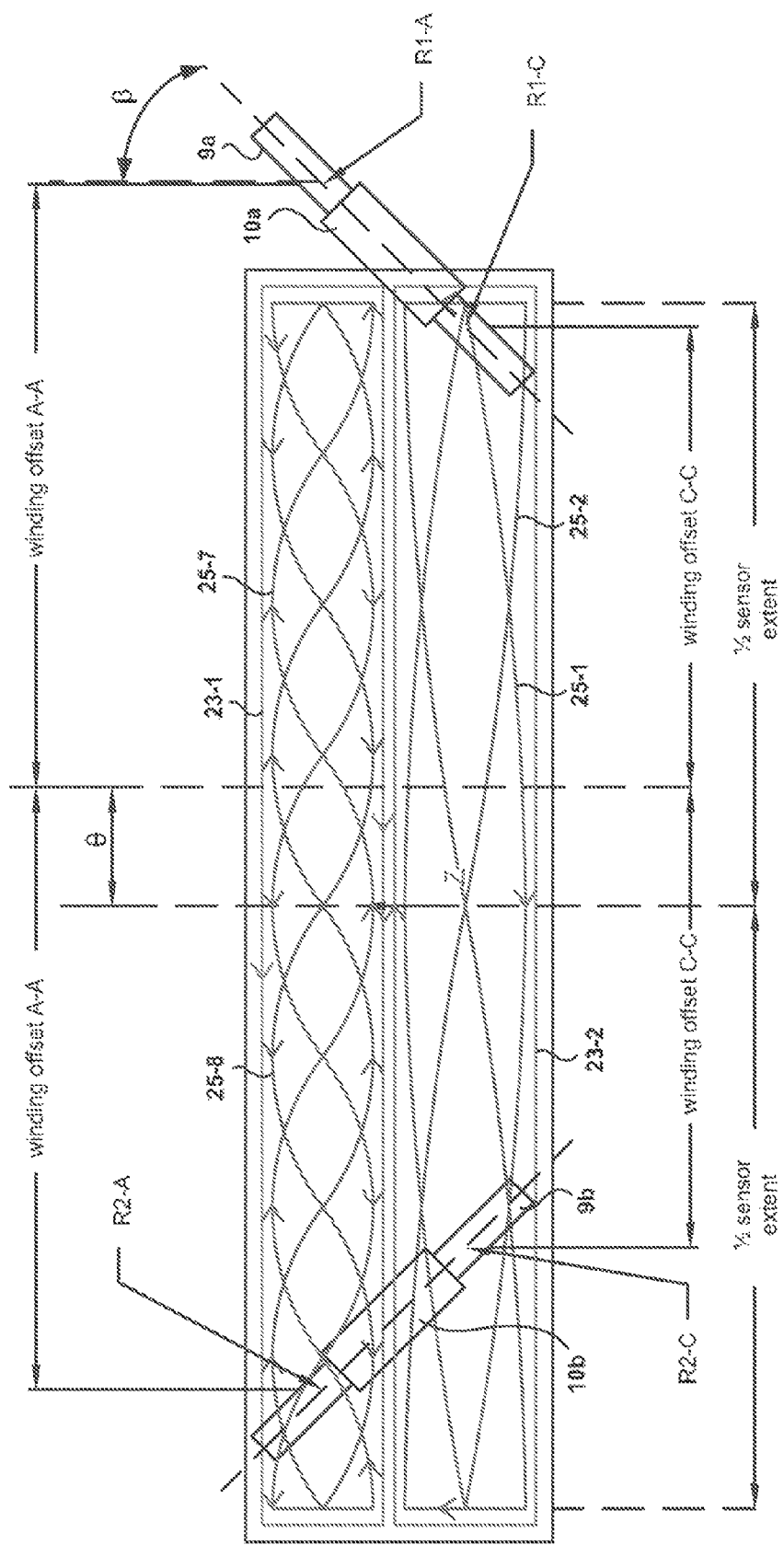
FIG. 33 illustrates a further alternative form of sensor coils and target arrangement.

The embodiment shown in FIG. 29 used a planar sensor board (like that used in the first embodiment) with the target 7 moving in a parallel plane above. Instead, the sensor may be implemented on a rectangular PCB and curved around the rotation axis like the embodiment shown in FIG. 22. FIG. 33 illustrates a possible sensor and target arrangement for such an embodiment, but shown flat and not curved for illustration purposes. As above, there are two different pitches of sinusoidal sensing coils 25, in this case SIN/COS coils 25-1 and 25-2 and SIN 4/COS 4 coils 25-7 and 25-8 having one and four repeats around 360° respectively. Since the sensor board 1 only covers 180° (sensor extent=+/−90°) the actual number of periods shown are 0.5 and 2 respectively. As above, both ferrite rods 9 are angled relative to a direction perpendicular to the measuring direction, by the inset angle (β). So unlike the arrangement of FIG. 22, the ferrite rods 9 are no longer parallel to the axis of rotation 53. The inset angle (β) is chosen so that the winding offset A-A is approximately 180° so that locations R1-A and R2-A on the ferrite rods 9 couple strongly with the SIN 4/COS 4 coils 25-7 and 25-8, while winding offset C-C is somewhat smaller so that the coupling from ferrite rod locations R1-C and R2-C to the SIN/COS coils 25-1 an 25-2 is also non-zero.

In all the embodiments described above, the sensor board 1 was fixed and the target moved relative to the sensor board. In alternative embodiments, the sensor board may move as well as the target or the sensor board may move alone and the target may be fixed.

In the above sensor designs, the excitation and sensor coils were formed as conductor tracks on a printed circuit board. As those skilled in the art will appreciate the excitation and sensor coils may be formed using any conductive material, such as conductive inks which can be printed on an appropriate substrate or conductive wire wound in the appropriate manner. Additionally, it is not essential for the, or each, excitation coil and the, or each, sensor coil to be mounted on the same member. For example, two separate printed circuit boards may be provided, one carrying the excitation coil(s) and the other carrying the, or each, sensor coil.

In the above embodiments, the target included a resonator that was energised by driving the, or each, excitation coil and a signal was generated in the, or each, sensor coil that varied with the position of the target relative to the sensor board. As those skilled in the art will appreciate, the use of such a resonator is not essential. Other electromagnetic devices may be used. For example, a short circuit coil, a metallic screen or a piece of ferrite may be used.

What is claimed is:

1. A transducer for a rotary position sensor comprising:
one or more coils: i) each arranged along and defining a circular measurement path having an inner radius and an outer radius centered about a sensor axis; and ii) each coil extending between the inner radius and the outer radius;
a target having first, second, and third portions adjacent to the one or more coils; the first, second and third portions being circumferentially spaced apart from each other around the circular measurement path and arranged relative to a target axis: i) so that, during relative rotation of the target and the one or more coils around the circular measurement path, the first portion is always positioned between the inner radius and the outer radius; and ii) so that, during relative rotation of the target and the one or more coils around the circular measurement path, the second and third portions are always positioned adjacent to the inner radius or the outer radius; and iii) so that the first, second and third portions each lie on a respective different diameter that passes through the target axis;
wherein the target is arranged to magnetically couple with the one or more coils so that signals are generated that depend on the relative rotational position of the target and the one or more coils; and
wherein the second and third portions of the target are arranged on either side of the target axis to compensate for misalignments between the target axis and the sensor axis.

2. A transducer according to claim 1, wherein the one or more coils are arranged relative to the sensor axis so that the signals that are generated vary sinusoidally with the relative rotational position.

3. A transducer according to claim 1, wherein the target comprises one or more of:
i) a plurality of windings arranged on either side of the target axis;
ii) a plurality of wound magnetic members arranged on either side of the target axis;
iii) a banana shaped coil; and
iv) air cored coils arranged on either side of the target axis.

4. A transducer according to claim 1, wherein the target is asymmetric relative to the one or more coils.

5. A transducer according to claim 4, wherein the target comprises asymmetric windings that have an oval or an egg shape.

6. A transducer according to claim 1, wherein the target comprises a resonator and wherein the transducer comprises one or more excitation coils for energizing the resonator and one or more sensor coils in which the signals are generated.

7. A transducer according to claim 6, wherein the one or more coils arranged relative to the sensor axis between the inner radius and the outer radius are at least one of: the one or more excitation coils and the one or more sensor coils.

8. A transducer according to claim 6, wherein at least one of: i) the one or more excitation coils; and ii) the one or more sensor coils; is patterned so that the magnetic coupling between the target and the at least one of the one or more excitation coils and the one or more sensor coils varies sinusoidally with the relative rotational position.

9. A transducer according to claim 1, wherein the coils lie in a plane and the target is arranged to rotate in a plane that is parallel to the planar coils.

10. A transducer according to claim 1, wherein the target comprises first and second elongate field concentrating members having a winding thereon, wherein the winding on each field concentrating member is offset from a central position of the corresponding field concentrating member.

11. A transducer for a position sensor comprising:
first and second coils arranged along at least a portion of a measurement path; and
a target having first and second target portions that are separated along the measurement path and each target portion having a winding and first and second sub-portions that are separated in a direction perpendicular to the measurement path, the winding of the first target portion being electrically connected to the winding of the second target portion such that current can flow between the winding of the first target portion and the winding of the second target portion;
wherein the target and the first and second coils are relatively moveable;
wherein the magnetic coupling between the first coil and the second coil is modulated by the presence of the target to generate signals that depend on the relative position between the target and the first and second coils; and
wherein the first and second target portions are asymmetrically arranged relative to the first and second coils such that the magnetic coupling between the first coil and the second coil, when the first sub-portion of the first target portion is adjacent a location of the first coil, is opposite to the magnetic coupling between the first coil and the second coil, when the first sub-portion of the second target portion is adjacent the same location of the first coil.

12. A position sensor comprising a transducer comprising:
one or more coils: i) each arranged along and defining a circular measurement path having an inner radius and an outer radius centered about a sensor axis; and ii) each coil extending between the inner radius and the outer radius of the measurement path;
a target having first, second, and third portions adjacent to the one or more coils; the first, the second and the third portions being circumferentially spaced apart from each other around the circular measurement path and arranged relative to a target axis: i) so that, during relative rotation of the target and the one or more coils around the circular measurement path, the first portion is always positioned between the inner radius and the outer radius; and ii) so that, during relative rotation of the target and the one or more coils around the circular measurement path, the second and the third portions are always positioned adjacent to the inner radius or the outer radius and iii) so that the first, second and third portions each lie on a respective different diameter that passes through the target axis;

wherein the target is arranged to magnetically couple with the one or more coils so that signals are generated that depend on the relative rotational position of the target and the one or more coils; and wherein the second and the third portions of the target are arranged on either side of the target axis to compensate for misalignments between the target axis and the sensor axis, wherein the position sensor generates signals that vary with the relative position of the target and the first and second coils and the position sensor includes processing circuitry that processes the signals to determine the relative position.

13. A method of determining rotary position comprising:

providing one or more coils: i) each arranged along and defining a circular measurement path having an inner radius and an outer radius centered about a sensor axis; and ii) each coil extending between the inner radius and the outer radius of the measurement path;

providing a target having first, second and third portions adjacent to the one or more coils; the first, second, and third portions being circumferentially spaced apart from each other around the circular measurement path and being arranged relative to a target axis: i) so that, during relative rotation of the target and the one or more coils around the circular measurement path, the first portion is always positioned between the inner radius and the outer radius; and ii) so that, during relative rotation of the target and the one or more coils around the circular measurement path, the second and third portions are always positioned adjacent the inner radius or the outer radius; and iii) so that the first, second and third portions each lie on a respective different diameter that passes through the target axis;

causing the target to magnetically couple with the one or more coils to generate signals that depend on the relative rotational position between the target and the sensor coils;

processing the generated signals to determine the relative rotational position; and compensating for misalignments between the target axis and the sensor axis by arranging the second and third portions of the target on either side of the target axis.

14. A position sensing method comprising:

arranging first and second coils along at least a portion of a measurement path;

providing a target having first and second target portions that are separated along the measurement path and each target portion having a winding and first and second sub-portions that are separated in a direction perpendicular to the measurement path, the winding of the first target portion being electrically connected to the winding of the second target portion such that current can flow between the winding of the first target portion and the winding of the second target portion;

arranging the target and the one or more sensor coils so that they are relatively moveable and so that the magnetic coupling between the first coil and the second coil is modulated by the presence of the target to generate signals that depend on the relative position between the target and the first and second coils;

arranging the first and second target portions asymmetrically relative to the first and second coils such that the magnetic coupling between the first coil and the second coil, when the first sub-portion of the first target portion is adjacent a location of the first coil, is opposite to the magnetic coupling between the first coil and the second coil, when the first sub-portion of the second target portion is adjacent the same location of the first coil; and processing the generated signals to determine the relative position of the target and the one or more sensor coils.

* * * * *